United States Patent
Smyth et al.

(10) Patent No.: US 11,092,773 B2
(45) Date of Patent: Aug. 17, 2021

(54) FOLDED CAMERA WITH ACTUATOR FOR MOVING OPTICS

(71) Applicant: Apple Inc., Cupertino, CA (US)

(72) Inventors: Nicholas D. Smyth, San Jose, CA (US); Alfred N. Mireault, Cambridge, MA (US); Scott W. Miller, Cupertino, CA (US); Shashank Sharma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 16/258,377

(22) Filed: Jan. 25, 2019

(65) Prior Publication Data

US 2019/0235202 A1    Aug. 1, 2019

Related U.S. Application Data

(60) Provisional application No. 62/622,697, filed on Jan. 26, 2018.

(51) Int. Cl.
*G02B 7/09* (2021.01)
*G02B 7/08* (2021.01)
(Continued)

(52) U.S. Cl.
CPC .......... *G02B 7/09* (2013.01); *G02B 7/08* (2013.01); *G02B 13/0065* (2013.01);
(Continued)

(58) Field of Classification Search
CPC ........ G02B 7/09; G02B 7/08; G02B 13/0065; G02B 27/646; G02B 27/0972;
(Continued)

(56) References Cited

U.S. PATENT DOCUMENTS

| 2,649,022 A | 2/1953 | Angenieux |
| 7,646,418 B2 | 1/2010 | Nanjo |

(Continued)

FOREIGN PATENT DOCUMENTS

| JP | 2009526257 | 7/2009 |
| TW | 594037 | 4/2004 |

(Continued)

OTHER PUBLICATIONS

International Search Report and Written Opinion from Application No. PCT/US2019/015278, (Apple Inc.), dated Apr. 10, 2019, pp. 1-15.

(Continued)

*Primary Examiner* — Tuyen Tra
(74) *Attorney, Agent, or Firm* — Robert C. Kowert; Kowert, Hood, Munyon, Rankin & Goetzel, P.C.

(57) ABSTRACT

Various embodiments include a camera with folded optics and lens shifting capabilities. In some examples, a folded optics arrangement of the camera may include one or more lens elements and light path folding elements (e.g., prisms). Some embodiments include voice coil motor (VCM) actuator arrangements, carrier arrangements, and/or suspension arrangements to provide autofocus (AF) and/or optical image stabilization (OIS) movement. Furthermore, some embodiments include position sensor arrangements for position sensing with respect to AF and/or OIS movement.

20 Claims, 32 Drawing Sheets

(51) Int. Cl.
| | |
|---|---|
| *G02B 13/00* | (2006.01) |
| *G03B 17/17* | (2021.01) |
| *G02B 27/64* | (2006.01) |
| *H04N 5/225* | (2006.01) |
| *G03B 5/00* | (2021.01) |
| *G02B 27/09* | (2006.01) |
| *G03B 3/10* | (2021.01) |
| *G06F 9/30* | (2018.01) |
| *H04N 5/232* | (2006.01) |

(52) U.S. Cl.
CPC ..... *G02B 27/0972* (2013.01); *G02B 27/0977* (2013.01); *G02B 27/646* (2013.01); *G03B 3/10* (2013.01); *G03B 5/00* (2013.01); *G03B 17/17* (2013.01); *G06F 9/3004* (2013.01); *H04N 5/2253* (2013.01); *H04N 5/2254* (2013.01); *H04N 5/2257* (2013.01); *H04N 5/2328* (2013.01); *G03B 2205/0015* (2013.01); *G03B 2205/0053* (2013.01); *G03B 2205/0069* (2013.01)

(58) Field of Classification Search
CPC ... G02B 27/0977; G06F 9/3004; G03B 17/17; G03B 5/00; G03B 3/10; G03B 2205/0015; G03B 2205/0053; G03B 2205/0069; H04N 5/2253; H04N 5/2254; H04N 5/2257; H04N 5/2328
See application file for complete search history.

(56) References Cited

U.S. PATENT DOCUMENTS

| | | | |
|---|---|---|---|
| 8,837,929 | B2 | 9/2014 | Nomura et al. |
| 9,172,856 | B2 | 10/2015 | Bohn et al. |
| 9,549,107 | B2 | 1/2017 | Georgiev |
| 9,733,458 | B2 | 8/2017 | Georgiev et al. |
| 9,829,684 | B2 | 11/2017 | Shabtay et al. |
| 9,973,680 | B2 | 5/2018 | Osborne |
| 10,070,060 | B2 | 9/2018 | Goldenberg et al. |
| 10,156,706 | B2 | 12/2018 | Shabtay et al. |
| 2004/0141065 | A1 | 7/2004 | Hara et al. |
| 2012/0249815 | A1 | 10/2012 | Bohn et al. |
| 2012/0314307 | A1 | 12/2012 | Ikushima et al. |
| 2013/0201559 | A1 | 8/2013 | Minamisawa et al. |
| 2015/0373252 | A1 | 12/2015 | Georgiev |
| 2016/0044247 | A1 | 2/2016 | Shabtay et al. |
| 2016/0266400 | A1 | 9/2016 | Georgiev |
| 2016/0353008 | A1 | 12/2016 | Osborne |
| 2017/0187962 | A1 | 6/2017 | Lee et al. |
| 2017/0329102 | A1 | 11/2017 | Yuza et al. |
| 2017/0359568 | A1 | 12/2017 | Georgiev et al. |
| 2018/0017844 | A1 | 1/2018 | Yu et al. |
| 2018/0120674 | A1 | 5/2018 | Avivi et al. |
| 2018/0239162 | A1 | 8/2018 | Lee et al. |
| 2019/0094500 | A1 | 3/2019 | Tseng et al. |
| 2019/0212632 | A1 | 7/2019 | Miller et al. |
| 2019/0227406 | A1 | 7/2019 | Wang et al. |
| 2019/0243112 | A1 | 8/2019 | Yao et al. |

FOREIGN PATENT DOCUMENTS

| | | |
|---|---|---|
| WO | 2016207754 | 12/2016 |
| WO | 2017037688 | 3/2017 |

OTHER PUBLICATIONS

U.S. Appl. No. 16/244,030, filed Jan. 9, 2019, Scott W. Miller, et al.
U.S. Appl. No. 16/417,936, filed May 21, 2019, Shashank Sharma, et al.
U.S. Appl. No. 16/264,463, filed Jan. 31, 2019, Yuhong Yao, et al.

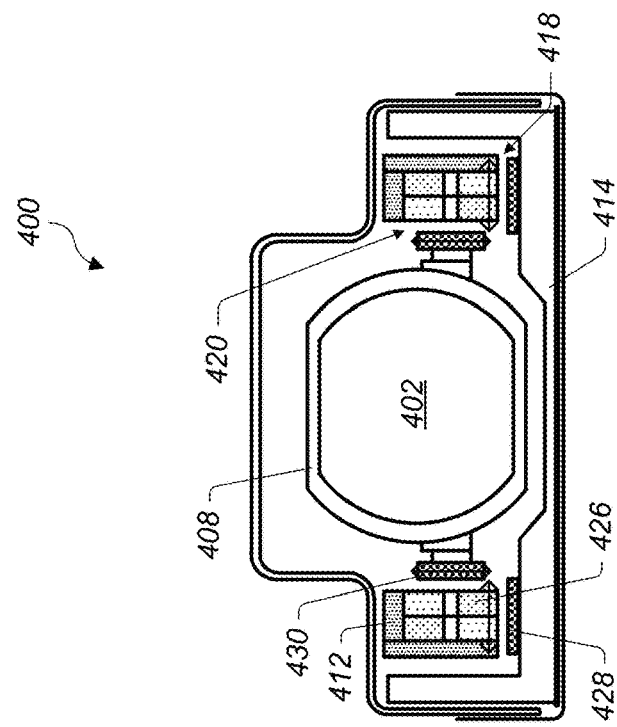
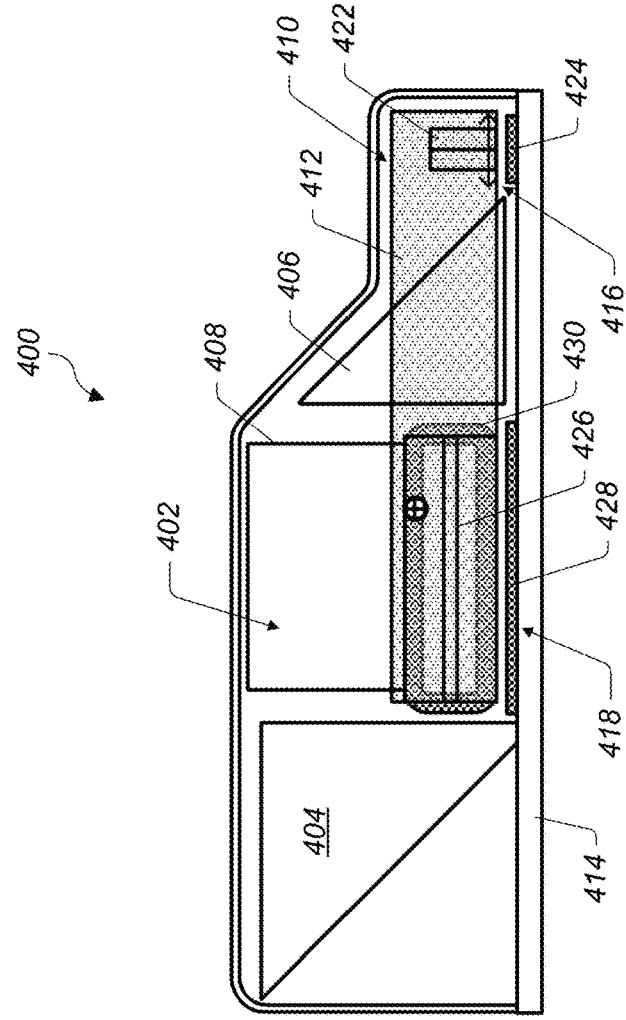
FIG. 4B
FIG. 4A

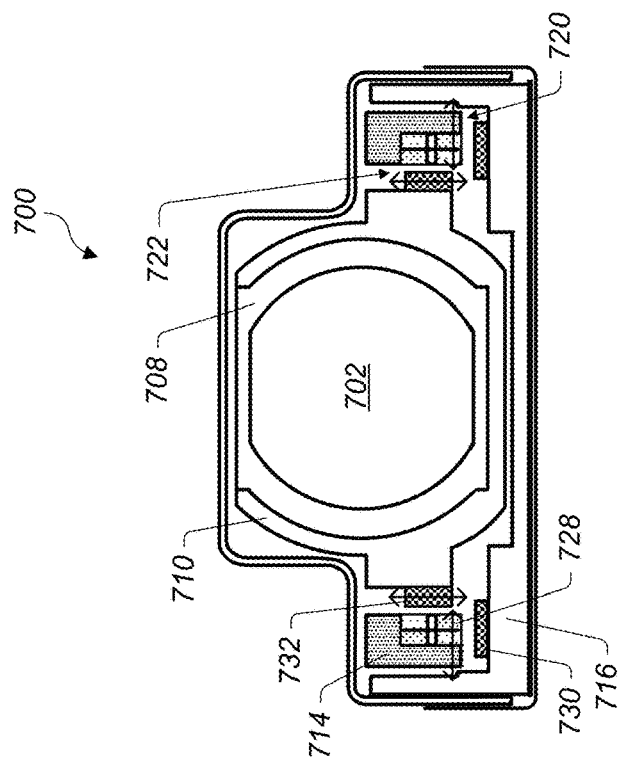
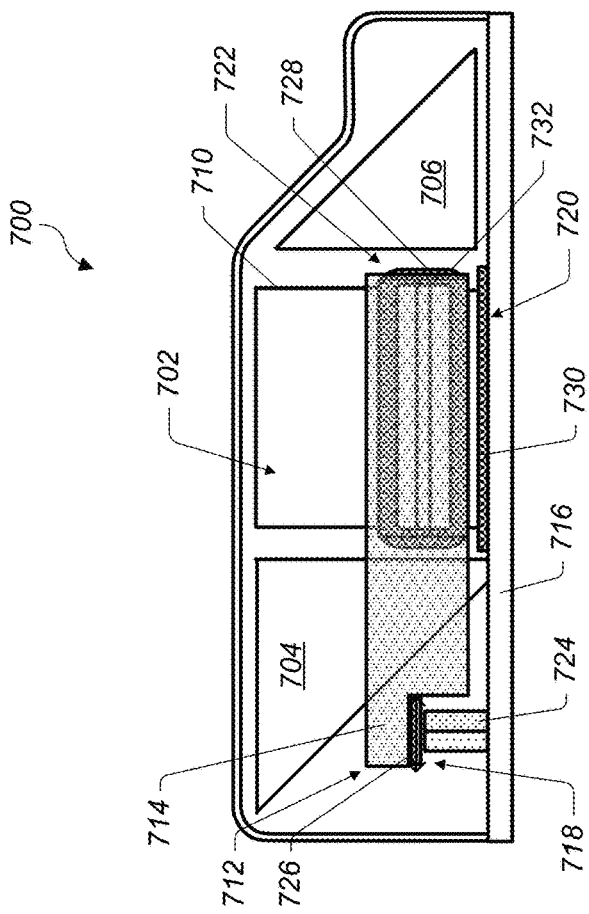
FIG. 7B
FIG. 7A

FOLDED CAMERA WITH ACTUATOR FOR MOVING OPTICS

This application claims benefit of priority to U.S. Provisional Application No. 62/622,697, filed on Jan. 26, 2018, titled "Folded Camera with Actuator for Moving Optics," which is hereby incorporated by reference in its entirety.

BACKGROUND

Technical Field

This disclosure relates generally to architecture for a camera with folded optics and lens shifting capabilities.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 3A shows a perspective view of some structural components of the camera. FIG. 3B shows a schematic side cross-sectional view of the camera. FIG. 3C shows a schematic front cross-sectional view of the camera.

FIGS. 4A-4B each illustrate a respective view of another example camera having a folded optics arrangement and an example actuator arrangement for shifting a lens group of the camera along multiple axes, in accordance with some embodiments. FIG. 4A shows a schematic side cross-sectional view of the camera. FIG. 4B shows a schematic front cross-sectional view of the camera.

FIG. 5A shows a perspective view of some structural components of the camera. FIG. 5B shows a schematic side cross-sectional view of the camera. FIG. 5C shows a schematic front cross-sectional view of the camera.

FIG. 6A shows a perspective view of some structural components of the camera. FIG. 6B shows a schematic side cross-sectional view of the camera. FIG. 6C shows a schematic front cross-sectional view of the camera.

FIGS. 7A-7B each illustrate a respective view of still yet another example camera having a folded optics arrangement and an example actuator arrangement for shifting a lens group of the camera along multiple axes, in accordance with some embodiments. FIG. 7A shows a schematic side cross-sectional view of the camera. FIG. 7B shows a schematic front cross-sectional view of the camera.

FIG. 9A shows a perspective view of the suspension arrangement. FIG. 9B shows a top view of the suspension arrangement. FIG. 9C shows a top detail view of a portion of the suspension arrangement. FIG. 9D shows a bottom detail view of a portion of the suspension arrangement.

FIG. 10A shows a perspective view of the position sensor arrangement. The position sensor arrangement may include position sensors for position sensing with respect to AF movement, OIS-Y movement, and OIS-X movement. FIG. 10B shows a detail view that focuses on position sensing with respect to AF movement. FIGS. 10C-10D each shows a respective detail view that focuses on position sensing with respect to OIS-Y movement. FIG. 10E shows a detail view that focuses on position sensing with respect to OIS-X movement.

FIG. 13A shows a perspective view of some structural components of the camera. FIG. 13B shows a schematic side cross-sectional view of the camera. FIG. 3C shows a schematic front cross-sectional view of the camera.

FIG. 15A shows a perspective view of the position sensor arrangement. The position sensor arrangement may include position sensors for position sensing with respect to AF movement, OIS-X movement, and OIS-Y movement. FIG. 15B shows a cross-sectional view that focuses on position sensing with respect to AF movement. FIG. 15C shows a cross-sectional view that focuses on position sensing with respect to OIS-X and OIS-Y movement.

FIG. 16A shows a perspective view of the camera. FIG. 16B shows a cross-sectional view of the camera.

Figure 1:
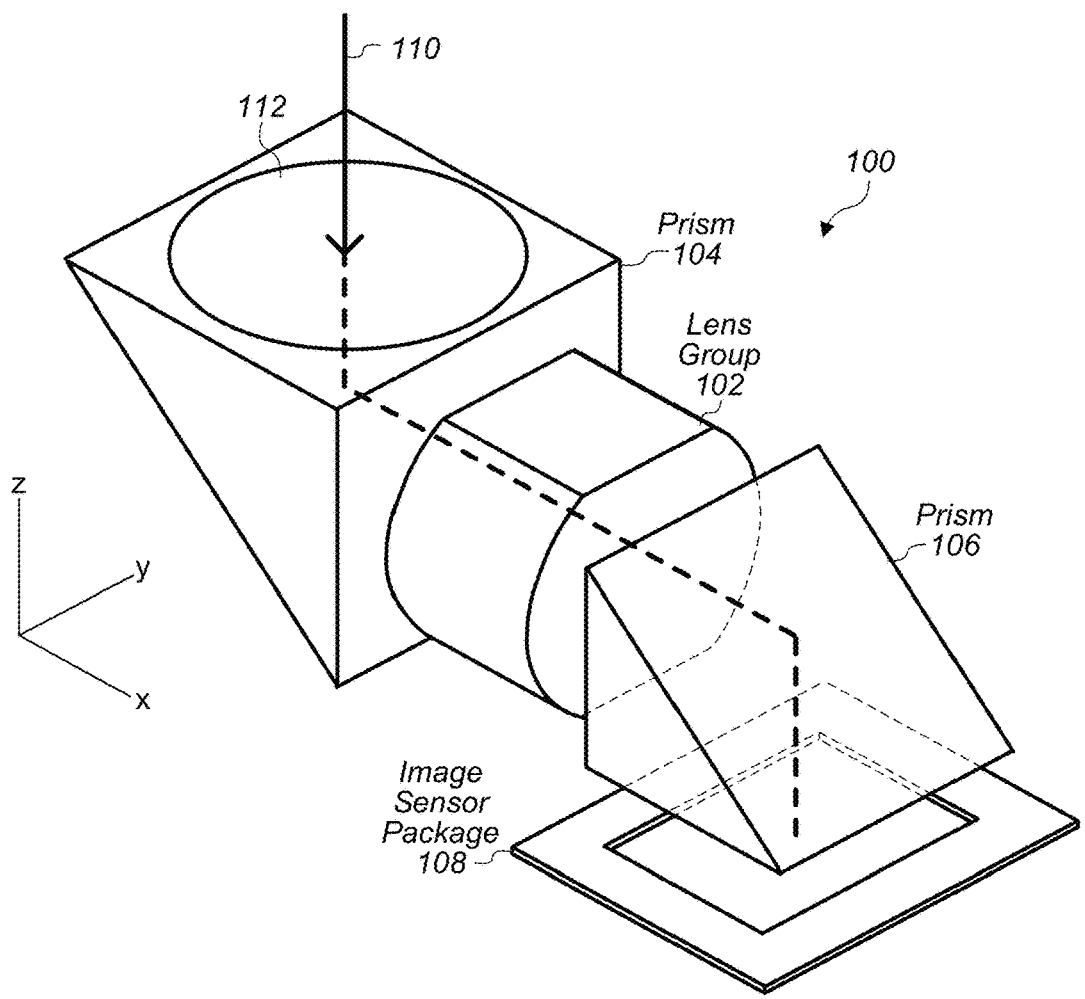
FIG. 1 illustrates a perspective view of an example camera with a folded optics arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Described here are folded optics arrangements for providing a reduced-height imaging system. The arrangements discussed throughout generally comprise one or more lenses positioned between two light path folding elements, which collectively provides a dual-folded light path. The one or more lenses may be moveable between the light path folding elements to provide autofocus and/or image stabilization during imaging. FIG. 1 shows a generalized example of a camera 100 with a folded optics arrangement The example X-Y-Z coordinate system shown in FIG. 1 is used to discuss aspects of systems and/or system components, and may apply to embodiments described throughout this disclosure.

In various embodiments, the camera 100 may include a lens group 102, a first prism 104, a second prism 106, and an image sensor package 108. The lens group 102 may include one or more lens elements. In some embodiments, the lens group 102 may be located between the first prism 104 and the second prism 106, forming the folded optics arrangement. Light may follow an optical path 110 that is folded by the first prism 104 such that the light is directed towards the lens group 102, passes through the lens group 102, and is folded by the second prism 106 such that the light is directed towards the image sensor package 108. In some examples, light may enter an object side of the first prism 104 along the Z-axis. The first prism 104 may redirect the light to propagate along the X-axis (which may be parallel to an optical axis defined by the lens group 102) towards the lens group 102. The second prism 106 may redirect the light to propagate along the Z-axis (which may be orthogonal to a plane defined by the image sensor package 108), e.g., such that the light exits an image side of the second prism 106 towards the image sensor package 108. The first prism 104, the lens group 102, and/or the second prism 106 may be positioned along a common axis (e.g., the X-axis, the optical axis defined by the lens group 102, etc.). According to some examples, the optical path 110 may be contained within a plane (e.g., the X-Z plane), and the image sensor package 108 may extend along a different plane (e.g., the X-Y plane).

In some embodiments, the object side of the first prism 104 may extend along the X-Y plane. Furthermore, the first prism 104 may include a pair of opposing lateral sides that each extend along the X-Z plane, a lens group facing side that extends along the Y-Z plane, and a reflecting surface side that is angled relative to one or more of the other sides of the first prism 104. For example, the reflecting surface side of the first prism 104 may include a reflective surface that is angled so as to redirect light received from the object side of the first prism 104 towards the lens group 102 (via the lens group facing side of the first prism 104), as discussed above.

In some embodiments, the image side of the second prism 106 may extend along the X-Y plane, e.g., proximate the image sensor package 108. Furthermore, the second prism 106 may include a pair of opposing lateral sides that each extend along the X-Z plane, a lens group facing side that extends along the Y-Z plane, and a reflecting surface side that is angled relative to one or more of the other sides of the second prism 106. For example, the reflecting surface side of the second prism 106 may include a reflective surface that is angled so as to redirect light received from the lens group 102 (via the lens group facing side of the second prism 106) towards the image sensor package (via the image side of the second prism 106), as discussed above.

While the light path folding elements are shown in various figures as comprising prisms (e.g., the first prism 104 and the second prism 106), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 102) may be integrated with the first prism 104 (and/or the second prism 106) such that the prism acts as a lens element. Additionally, or alternatively, the first prism 104 (and/or the second prism 106) may be shaped such that the prism acts as a lens element.

Figure 2:
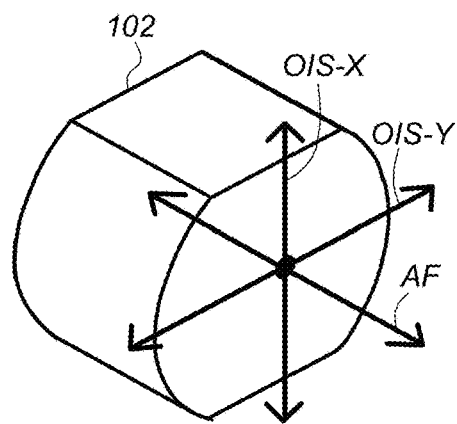
FIG. 2 illustrates an example of 3-axis movement of a lens group within a folded optics arrangement, in accordance with some embodiments.

As will be discussed in further detail below, the lens group 102 may be coupled with an actuator structure that is configured to move the lens group 102 along multiple axes, e.g., to provide autofocus (AF) and/or optical image stabilization (OIS) functionality. FIG. 2 shows an example of 3-axis movement of the lens group 102 to provide AF and/or OIS functionality. For example, the lens group 102 may be shifted (e.g., by an actuator structure, such as the actuator structures/arrangements discussed in further detail below) along the X-axis to provide AF movement. Additionally, or alternatively, the lens group 102 may be shifted along the Z-axis to provide OIS-X movement (e.g., movement that shifts the image projected on the image sensor package 108 in one or more directions parallel to the X-axis). Additionally, or alternatively, the lens group 102 may be shifted along the Y-axis to provide OIS-Y movement (e.g., movement that shifts the image projected on the image sensor package 108 in one or more directions parallel to the Y-axis). Components of the camera 100 (e.g., the lens group 102, the first prism 104, the second prism 106, and/or the image sensor package 108, etc.) may be used with any of the actuator arrangements described in the following figures.

Figure 3A:
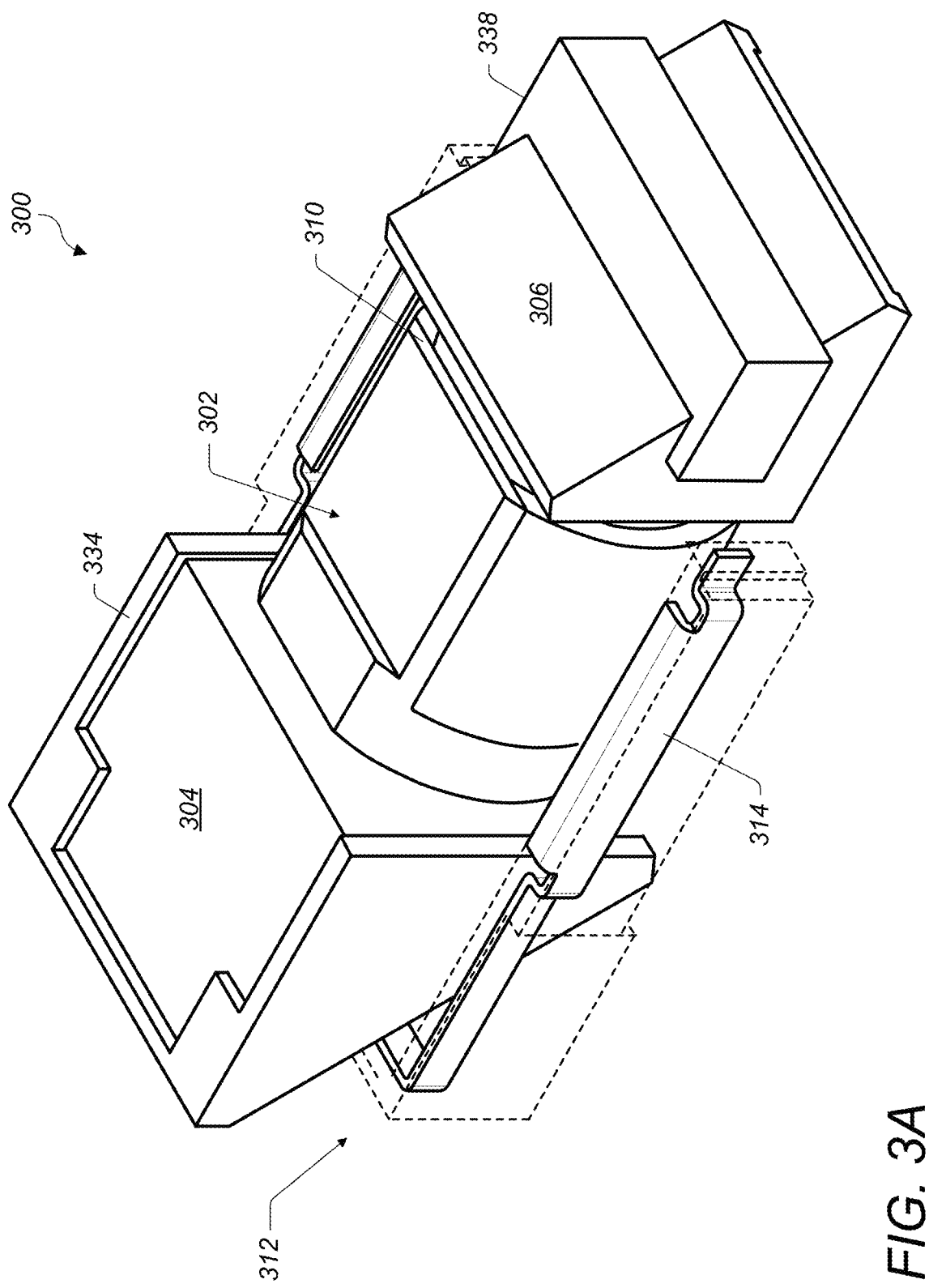
FIGS. 3A-3C each illustrate a respective view of an example camera having a folded optics arrangement and an example actuator arrangement for shifting a lens group of the camera along multiple axes, in accordance with some embodiments.
Figure 3C:
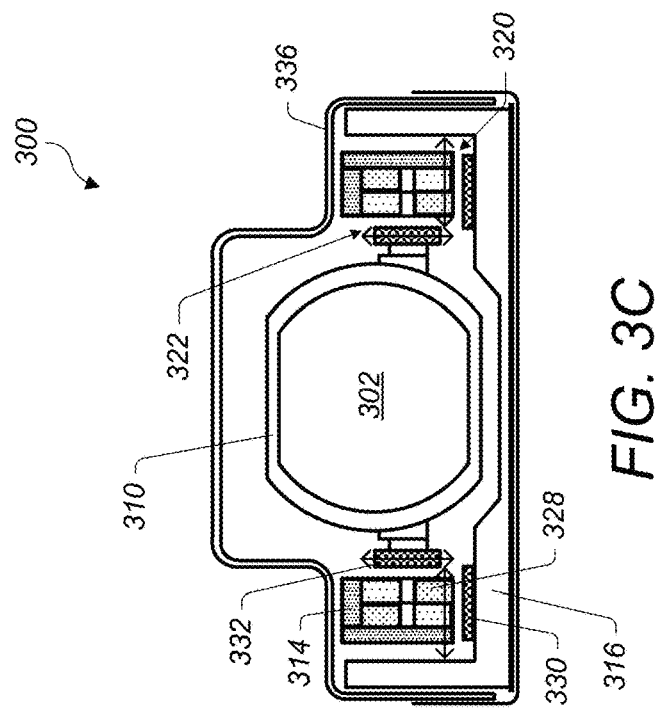
Figure 3B:
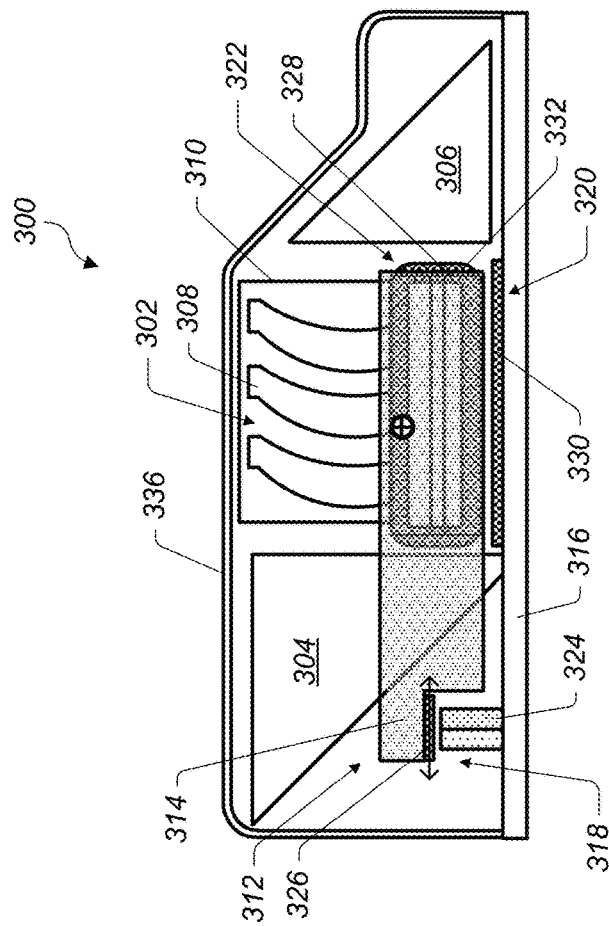

As mentioned above, the camera systems described here may comprise an actuator system to move the lens group relative to the light path folding elements (e.g., the first prism 104 and the second prism 106). The actuator arrangements described here may generally comprise one or more carrier structures (e.g., the inner carrier structures and/or the outer carrier structures of the carrier arrangements discussed below), one or more suspension structures for moveably holding the carrier structure(s) relative to the rest of the camera and/or for moveably holding a carrier structure relative to another carrier structure, and an actuator module for controlling movement of the carrier structure(s). FIGS. 3A-3C show perspective and cross-sectional views of one such variation, and include an example camera 300 with a folded optics arrangement.

In some embodiments, the camera 300 may include a lens group 302, a first prism 304, a second prism 306, and an image sensor (not shown). The lens group 302 may include one or more lens elements 308 disposed within a lens barrel 310.

In various embodiments, the camera 300 may include an actuator module 312 that provides for shifting the lens group 302 along multiple axes, e.g., to provide AF and/or OIS movement. In some embodiments, the actuator module 312 may comprise a voice coil motor (VCM) actuator module that includes one or more VCM actuators. For instance, the actuator module 312 may include one or more magnets and one or more coils. The magnets and coils may magnetically interact (e.g., when electrical current is provided to the coils) to produce Lorentz forces that move the lens group 302.

According to various embodiments, the camera 300 may include a carrier arrangement that includes an inner carrier structure (e.g., the lens barrel 310 and/or a lens carrier) and an outer carrier structure (e.g., a magnet holder 314 and/or a magnet frame). One or more coils may be coupled to the inner carrier structure (e.g., to the lens barrel 310 and/or a lens carrier). Furthermore, one or more magnets may be coupled to the outer carrier structure (e.g., to the magnet holder 314). In some embodiments, the magnet holder 314 may extend at least partially around the first prism 304, at least partially around the lens barrel 310 (and the lens group 302), and/or at least partially around the second prism 306. For instance, as shown in FIGS. 3A-3C, the magnet holder 314 may extend at least partially around the lens barrel 310 and the first prism 304. The magnet holder 314 may be U-shaped in some embodiments.

The magnet holder 314 may have multiple sides and/or portions. For example, the magnet holder 314 may have a first side, a second side, and a third side. The first side may be a lateral side extending along the X-axis and along the side surfaces of the optical elements. The second side may be a lateral side extending along the X-axis and along the opposite side surfaces of the optical elements. The third side may be a distal/object side extending along the Y-axis, and may be positioned behind at least a portion of the reflecting surface side of the first prism 304 (e.g., such that the first prism 304 is disposed between the lens group 302 and the magnet holder 314).

Figure 5A:
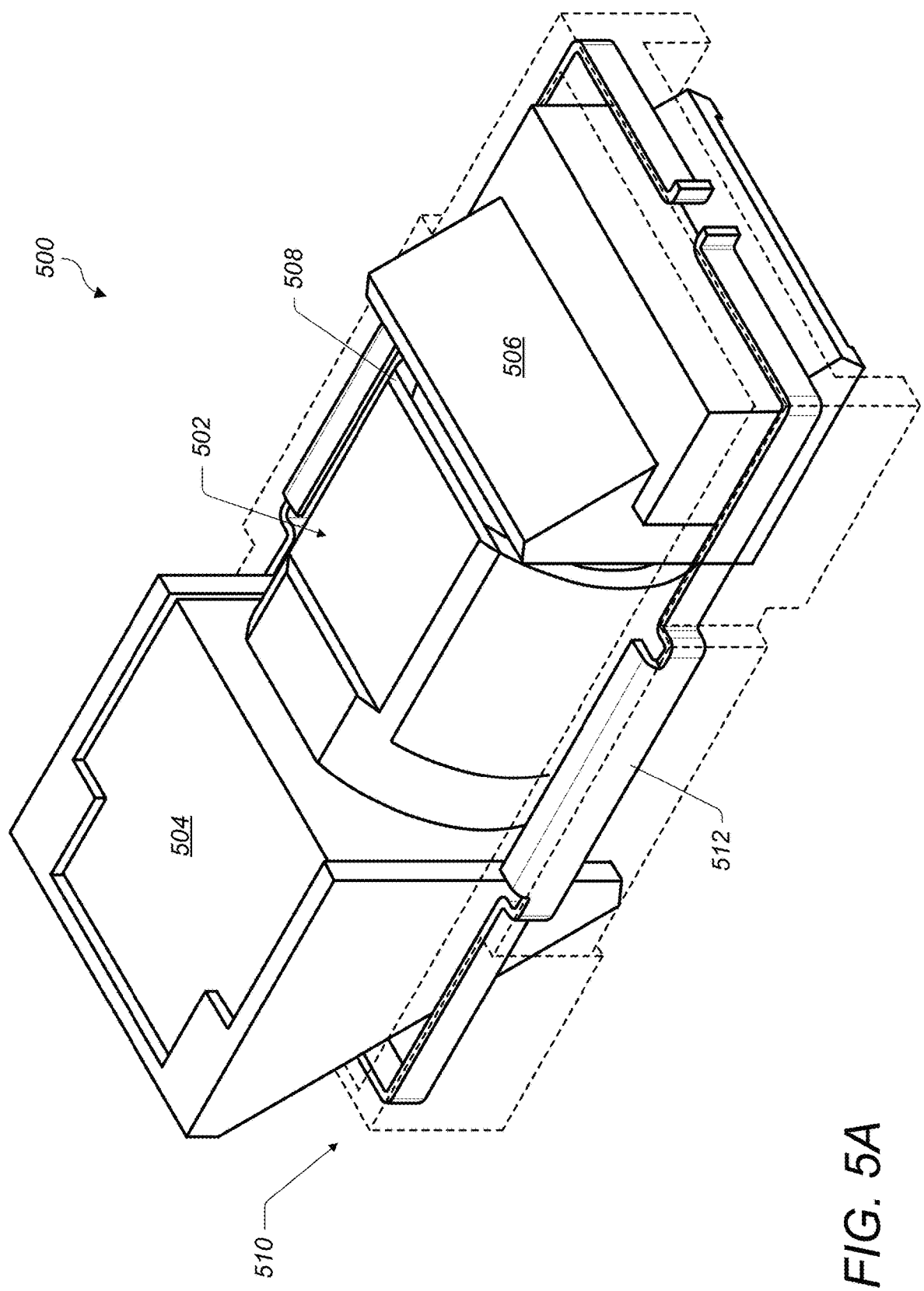
FIGS. 5A-5C each illustrate a respective view of yet another example camera having a folded optics arrangement and an example actuator arrangement for shifting a lens group of the camera along multiple axes, in accordance with some embodiments.
Figure 5C:
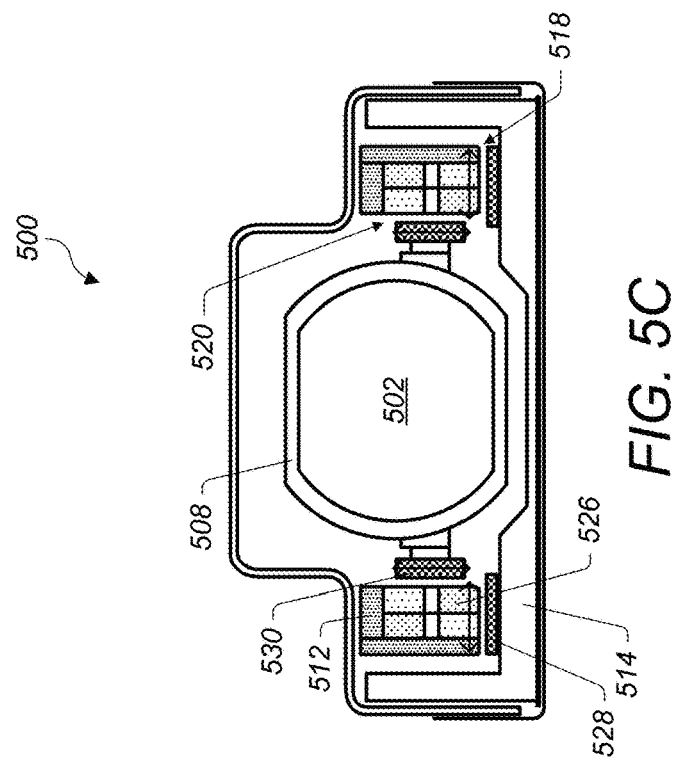
Figure 5B:
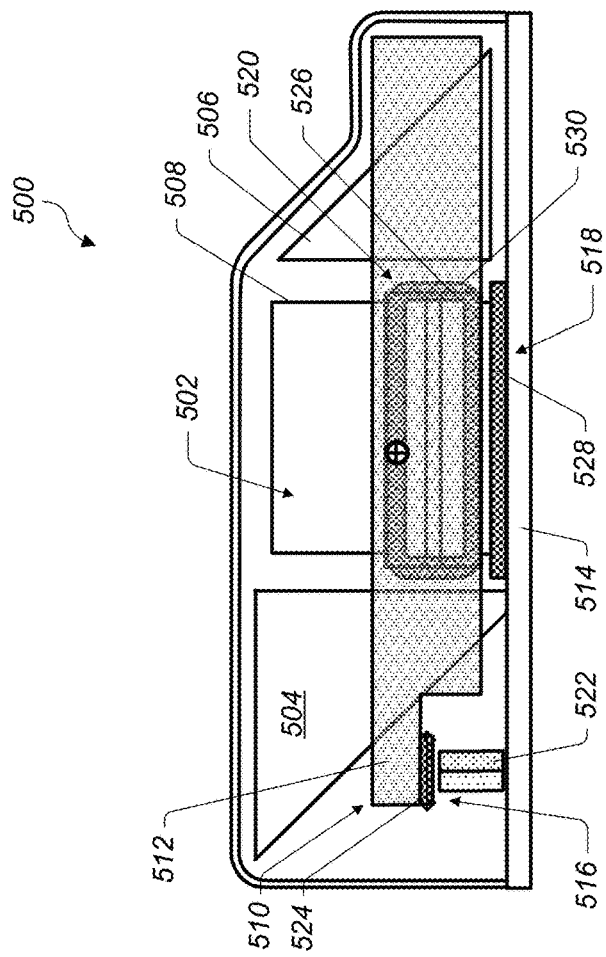

According to some examples, a first portion of the magnet holder 314 (e.g., the first side of the magnet holder 314) may extend proximate a first side of the lens barrel 310, a second portion of the magnet holder 314 (e.g., the second side of the magnet holder 314) may extend proximate a second side of the lens barrel 310 that is opposite the first side of the lens barrel 310, and a third portion of the magnet holder 314 (e.g. the third side of the magnet holder 314) may be tucked under a portion of the first prism 304 and may extend from the first portion to the second portion, e.g., as shown in FIGS. 3A-3C. In some embodiments, the magnet holder 314 (and/or outer carrier structure) may have a different number of sides and/or a different combination of sides, e.g., as will be discussed below with reference to at least FIGS. 4A-6C. While FIGS. 3A-3C show the magnet holder 314 partially encircling the optical elements of the folded optics arrangement (e.g., the first prism 304, the lens group 302, and the second prism 306), it is understood that the magnet holder 314 may encircle the optical elements (e.g., as shown in FIGS. 5A-5C) in some embodiments.

As will be discussed below with reference to FIGS. 9A-9D, the lens barrel 310 may be suspended from the magnet holder 314 via a suspension arrangement. Additionally, or alternatively, the magnet holder 314 may be suspended from a fixed (or static) structure (e.g., fixed structure 316) of the camera 300 via the suspension arrangement. The suspension arrangement may allow the lens barrel 310 to move relative to the magnet holder 314. Furthermore, the suspension arrangement may allow the lens barrel 310 to move together with the magnet holder 314 relative to the fixed structure 316. In various examples, the lens barrel 310 may be fixedly attached to the lens group 302, and movement of the lens barrel 310 (e.g., due to actuation of one or more actuators of the actuator module 312) may cause movement of the lens group 302, such that the lens group 302 moves together with the lens barrel 310. According to some embodiments, the fixed structure 316 may include a component of the camera 300 to which the carrier arrangement is moveably connected (e.g., via suspension elements). The fixed structure 316 may be fixed relative to movement of the carrier arrangement. Furthermore, the fixed structure 316 may be fixed relative to the first prism 304, the second prism 306, and/or the image sensor. In some examples, the fixed structure 316 may include multiple components that are joined or otherwise fixed relative to each other.

In various embodiments, the actuator module 312 may include one or more AF VCM actuators and/or one or more OIS VCM actuators. In some embodiments, the actuator module 312 may include an AF VCM actuator 318 (e.g., to provide AF movement), an OIS-Y VCM actuator 320 (e.g., to provide OIS-Y movement), and an OIS-X VCM actuator 322 (e.g., to provide OIS-X movement).

The AF VCM actuator 318 may include one or more magnets and one or more coils. In some examples, the AF VCM actuator 318 may include an AF magnet 324 (e.g., a single-pole magnet) and an AF coil 326. The AF magnet 324 may be attached to the fixed structure 316. The AF coil 326 may be attached to the magnet holder 314. In some embodiments, the AF magnet 324 may have a longest dimension that is substantially parallel to a longest dimension of the AF coil 326. In some embodiments, the AF coil 326 may be oriented such that directions of current flow through the AF coil 326 define a plane that is substantially parallel to a surface of the fixed structure 316 (e.g., the surface on which the AF magnet 324 is mounted) and/or substantially parallel to the X-Y plane. The AF magnet 324 and the AF coil 326 may be located proximate one another, and the AF coil 326 may be electrically driven to magnetically interact with the AF magnet 324 to produce Lorentz forces that move the AF coil 326, the magnet holder 314, and/or the lens group 302 along an axis (e.g., along the X-axis) to provide AF movement (e.g., movement that shifts an image projected on the image sensor in one or more directions parallel to the Z-axis). The AF magnet 324, being attached to the fixed structure 316, may remain stationary relative to the movement of the AF coil 326. In various embodiments, the AF VCM actuator 318 may be tucked within a space under a portion of the first prism 304, e.g., as indicated in FIG. 3B. In this manner, the impact of the AF VCM actuator 318 on the dimension of the system along its long axis (e.g., the X-axis) and along its vertical axis (e.g., the Z-axis) may be reduced or eliminated.

In some embodiments, the OIS-Y VCM actuator 320 and the OIS-X VCM actuator 322 may share one or more OIS magnets 328 (also referred to herein as "shared OIS magnets"). In some embodiments, the shared OIS magnets 328 may be dual-pole magnets. The shared OIS magnets 328 may be attached to the magnet holder 314, e.g., at opposing sides of the lens group 302, as shown in FIGS. 3B and 3C.

According to some examples, the OIS-Y VCM actuator 320 may include one or more OIS-Y coils 330. The OIS-Y coils 330 may be attached to the fixed structure 316. In some embodiments, each OIS-Y coil 330 may be located below a respective shared OIS magnet 328. The OIS-Y coils 330 may be electrically driven to magnetically interact with the shared OIS magnets 328 to produce Lorentz forces that move the shared OIS magnets 328, the magnet holder 314, and/or the lens group 302 along an axis (e.g., along the Y-axis) to provide OIS-Y movement (e.g., movement that shifts an image projected on the image sensor in one or more directions parallel to the Y-axis). The OIS-Y coils 330, being attached to the fixed structure 316, may remain stationary relative to the movement of the shared OIS magnets 328. In some embodiments, each of the shared OIS magnets 328 may have respective longest dimensions that are substantially parallel to respective longest dimensions of the OIS-Y coils 330. In some embodiments, the respective longest dimensions of the shared OIS magnets 328 and the OIS-Y coils 330 may be substantially parallel to a longest dimension of the system. Furthermore, the respective longest dimensions of the shared OIS magnets 328 and the OIS-Y coils 330 may be substantially orthogonal to the respective longest dimensions of the AF magnet 324 and the AF coil 326 in some embodiments. According to various embodiments, the OIS-Y coils 330 may be oriented such that directions of current flow through the OIS-Y coils 330 define a respective plane that is substantially parallel to a surface of the fixed structure 316 (e.g., the surface on which the OIS-Y coils 330 are mounted).

According to some examples, the OIS-X VCM actuator 322 may include one or more OIS-X coils 332. The OIS-X coils 332 may be attached to the lens barrel 310. In some embodiments, each OIS-X coil 332 may be located between a respective shared OIS magnet 328 and the lens group 302. The OIS-X coils 332 may be electrically driven to magnetically interact with the shared OIS magnets 328 to produce Lorentz forces that move the OIS-X coils 332, the lens barrel 310, and the lens group 302 along an axis (e.g., along the Z-axis), relative to the magnet holder 314 and/or the fixed structure 316, to provide OIS-X movement (e.g., movement that shifts an image projected on the image sensor in one or more directions parallel to the X-axis). In some embodiments, each of the shared OIS magnets 328 may have respective longest dimensions that are substantially parallel to respective longest dimensions of the OIS-X coils 332. In some embodiments, the respective longest dimensions of the shared OIS magnets 328 and the OIS-X coils 332 may be substantially parallel to a longest dimension of the system. Furthermore, the respective longest dimensions of the shared OIS magnets 328 and the OIS-X coils 332 may be substantially orthogonal to the respective longest dimensions of the AF magnet 324 and the AF coil 326 in some embodiments. According to various embodiments, the OIS-X coils 332 may be oriented such that directions of current flow through the OIS-X coils 332 define a respective plane that is substantially orthogonal to a surface of the fixed structure 316 (e.g., the surface on which the OIS-Y coils 330 are mounted).

In various embodiments, the camera 300 may include a substrate below the second prism 306. An image sensor may be coupled to the substrate. In some embodiments, a filter (e.g., an infrared filter) may also be coupled to the substrate. For instance, the filter may be located above the image sensor such that light passes through the filter before reaching the image sensor. In some examples, the substrate may be parallel to the fixed structure 316. Additionally, or alternatively, the fixed structure 316 may include the substrate and/or one or more other components.

In some embodiments, the camera 300 may include a first prism holder 334 that holds the first prism 304. In some embodiments, the first prism 304 may be attached to one or more fixed (or static) structures of the camera 300 via the first prism holder 334. For instance, the first prism holder 334 may be attached to a shield can 336 in some cases. Additionally, or alternatively, the camera 300 may include a second prism holder 338 that holds the second prism 306. In some embodiments, the second prism 306 may be attached to one or more fixed (or static) structures of the camera 300 via the second prism holder 338. For instance, the second prism holder 338 may be attached to the shield can 336 in some cases.

FIGS. 4A-4B each illustrate a respective view of another example camera 400 having a folded optics arrangement and an example actuator arrangement for shifting a lens group of the camera 400 along multiple axes. FIG. 4A shows a schematic side cross-sectional view of the camera 400. FIG. 4B shows a schematic front cross-sectional view of the camera 400.

In some embodiments, the camera 400 may include a lens group 402, a first prism 404, and a second prism 406, and an image sensor (not shown). The lens group 402 may include one or more lens elements disposed within a lens barrel 408.

In various embodiments, the camera 400 may include an actuator module 410 that provides for shifting the lens group 402 along multiple axes, e.g., to provide AF and/or OIS movement. In some embodiments, the actuator module 410 may comprise a voice coil motor (VCM) actuator module that includes one or more VCM actuators. For instance, the actuator module 410 may include one or more magnets and one or more coils. The magnets and coils may magnetically interact (e.g., when electrical current is provided to the coils) to produce Lorentz forces that move the lens group 402.

According to various embodiments, the camera 400 may include a carrier arrangement that includes an inner carrier structure (e.g., the lens barrel 408 and/or a lens carrier) and an outer carrier structure (e.g., a magnet holder 412 and/or a magnet frame). One or more coils may be coupled to the inner carrier structure (e.g., to the lens barrel 408 and/or a lens carrier). Furthermore, one or more magnets may be coupled to the outer carrier structure (e.g., to the magnet holder 412). In some embodiments, the magnet holder 412 may extend at least partially around the first prism 404, at least partially around the lens barrel 408 (and the lens group 402), and/or at least partially around the second prism 406. For instance, as shown in FIGS. 4A-4B, the magnet holder 412 may extend at least partially around the lens barrel 408 and the second prism 406. The magnet holder 412 may be U-shaped in some embodiments.

The magnet holder 412 may have multiple sides and/or portions. For example, the magnet holder 412 may have a first side, a second side, and a third side. The first side may be a lateral side extending along the X-axis and along the side surface of the optical elements. The second side may be a lateral side extending along the X-axis and along the opposite side surface of the optical elements. The third side may be a proximal/image side extending along the Y-axis, and may be positioned in front of at least a portion of the reflecting surface side of the second prism 406 (e.g., such that the second prism 406 is disposed between the lens group 402 and the magnet holder 412).

According to some examples, a first portion of the magnet holder 412 (e.g., the first side of the magnet holder 412) may extend proximate a first side of the lens barrel 408, a second portion of the magnet holder 412 (e.g., the second side of the magnet holder 412) may extend proximate a second side of the lens barrel 408 that is opposite the first side of the lens barrel 408, and a third portion of the magnet holder 412 (e.g., the third side of the magnet holder 412) may extend in front of a portion of the second prism 406, e.g., as shown in FIGS. 4A-4B. As will be discussed below with reference to FIGS. 9A-9D, the lens barrel 408 may be suspended from the magnet holder 412 via a suspension arrangement. Additionally, or alternatively, the magnet holder 412 may be suspended from a fixed structure 414 of the camera 400 via the suspension arrangement. The suspension arrangement may allow the lens barrel 408 to move relative to the magnet holder 412. Furthermore, the suspension arrangement may allow the lens barrel 408 to move together with the magnet holder 412 relative to the fixed structure 414.

In various embodiments, the actuator module 410 may include one or more AF VCM actuators and/or one or more OIS VCM actuators. In some embodiments, the actuator module 410 may include an AF VCM actuator 416 (e.g., to provide AF movement), an OIS-Y VCM actuator 418 (e.g., to provide OIS-Y movement), and an OIS-X VCM actuator 420 (e.g., to provide OIS-X movement).

The AF VCM actuator 416 may include one or more magnets and one or more coils. In some examples, the AF VCM actuator 416 may include an AF magnet 422 (e.g., a single-pole magnet) and an AF coil 424. The AF magnet 422 may be attached to the magnet holder 412. The AF coil 424 may be attached to the fixed structure 414. In some embodiments, the AF magnet 422 may have a longest dimension that is substantially parallel to a longest dimension of the AF coil 424. In some embodiments, the AF coil 424 may be oriented such that directions of current flow through the AF coil 424 define a plane that is substantially parallel to a surface of the fixed structure 414 (e.g., the surface on which the AF coil 424 is mounted) and/or substantially parallel to the X-Y plane. The AF magnet 422 and the AF coil 424 may be located proximate one another, and the AF coil 424 may be electrically driven to magnetically interact with the AF magnet 422 to produce Lorentz forces that move the AF magnet 422, the magnet holder 412, and/or the lens group 402 along an axis (e.g., along the X-axis) to provide AF movement. The AF coil 424, being attached to the fixed structure 414, may remain stationary relative to the movement of the AF magnet 422. In various embodiments, the AF VCM actuator 416 may be located in front of a portion of the second prism 406, e.g., as indicated in FIG. 4A.

In some embodiments, the OIS-Y VCM actuator 418 and the OIS-X VCM actuator 420 may share one or more OIS magnets 426. In some embodiments, the shared OIS magnets 426 may be dual-pole magnets. The shared OIS magnets 426 may be attached to the magnet holder 412, e.g., at opposing sides of the lens group 402, as shown in FIGS. 4A and 4B.

According to some examples, the OIS-Y VCM actuator 418 may include one or more OIS-Y coils 428. The OIS-Y coils 428 may be attached to the fixed structure 414. In some embodiments, each OIS-Y coil 428 may be located below a respective shared OIS magnet 426. The OIS-Y coils 428 may be electrically driven to magnetically interact with the shared OIS magnets 426 to produce Lorentz forces that move the shared OIS magnets 426, the magnet holder 412, and/or the lens group 402 along an axis (e.g., along the Y-axis) to provide OIS-Y movement. The OIS-Y coils 428, being attached to the fixed structure 414, may remain stationary relative to the movement of the shared OIS magnets 426. In some embodiments, each of the shared OIS magnets 426 may have respective longest dimensions that are substantially parallel to respective longest dimensions of the OIS-Y coils 428. In some embodiments, the respective longest dimensions of the shared OIS magnets 426 and the OIS-Y coils 428 may be substantially parallel to a longest dimension of the system. Furthermore, the respective longest dimensions of the shared OIS magnets 426 and the OIS-Y coils 428 may be substantially orthogonal to the respective longest dimensions of the AF magnet 422 and the AF coil 424 in some embodiments. According to various embodiments, the OIS-Y coils 428 may be oriented such that directions of current flow through the OIS-Y coils 428 define a respective plane that is substantially parallel to a surface of the fixed structure 414 (e.g., the surface on which the OIS-Y coils 428 are mounted).

According to some examples, the OIS-X VCM actuator 420 may include one or more OIS-X coils 430. The OIS-X coils 430 may be attached to the lens barrel 408. In some embodiments, each OIS-X coil 430 may be located between a respective shared OIS magnet 426 and the lens group 402. The OIS-X coils 430 may be electrically driven to magnetically interact with the shared OIS magnets 426 to produce Lorentz forces that move the OIS-X coils 430, the lens barrel 408, and the lens group 402 along an axis (e.g., along the Z-axis), relative to the magnet holder 412 and/or the fixed structure 414, to provide OIS-X movement. In some embodiments, each of the shared OIS magnets 426 may have respective longest dimensions that are substantially parallel to respective longest dimensions of the OIS-X coils 430. In some embodiments, the respective longest dimensions of the shared OIS magnets 426 and the OIS-X coils 430 may be substantially parallel to a longest dimension of the system. Furthermore, the respective longest dimensions of the shared OIS magnets 426 and the OIS-X coils 430 may be substantially orthogonal to the respective longest dimensions of the AF magnet 422 and the AF coil 424 in some embodiments. According to various embodiments, the OIS-X coils 430 may be oriented such that directions of current flow through the OIS-X coils 430 define a respective plane that is substantially orthogonal to a surface of the fixed structure 414 (e.g., the surface on which the OIS-Y coils 428 are mounted).

FIGS. 5A-5C each illustrate a respective view of yet another example camera 500 having a folded optics arrangement and an example actuator arrangement for shifting a lens group of the camera 500 along multiple axes. FIG. 5A shows a perspective view of some structural components of the camera 500. FIG. 5B shows a schematic side cross-sectional view of the camera 500. FIG. 5C shows a schematic front cross-sectional view of the camera 500.

In some embodiments, the camera 500 may include a lens group 502, a first prism 504, and a second prism 506, and an image sensor (not shown). The lens group 502 may include one or more lens elements disposed within a lens barrel 508.

In various embodiments, the camera 500 may include an actuator module 510 that provides for shifting the lens group 502 along multiple axes, e.g., to provide AF and/or OIS movement. In some embodiments, the actuator module 510 may comprise a voice coil motor (VCM) actuator module that includes one or more VCM actuators. For instance, the actuator module 510 may include one or more magnets and one or more coils. The magnets and coils may magnetically interact (e.g., when electrical current is provided to the coils) to produce Lorentz forces that move the lens group 502.

According to various embodiments, the camera 500 may include a carrier arrangement that includes an inner carrier structure (e.g., the lens barrel 508 and/or a lens carrier) and an outer carrier structure (e.g., a magnet holder 512 and/or a magnet frame). One or more coils may be coupled to the inner carrier structure (e.g., to the lens barrel 508 and/or a lens carrier). Furthermore, one or more magnets may be coupled to the outer carrier structure (e.g., to the magnet holder 512). In some embodiments, the magnet holder 512 may extend at least partially around the first prism 504, the lens barrel 508 (and the lens group 502), and the second prism 506, e.g., as shown in FIGS. 5A-5C.

The magnet holder 512 may have multiple sides and/or portions. For example, the magnet holder 512 may have a first side, a second side, a third side, and a fourth side. The first side may be a lateral side extending along the X-axis and along the side surfaces of the optical elements. The second side may be a lateral side extending along the X-axis and along the opposite side surfaces of the optical elements. The third side may be a distal/object side extending along the Y-axis, and may be positioned behind at least a portion of the reflecting surface side of the first prism 504 (e.g., such that the first prism 504 is disposed between the lens group 502 and the magnet holder 512). The fourth side may be a proximal/image side extending along the Y-axis, and may be positioned in front of at least a portion of the reflecting surface side of the second prism 506 (e.g., such that the second prism 506 is disposed between the lens group 502 and the magnet holder 512). In some non-limiting examples, the magnet holder 512 may encircle the optical elements of the folded optics arrangement (e.g., the first prism 504, the lens group 502, and the second prism 506). In some examples, one or more of the sides of the magnet holder 512 may comprise two parts that are spaced apart from each other by a gap, so that the magnet holder 512 partially encircles the optical elements.

According to some examples, a first portion of the magnet holder 512 (e.g., the first side of the magnet holder 512) may extend proximate a first side of the lens barrel 508, a second portion of the magnet holder 512 (e.g., the second side of the magnet holder 512) may extend proximate a second side of the lens barrel 508 that is opposite the first side of the lens barrel 508, a third portion of the magnet holder 512 (e.g., the third side of the magnet holder 512) may be tucked under a portion of the first prism 504, and a fourth portion of the magnet holder 512 (e.g., the fourth side of the magnet holder 512) may extend in front of the second prism 506. As will be discussed below with reference to FIGS. 9A-9D, the lens barrel 508 may be suspended from the magnet holder 512 via a suspension arrangement. Additionally, or alternatively, the magnet holder 512 may be suspended from a fixed structure 514 of the camera 500 via the suspension arrangement. The suspension arrangement may allow the lens barrel 508 to move relative to the magnet holder 512. Furthermore, the suspension arrangement may allow the lens barrel 508 to move together with the magnet holder 512 relative to the fixed structure 514.

In various embodiments, the actuator module 510 may include one or more AF VCM actuators and/or one or more OIS VCM actuators. In some embodiments, the actuator module 510 may include an AF VCM actuator 516 (e.g., to provide AF movement), an OIS-Y VCM actuator 518 (e.g., to provide OIS-Y movement), and an OIS-X VCM actuator 520 (e.g., to provide OIS-X movement).

The AF VCM actuator 516 may include one or more magnets and one or more coils. In some examples, the AF VCM actuator 516 may include an AF magnet 522 (e.g., a single-pole magnet) and an AF coil 524. The AF magnet 522 may be attached to the fixed structure 514. The AF coil 524 may be attached to the magnet holder 512. In some embodiments, the AF magnet 522 may have a longest dimension that is substantially parallel to a longest dimension of the AF coil 524. In some embodiments, the AF coil 524 may be oriented such that directions of current flow through the AF coil 524 define a plane that is substantially parallel to a surface of the fixed structure 514 (e.g., the surface on which the AF magnet 522 is mounted) and/or substantially parallel to the X-Y plane. The AF magnet 522 and the AF coil 524 may be located proximate one another, and the AF coil 524 may be electrically driven to magnetically interact with the AF magnet 522 to produce Lorentz forces that move the AF coil 524, the magnet holder 512, and/or the lens group 502 along an axis (e.g., along the X-axis) to provide AF movement. The AF magnet 522, being attached to the fixed structure 514, may remain stationary relative to the movement of the AF coil 524. In various embodiments, the AF VCM actuator 516 may be tucked within a space under a portion of the first prism 504, e.g., as indicated in FIG. 5B. In this manner, the impact of the AF VCM actuator 516 on the dimension of the system along the system X-axis and along the system Z-axis may be reduced or eliminated.

In some embodiments, the OIS-Y VCM actuator 518 and the OIS-X VCM actuator 520 may share one or more OIS magnets 526. In some embodiments, the shared OIS magnets 526 may be dual-pole magnets. The shared OIS magnets 526 may be attached to the magnet holder 512, e.g., at opposing sides of the lens group 502, as shown in FIGS. 5B and 5C.

According to some examples, the OIS-Y VCM actuator 518 may include one or more OIS-Y coils 528. The OIS-Y coils 528 may be attached to the fixed structure 514. In some embodiments, each OIS-Y coil 528 may be located below a respective shared OIS magnet 526. The OIS-Y coils 528 may be electrically driven to magnetically interact with the shared OIS magnets 526 to produce Lorentz forces that move the shared OIS magnets 526, the magnet holder 512, and/or the lens group 502 along an axis (e.g., along the Y-axis) to provide OIS-Y movement. The OIS-Y coils 528, being attached to the fixed structure 514, may remain stationary relative to the movement of the shared OIS magnets 526. In some embodiments, each of the shared OIS magnets 526 may have respective longest dimensions that are substantially parallel to respective longest dimensions of the OIS-Y coils 528. In some embodiments, the respective longest dimensions of the shared OIS magnets 526 and the OIS-Y coils 528 may be substantially parallel to a longest dimension of the system. Furthermore, the respective longest dimensions of the shared OIS magnets 526 and the OIS-Y coils 528 may be substantially orthogonal to the respective longest dimensions of the AF magnet 522 and the AF coil 524 in some embodiments. According to various embodiments, the OIS-Y coils 528 may be oriented such that directions of current flow through the OIS-Y coils 528 define a respective plane that is substantially parallel to a surface of the fixed structure 514 (e.g., the surface on which the OIS-Y coils 528 are mounted).

According to some examples, the OIS-X VCM actuator 520 may include one or more OIS-X coils 530. The OIS-X coils 530 may be attached to the lens barrel 508. In some embodiments, each OIS-X coil 530 may be located between a respective shared OIS magnet 526 and the lens group 502. The OIS-X coils 530 may be electrically driven to magnetically interact with the shared OIS magnets 526 to produce Lorentz forces that move the OIS-X coils 530, the lens barrel 508, and the lens group 502 along an axis (e.g., along the Z-axis), relative to the magnet holder 512 and/or the fixed structure 514, to provide OIS-X movement. In some embodiments, each of the shared OIS magnets 526 may have respective longest dimensions that are substantially parallel to respective longest dimensions of the OIS-X coils 530. In some embodiments, the respective longest dimensions of the shared OIS magnets 526 and the OIS-X coils 530 may be substantially parallel to a longest dimension of the system. Furthermore, the respective longest dimensions of the shared OIS magnets 526 and the OIS-X coils 530 may be substantially orthogonal to the respective longest dimensions of the AF magnet 522 and the AF coil 524 in some embodiments. According to various embodiments, the OIS-X coils 530 may be oriented such that directions of current flow through the OIS-X coils 530 define a respective plane that is substantially orthogonal to a surface of the fixed structure 514 (e.g., the surface on which the OIS-Y coils 528 are mounted).

Figure 6A:
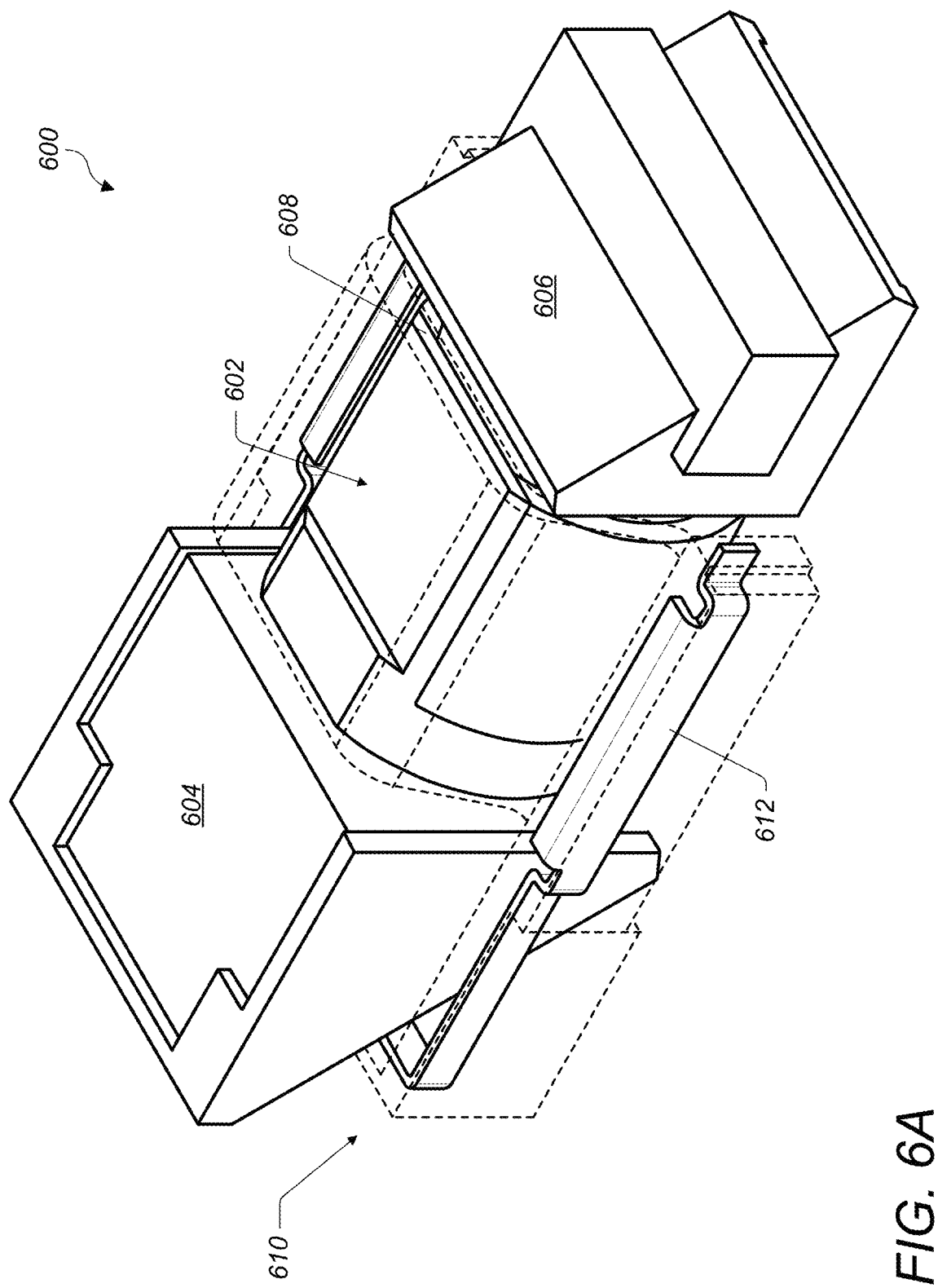
FIGS. 6A-6C each illustrate a respective view of still yet another example camera having a folded optics arrangement and an example actuator arrangement for shifting a lens group of the camera along multiple axes, in accordance with some embodiments.
Figure 6C:
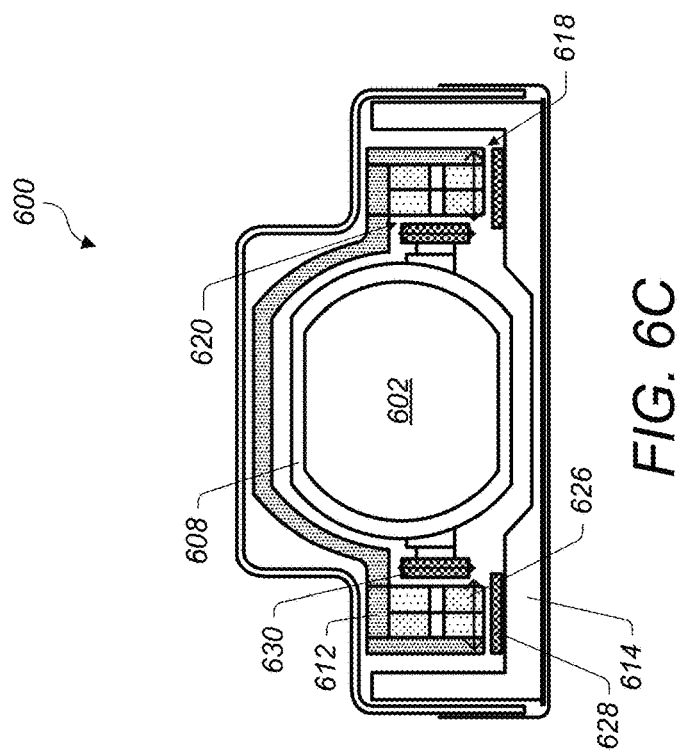
Figure 6B:
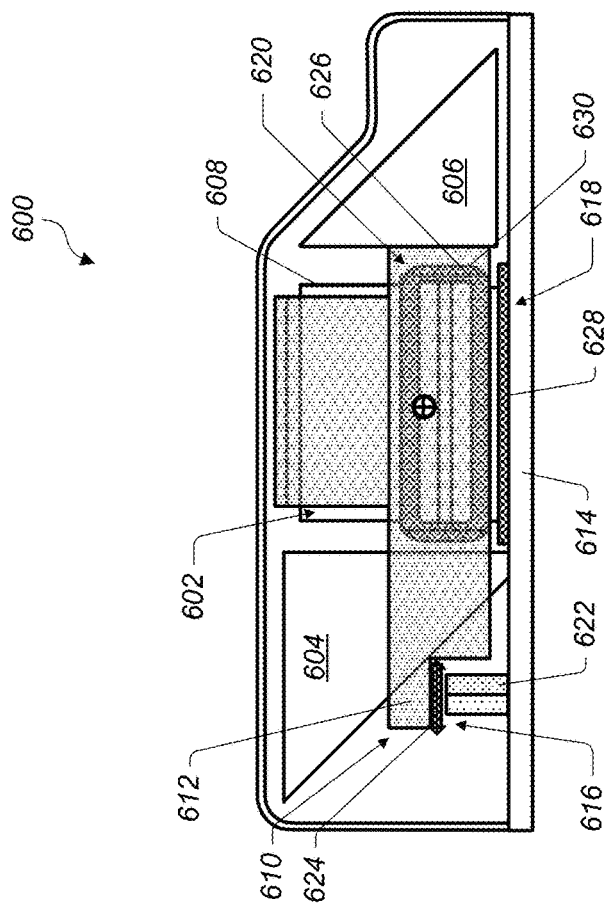

FIGS. 6A-6C each illustrate a respective view of still yet another example camera 600 having a folded optics arrangement and an example actuator arrangement for shifting a lens group of the camera 600 along multiple axes. FIG. 6A shows a perspective view of some structural components of the camera 600. FIG. 6B shows a schematic side cross-sectional view of the camera 600. FIG. 6C shows a schematic front cross-sectional view of the camera 600.

In some embodiments, the camera 600 may include a lens group 602, a first prism 604, and a second prism 606, and an image sensor (not shown). The lens group 602 may include one or more lens elements disposed within a lens barrel 608.

In various embodiments, the camera 600 may include an actuator module 610 that provides for shifting the lens group 602 along multiple axes, e.g., to provide AF and/or OIS movement. In some embodiments, the actuator module 610 may comprise a voice coil motor (VCM) actuator module that includes one or more VCM actuators. For instance, the actuator module 610 may include one or more magnets and one or more coils. The magnets and coils may magnetically interact (e.g., when electrical current is provided to the coils) to produce Lorentz forces that move the lens group 602.

According to various embodiments, the camera 600 may include a carrier arrangement that includes an inner carrier structure (e.g., the lens barrel 608 and/or a lens carrier) and an outer carrier structure (e.g., a magnet holder 612 and/or a magnet frame). One or more coils may be coupled to the inner carrier structure (e.g., to the lens barrel 608 and/or a lens carrier). Furthermore, one or more magnets may be coupled to the outer carrier structure (e.g., to the magnet holder 612). In some embodiments, the magnet holder 612 may extend at least partially around the first prism 604, the lens barrel 608 (and the lens group 602), and the second prism 606, e.g., as shown in FIGS. 6A-6C.

The magnet holder 612 may have multiple sides and/or portions. For example, the magnet holder 612 may have a first side, a second side, a third side, and a fourth side. The first side may be a lateral side extending along the X-axis and along the side surfaces of the optical elements. The second side may be a lateral side extending along the X-axis and along the opposite side surfaces of the optical elements. The third side may be a distal/object side extending along the Y-axis, and may be positioned behind at least a portion of the reflecting surface side of the first prism 604 (e.g., such that the first prism 604 is disposed between the lens group 602 and the magnet holder 612). The fourth side may be an upper side/portion extending above the lens group 602 and connecting the first side to the second side. In some embodiments, the fourth side may at least partially encompass an upper surface of the lens barrel 608 (and/or a lens carrier). Furthermore, in some embodiments, the fourth side may not encompass upper surfaces of the first prism 604 and/or the second prism 606. There may be gap between an upper surface of the lens barrel 608 (and/or a lens carrier). The gap may provide sufficient clearance to allow movement of the lens barrel 608 (and/or a lens carrier) along the Z-direction (e.g., to provide OIS-X movement).

According to some examples, a first portion of the magnet holder 612 (e.g., the first side of the magnet holder 612) may extend proximate a first side of the lens barrel 608, a second portion of the magnet holder 612 (e.g., the second side of the magnet holder 612) may extend proximate a second side of the lens barrel 608 that is opposite the first side of the lens barrel 608, a third portion of the magnet holder 612 (e.g., the third side of the magnet holder 612) may be tucked under a portion of the first prism 604, and a fourth portion of the magnet holder 612 (e.g., the fourth side of the magnet holder 612) may extend above the lens barrel 608 (e.g., from the first side of the lens barrel 608, over the top of the lens barrel 608, to the second side of the lens barrel 608). The fourth side/portion may provide structural support to the magnet holder 612. For example, by attaching a first end portion of the first side of the magnet holder 612 to a second end portion of the second side of the magnet holder 612, the fourth side may improve the structural integrity of the magnet holder 612, e.g., as compared to the three-sided magnet holders described above with reference to FIGS. 3A-4B. As will be discussed below with reference to FIGS. 9A-9D, the lens barrel 608 may be suspended from the magnet holder 612 via a suspension arrangement. Additionally, or alternatively, the magnet holder 612 may be suspended from a fixed structure 614 of the camera 600 via the suspension arrangement. The suspension arrangement may allow the lens barrel 608 to move relative to the magnet holder 612. Furthermore, the suspension arrangement may allow the lens barrel 608 to move together with the magnet holder 612 relative to the fixed structure 614.

In various embodiments, the actuator module 610 may include one or more AF VCM actuators and/or one or more OIS VCM actuators. In some embodiments, the actuator module 610 may include an AF VCM actuator 616 (e.g., to provide AF movement), an OIS-Y VCM actuator 618 (e.g., to provide OIS-Y movement), and an OIS-X VCM actuator 620 (e.g., to provide OIS-X movement).

The AF VCM actuator 616 may include one or more magnets and one or more coils. In some examples, the AF VCM actuator 616 may include an AF magnet 622 (e.g., a single-pole magnet) and an AF coil 624. The AF magnet 622 may be attached to the fixed structure 614. The AF coil 624 may be attached to the magnet holder 612. In some embodiments, the AF magnet 622 may have a longest dimension that is substantially parallel to a longest dimension of the AF coil 624. In some embodiments, the AF coil 624 may be oriented such that directions of current flow through the AF coil 624 define a plane that is substantially parallel to a surface of the fixed structure 614 (e.g., the surface on which the AF magnet 622 is mounted) and/or substantially parallel to the X-Y plane. The AF magnet 622 and the AF coil 624 may be located proximate one another, and the AF coil 624 may be electrically driven to magnetically interact with the AF magnet 622 to produce Lorentz forces that move the AF coil 624, the magnet holder 612, and/or the lens group 602 along an axis (e.g., along the X-axis) to provide AF movement. The AF magnet 622, being attached to the fixed structure 614, may remain stationary relative to the movement of the AF coil 624. In various embodiments, the AF VCM actuator 616 may be tucked within a space under a portion of the first prism 604, e.g., as indicated in FIG. 6B. In this manner, the impact of the AF VCM actuator 616 on the dimension of the system along the system X-axis and along the system Z-axis may be reduced or eliminated.

In some embodiments, the OIS-Y VCM actuator 618 and the OIS-X VCM actuator 620 may share one or more OIS magnets 626. In some embodiments, the shared OIS magnets 626 may be dual-pole magnets. The shared OIS magnets 626 may be attached to the magnet holder 612, e.g., at opposing sides of the lens group 602, as shown in FIGS. 6B and 6C.

According to some examples, the OIS-Y VCM actuator 618 may include one or more OIS-Y coils 628. The OIS-Y coils 628 may be attached to the fixed structure 614. In some embodiments, each OIS-Y coil 628 may be located below a respective shared OIS magnet 626. The OIS-Y coils 628 may be electrically driven to magnetically interact with the shared OIS magnets 626 to produce Lorentz forces that move the shared OIS magnets 626, the magnet holder 612, and/or the lens group 602 along an axis (e.g., along the Y-axis) to provide OIS-Y movement. The OIS-Y coils 628, being attached to the fixed structure 614, may remain stationary relative to the movement of the shared OIS magnets 626. In some embodiments, each of the shared OIS magnets 626 may have respective longest dimensions that are substantially parallel to respective longest dimensions of the OIS-Y coils 628. In some embodiments, the respective longest dimensions of the shared OIS magnets 626 and the OIS-Y coils 628 may be substantially parallel to a longest dimension of the system. Furthermore, the respective longest dimensions of the shared OIS magnets 626 and the OIS-Y coils 628 may be substantially orthogonal to the respective longest dimensions of the AF magnet 622 and the AF coil 624 in some embodiments. According to various embodiments, the OIS-Y coils 628 may be oriented such that directions of current flow through the OIS-Y coils 628 define a respective plane that is substantially parallel to a surface of the fixed structure 614 (e.g., the surface on which the OIS-Y coils 628 are mounted).

According to some examples, the OIS-X VCM actuator 620 may include one or more OIS-X coils 630. The OIS-X coils 630 may be attached to the lens barrel 608. In some embodiments, each OIS-X coil 630 may be located between a respective shared OIS magnet 626 and the lens group 602. The OIS-X coils 630 may be electrically driven to magnetically interact with the shared OIS magnets 626 to produce Lorentz forces that move the OIS-X coils 630, the lens barrel 608, and the lens group 602 along an axis (e.g., along the Z-axis), relative to the magnet holder 612 and/or the fixed structure 614, to provide OIS-X movement. In some embodiments, each of the shared OIS magnets 626 may have respective longest dimensions that are substantially parallel to respective longest dimensions of the OIS-X coils 630. In some embodiments, the respective longest dimensions of the shared OIS magnets 626 and the OIS-X coils 630 may be substantially parallel to a longest dimension of the system. Furthermore, the respective longest dimensions of the shared OIS magnets 626 and the OIS-X coils 630 may be substantially orthogonal to the respective longest dimensions of the AF magnet 622 and the AF coil 624 in some embodiments. According to various embodiments, the OIS-X coils 630 may be oriented such that directions of current flow through the OIS-X coils 630 define a respective plane that is substantially orthogonal to a surface of the fixed structure 614 (e.g., the surface on which the OIS-Y coils 628 are mounted).

FIGS. 7A-7B each illustrate a respective view of still yet another example camera 700 having a folded optics arrangement and an example actuator arrangement for shifting a lens group of the camera 700 along multiple axes. FIG. 7A shows a schematic side cross-sectional view of the camera 700. FIG. 7B shows a schematic front cross-sectional view of the camera 700.

In some embodiments, the camera 700 may include a lens group 702, a first prism 704, and a second prism 706, and an image sensor (not shown). The lens group 702 may include one or more lens elements disposed within a lens barrel 708. Furthermore, in various embodiments the camera 700 may include a lens carrier 710 configured to hold the lens barrel 708 and/or the lens group 702.

In various embodiments, the camera 700 may include an actuator module 712 that provides for shifting the lens group 702 along multiple axes, e.g., to provide AF and/or OIS movement. In some embodiments, the actuator module 712 may comprise a voice coil motor (VCM) actuator module that includes one or more VCM actuators. For instance, the actuator module 712 may include one or more magnets and one or more coils. The magnets and coils may magnetically interact (e.g., when electrical current is provided to the coils) to produce Lorentz forces that move the lens group 702.

According to various embodiments, the camera 700 may include a carrier arrangement that includes an inner carrier structure (e.g., the lens carrier 710 and/or the lens barrel 708) and an outer carrier structure (e.g., a magnet holder 714 and/or a magnet frame). As indicated in FIG. 7, instead of having a single component (e.g., a lens barrel) that holds the lens element(s) of the lens group 702, the camera 700 may include multiple components (e.g., the lens barrel 708 in which one or more lens elements of the lens group 702 may be fixed, the lens carrier 710 that holds the lens barrel 708, etc.) that collectively holds the lens group 702 and one or more portions (e.g., one or more coils) of the actuator module 712, and that collectively couples with the magnet holder 714 (e.g., via suspension elements). The lens carrier 710 may be further subdivided into individual connected components in some embodiments. One or more coils may be coupled to the inner carrier structure (e.g., to the lens carrier 710). Furthermore, one or more magnets may be coupled to the outer carrier structure (e.g., to the magnet holder 714). In some embodiments, the magnet holder 714 may extend at least partially around the first prism 704, at least partially around the lens carrier 710 (and the lens group 702), and/or at least partially around the second prism 706. For instance, as shown in FIGS. 7A-7B, the magnet holder 714 may extend at least partially around the lens carrier 710 and the first prism 704. The magnet holder 714 may be U-shaped in some embodiments.

The magnet holder 714 may have multiple sides. For example, the magnet holder 714 may have a first side, a second side, and a third side, e.g., similar to the sides of the magnet holder 314 described above with reference to FIGS. 3A-3C. According to some examples, a first portion of the magnet holder 714 (e.g., the first side of the magnet holder 714) may extend proximate a first side of the lens carrier 710, a second portion of the magnet holder 714 (e.g., the second side of the magnet holder 714) may extend proximate a second side of the lens carrier 710 that is opposite the first side of the lens carrier 710, and a third portion of the magnet holder 714 (e.g., the third side of the magnet holder 714) may be tucked under a portion of the first prism 704 and may extend from the first portion to the second portion, e.g., as shown in FIGS. 7A-7B. As will be discussed below with reference to FIGS. 9A-9D, the lens carrier 710 may be suspended from the magnet holder 714 via a suspension arrangement. Additionally, or alternatively, the magnet holder 714 may be suspended from a fixed structure 716 of the camera 700 via the suspension arrangement. The suspension arrangement may allow the lens carrier 710 to move relative to the magnet holder 714. Furthermore, the suspension arrangement may allow the lens carrier 710 to move together with the magnet holder 714 relative to the fixed structure 716.

In various embodiments, the actuator module 712 may include one or more AF VCM actuators and/or one or more OIS VCM actuators. In some embodiments, the actuator module 712 may include an AF VCM actuator 718 (e.g., to provide AF movement), an OIS-Y VCM actuator 720 (e.g., to provide OIS-Y movement), and an OIS-X VCM actuator 722 (e.g., to provide OIS-X movement).

The AF VCM actuator 718 may include one or more magnets and one or more coils. In some examples, the AF VCM actuator 718 may include an AF magnet 724 (e.g., a single-pole magnet) and an AF coil 726. The AF magnet 724 may be attached to the fixed structure 716. The AF coil 726 may be attached to the magnet holder 714. In some embodiments, the AF magnet 724 may have a longest dimension that is substantially parallel to a longest dimension of the AF coil 726. In some embodiments, the AF coil 726 may be oriented such that directions of current flow through the AF coil 726 define a plane that is substantially parallel to a surface of the fixed structure 716 (e.g., the surface on which the AF magnet 724 is mounted) and/or substantially parallel to the X-Y plane. The AF magnet 724 and the AF coil 726 may be located proximate one another, and the AF coil 726 may be electrically driven to magnetically interact with the AF magnet 724 to produce Lorentz forces that move the AF coil 726, the magnet holder 714, and/or the lens group 702 along an axis (e.g., along the X-axis) to provide AF movement. The AF magnet 724, being attached to the fixed structure 716, may remain stationary relative to the movement of the AF coil 726. In various embodiments, the AF VCM actuator 718 may be tucked within a space under a portion of the first prism 704, e.g., as indicated in FIG. 7A. In this manner, the impact of the AF VCM actuator 718 on the dimension of the system along the system X-axis and along the system Z-axis may be reduced or eliminated.

In some embodiments, the OIS-Y VCM actuator 720 and the OIS-X VCM actuator 722 may share one or more OIS magnets 728. In some embodiments, the shared OIS magnets 728 may be dual-pole magnets. The shared OIS magnets 728 may be attached to the magnet holder 714, e.g., at opposing sides of the lens group 702, as shown in FIGS. 7A and 7B.

According to some examples, the OIS-Y VCM actuator 720 may include one or more OIS-Y coils 730. The OIS-Y coils 730 may be attached to the fixed structure 716. In some embodiments, each OIS-Y coil 730 may be located below a respective shared OIS magnet 728. The OIS-Y coils 730 may be electrically driven to magnetically interact with the shared OIS magnets 728 to produce Lorentz forces that move the shared OIS magnets 728, the magnet holder 714, and/or the lens group 702 along an axis (e.g., along the Y-axis) to provide OIS-Y movement. The OIS-Y coils 730, being attached to the fixed structure 716, may remain stationary relative to the movement of the shared OIS magnets 728. In some embodiments, each of the shared OIS magnets 728 may have respective longest dimensions that are substantially parallel to respective longest dimensions of the OIS-Y coils 730. In some embodiments, the respective longest dimensions of the shared OIS magnets 728 and the OIS-Y coils 730 may be substantially parallel to a longest dimension of the system. Furthermore, the respective longest dimensions of the shared OIS magnets 728 and the OIS-Y coils 730 may be substantially orthogonal to the respective longest dimensions of the AF magnet 724 and the AF coil 726 in some embodiments. According to various embodiments, the OIS-Y coils 730 may be oriented such that directions of current flow through the OIS-Y coils 730 define a respective plane that is substantially parallel to a surface of the fixed structure 716 (e.g., the surface on which the OIS-Y coils 730 are mounted).

According to some examples, the OIS-X VCM actuator 722 may include one or more OIS-X coils 732. The OIS-X coils 732 may be attached to the lens carrier 710. In some embodiments, each OIS-X coil 732 may be located between a respective shared OIS magnet 728 and the lens group 702. The OIS-X coils 732 may be electrically driven to magnetically interact with the shared OIS magnets 728 to produce Lorentz forces that move the OIS-X coils 732, the lens carrier 710, and the lens group 702 along an axis (e.g., along the Z-axis), relative to the magnet holder 714 and/or the fixed structure 716, to provide OIS-X movement. In some embodiments, each of the shared OIS magnets 728 may have respective longest dimensions that are substantially parallel to respective longest dimensions of the OIS-X coils 732. In some embodiments, the respective longest dimensions of the shared OIS magnets 728 and the OIS-X coils 732 may be substantially parallel to a longest dimension of the system. Furthermore, the respective longest dimensions of the shared OIS magnets 728 and the OIS-X coils 732 may be substantially orthogonal to the respective longest dimensions of the AF magnet 724 and the AF coil 726 in some embodiments. According to various embodiments, the OIS-X coils 732 may be oriented such that directions of current flow through the OIS-X coils 732 define a respective plane that is substantially orthogonal to a surface of the fixed structure 716 (e.g., the surface on which the OIS-Y coils 730 are mounted).

Figure 8A:
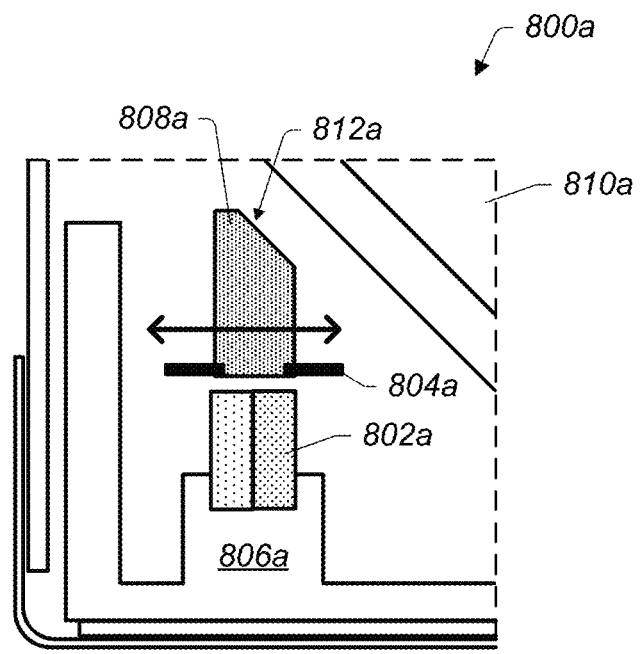
FIG. 8A illustrates an example autofocus (AF) actuator, e.g., for a camera having a folded optics arrangement, in accordance with some embodiments.

FIG. 8A illustrates an example autofocus (AF) actuator 800*a*, e.g., for a camera having a folded optics arrangement. According to some embodiments, the AF actuator 800*a* may be a voice coil motor (VCM) actuator. For instance, the AF actuator 800*a* may include a single-pole magnet 802*a* and a coil 804*a*. The single-pole magnet 802*a* may be attached to a fixed structure 806*a* of the camera. The coil 804*a* may be attached to a magnet holder 808*a* of the camera. In various embodiments, the AF actuator 800*a* may be tucked within a space under a portion of a first prism 810*a*, e.g., as indicated in FIG. 8A. In some examples, the magnet holder 808*a* may have a portion 812*a* that faces the first prism 810*a* and that is shaped (e.g., chamfered, beveled, etc.) to reduce space consumed by the magnet holder 808*a* under the first prism 810*a*. The shape of the portion 812*a* may allow the magnet holder 808*a* to have an increased range of movement under the first prism 810*a* and/or may reduce the likelihood of contact between the magnet holder 808*a* and the first prism 810*a*.

In some embodiments, the magnet 802*a* may have a longest dimension (e.g., along the Y-axis) that is substantially parallel to a longest dimension of the coil 804*a*. The coil 804*a* may be oriented such that directions of current flow through the coil 804*a* define a plane that is substantially parallel to a surface of the fixed structure 806*a* (e.g., the surface on which the magnet 802*a* is mounted) and/or substantially parallel to the X-Y plane. The coil 804*a* may be located above the magnet 802*a*. Furthermore, the magnet 802*a* and the coil 804*a* may be located proximate one another, and the coil 804*a* may be electrically driven to magnetically interact with the magnet 802*a* to produce Lorentz forces that move the coil 804*a*, the magnet holder 808*a*, and/or the lens group along an axis (e.g., along the X-axis) to provide AF movement.

Figure 8B:
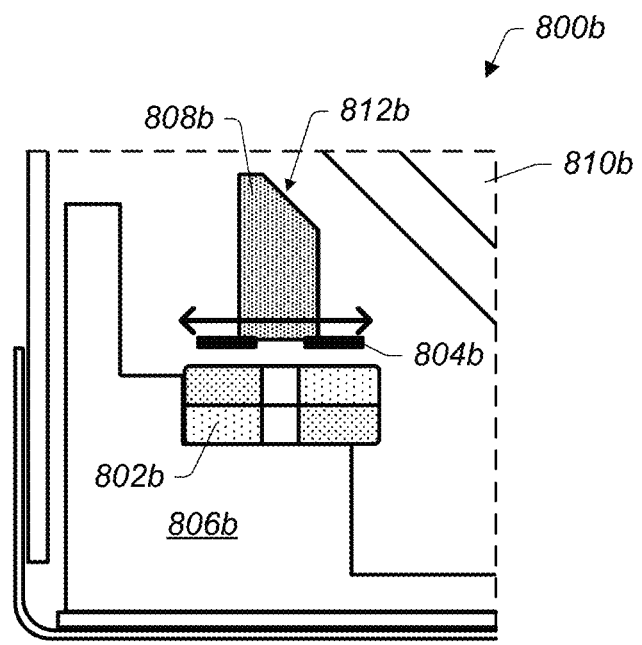
FIG. 8B illustrates another example AF actuator, e.g., for a camera having a folded optics arrangement, in accordance with some embodiments.

FIG. 8B illustrates another example AF actuator 800*b*, e.g., for a camera having a folded optics arrangement. According to some embodiments, the AF actuator 800*b* may be a voice coil motor (VCM) actuator. For instance, the AF actuator 800*b* may include a dual-pole magnet 802*b* and a coil 804*b*. The dual-pole magnet 802*b* may be attached to a fixed structure 806*b* of the camera. The coil 804*b* may be attached to a magnet holder 808*b* of the camera. In various embodiments, the AF actuator 800*b* may be tucked within a space under a portion of a first prism 810*b*, e.g., as indicated in FIG. 8B. In some examples, the magnet holder 808*b* may have a portion 812*b* that faces the first prism 810*b* and that is shaped (e.g., chamfered, beveled, etc.) to reduce space consumed by the magnet holder 808*b* under the first prism 810*b*. The shape of the portion 812*b* may allow the magnet holder 808*b* to have an increased range of movement under the first prism 810b and/or may reduce the likelihood of contact between the magnet holder 808b and the first prism 810b.

In some embodiments, the magnet 802b may have a longest dimension (e.g., along the Y-axis) that is substantially parallel to a longest dimension of the coil 804b. The coil 804b may be oriented such that directions of current flow through the coil 804b define a plane that is substantially parallel to a surface of the fixed structure 806b (e.g., the surface on which the magnet 802b is mounted) and/or substantially parallel to the X-Y plane. The coil 804b may be located above the magnet 802b. Furthermore, the magnet 802b and the coil 804b may be located proximate one another, and the coil 804b may be electrically driven to magnetically interact with the magnet 802b to produce Lorentz forces that move the coil 804b, the magnet holder 808b, and/or the lens group along an axis (e.g., along the X-axis) to provide AF movement.

Figure 9A:
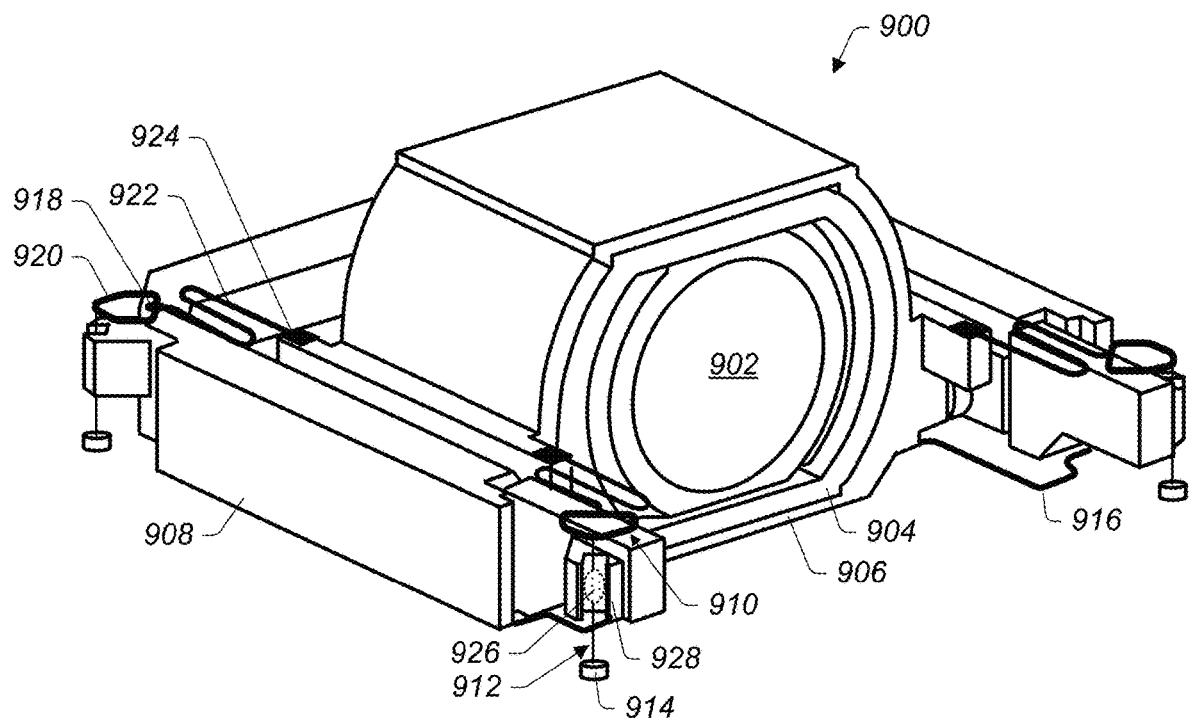
FIGS. 9A-9D each illustrate a respective view of an example suspension arrangement for a camera having a folded optics arrangement, in accordance with some embodiments.
Figure 9B:
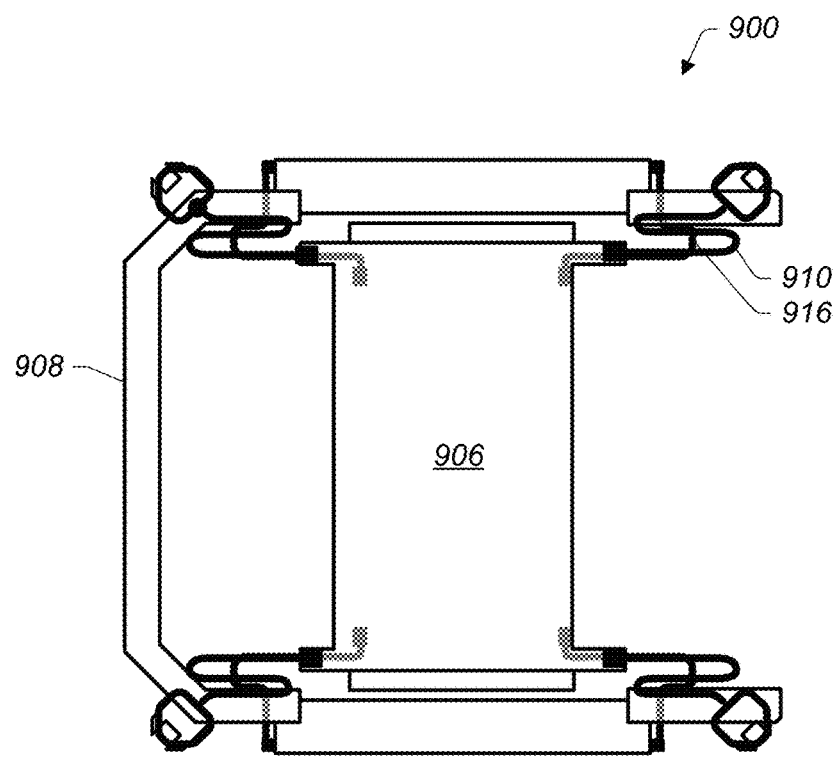
Figure 9C:
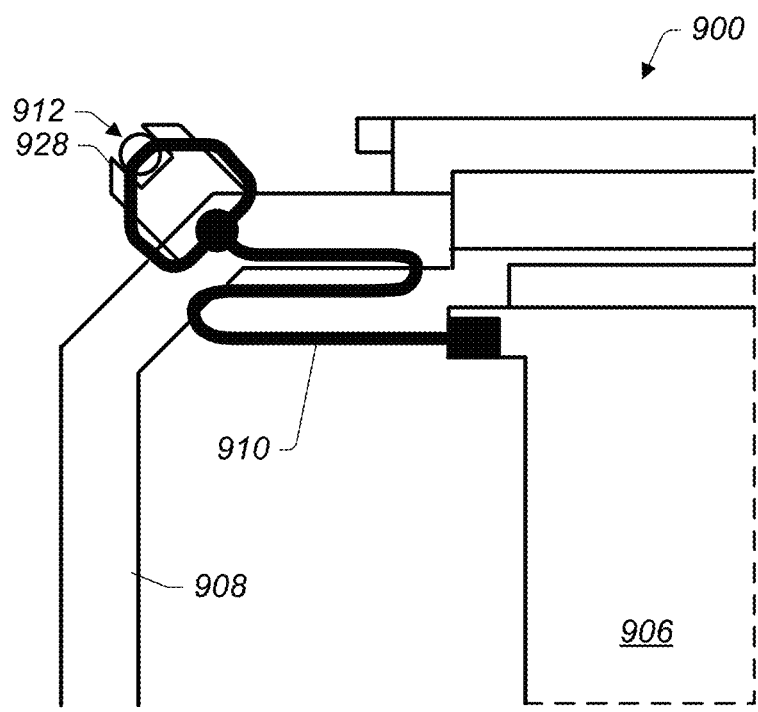
Figure 9D:
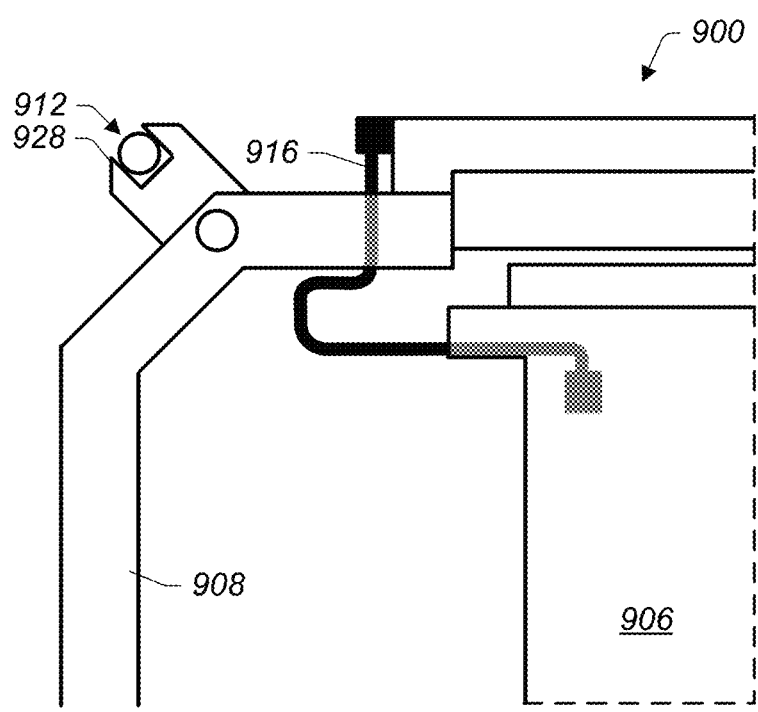

FIGS. 9A-9D each illustrates a respective view of an example suspension arrangement 900 for a camera having a folded optics arrangement. FIG. 9A shows a perspective view of the suspension arrangement 900. FIG. 9B shows a top view of the suspension arrangement 900. FIG. 9C shows a top detail view of a portion of the suspension arrangement 900. FIG. 9D shows a bottom detail view of a portion of the suspension arrangement 900.

In some embodiments, the camera may include a lens group 902, e.g., between two prisms as discussed above with reference to FIGS. 1 and 3A-7B. The lens group 902 may include one or more lens elements disposed within a lens barrel 904. Furthermore, in various embodiments, the camera may include a lens carrier 906 configured to hold the lens barrel 904 and/or the lens group 902. For instance, the lens carrier 906 may at least partially surround the lens barrel 904 in some embodiments.

In various embodiments, the lens carrier 906 (and/or lens barrel 904) may be suspended from a magnet holder 908 via the suspension arrangement 900. Additionally, or alternatively, the magnet holder 908 may be suspended from a fixed structure (not shown) via the suspension arrangement 900. The suspension arrangement 900 may allow the lens carrier 906 to move relative to the magnet holder 908. Furthermore, the suspension arrangement 900 may allow the lens carrier 906 to move together with the magnet holder 908 relative to the fixed structure.

According to some embodiments, the suspension arrangement 900 may include a set of one or more top springs 910 (not shown in FIG. 9D) attached to respective top corner portions of the magnet holder 908 and the lens carrier 906. For instance, FIGS. 9A-9B show four top springs 910, each of which includes a respective first end that is attached to a respective corner portion of the magnet holder 908, and a second end that is attached to a corresponding corner portion of the lens carrier 906 (e.g., a corner portion of the lens carrier 906 that is located proximate the respective corner portion of the magnet holder 908). Furthermore, a respective suspension wire 912 may extend downward from each of the top springs 910. A bottom end portion 914 of the respective suspension wire 912 may be attached to a fixed (or static) structure, e.g., a fixed base structure of the camera. In various embodiments, any number of the top springs 910 may be connected such that they form a single piece of material having individual portions that can independently flex. Reducing the number of individual pieces in this manner may be desirable from a manufacturing standpoint.

According to some embodiments, the suspension arrangement 900 may include a set of one or more bottom springs 916 (not shown in FIG. 9C) attached to respective bottom corner portions of the magnet holder 908 and the lens carrier 906. For instance, FIGS. 9A-9B show four bottom springs 916, each of which includes a respective first end that is attached to a respective corner portion of the magnet holder 908, and a second end that is attached to a corresponding corner portion of the lens carrier 906. In some embodiments, a respective suspension wire (not shown) may extend upward from each of the bottom springs 916. A top end portion of the respective suspension wire may be attached to a fixed structure of the camera.

In some embodiments one or more suspension elements used for suspending the magnet holder 908 may be decoupled from one or more suspension elements used for suspending the lens carrier 906. For example, as indicated in FIG. 9A, the top spring 910 may have a fixed portion 918 that is fixed relative to the magnet holder 908. The top spring 910 may have a first portion 920 that can flex relative to the magnet holder 908 and that is connected to the suspension wire 912 for suspending the magnet holder 908. Furthermore, the top spring 910 may have a second portion 922 that can independently flex relative to the magnet holder 908 and that is connected to the lens carrier 906 (e.g., at fixed portion 924 that is fixed relative to the lens carrier 906) for suspending the lens carrier 906. In some embodiments, the first portion 920 and the second portion 922 may be made from separate pieces of material.

In some embodiments, one or more of the top springs 910 and/or one or more of the bottom springs 916 may not be positioned at corners of the magnet holder 908 and/or the lens carrier 906. For example, one or more of the springs may be positioned along sides of the magnet holder 908 and/or the lens carrier 906. Furthermore, the top springs 910 and/or the bottom springs 916 may have more (or fewer) than four springs. In some embodiments, the top springs 910 may have the same number of springs as the bottom springs 916. In other embodiments, the top springs 910 may have a different number of springs than the bottom springs 916.

In some embodiments, one or more lens elements of the lens group 902 may define an optical axis that is substantially parallel to a plane defined by the set of top springs 910. Additionally, or alternatively, the optical axis may be substantially parallel to a plane defined by the set of bottom springs 916. Furthermore, a plane defined by the set of top springs 910 may be substantially parallel to a plane defined by the set of bottom springs 916. In some instances, the suspension wires 912 may extend in directions that are substantially orthogonal to the optical axis, a plane defined by the set of top springs 910, and/or a plane defined by the set of bottom springs 916.

In various embodiments, the suspension arrangement 900 may provide compliance and/or stiffness for controlled movement of the lens carrier 906 and/or the magnet holder 908. According to some examples, the suspension wires 912 may flex to allow controlled AF movement (e.g., along the X-axis) and/or OIS-Y movement (e.g., along the Y-axis) of the magnet holder 908 together with the lens carrier 906. In some instances, e.g., during such AF and/or OIS-Y movement, the set of top springs 910 and/or the set of bottom springs 916 may not flex (or may flex substantially less than the suspension wires 912). In various embodiments, the suspension wires 912 may provide compliance for such AF and/or OIS-Y movement in a controlled manner, and may provide sufficient stiffness to resist X-Y plane movement of the lens carrier (and the lens group 102) during OIS-X movement. According to some examples, the set of top springs 910 and/or the set of bottom springs 916 may flex to allow controlled OIS-X movement (e.g., the Z-axis) of the lens carrier 906 relative to the magnet holder 908. In some instances, e.g., during such OIS-X movement, the suspension wires 912 may not flex (or may flex substantially less than the set of top springs 910 and/or the set of bottom springs 916). In various embodiments, the top springs 910 and/or the bottom springs 916 may provide compliance for such OIS-X movement in a controlled manner, and may provide sufficient stiffness to resist Z-axis movement of the lens carrier 906 (and the lens group 902) during OIS-Y and/or AF movement.

In some embodiments, the camera and/or the suspension arrangement 900 may include a damper that dampens movement of one or more of the suspension wires 912. For instance, the suspension wires 912 may be at least partially disposed within a viscoelastic material 926 (e.g., a viscoelastic gel). In some examples, one or more protrusions 928 may protrude from the magnet holder 908 and form one or more pockets within which the viscoelastic material 926 may be disposed. In some instances, the viscoelastic material 926 may be injected into a pocket through a hole in a base structure (not shown) that at least partially surrounds the magnet holder 908. For example, an insertion needle (not shown) may be inserted through the hole in the base structure to access the pocket and inject the viscoelastic material 926 into the pocket. In some embodiments, the protrusions 928 may extend from corner portions of the magnet holder 908, e.g., as shown in FIG. 9A. While FIG. 9A shows protrusions 928 that form pockets configured to contain, at least in part, the viscoelastic material 926, it should be understood that the viscoelastic material 926 may be disposed within pockets formed differently, e.g., via pockets formed of protrusions from a structure other than the magnet holder 908, pockets formed via a combination of the magnet holder 908 and one or more other structures, etc. The viscoelastic material 926 may be located along any portion(s) of the length of a suspension wire 912. In some embodiments, the viscoelastic material 926 may be located along a central portion of the length of a suspension wire 912.

In various embodiments, the suspension arrangement 900 may be used to carry signals (e.g., power and/or control signals) from the fixed structure of the camera to the magnet holder 908 and/or the lens carrier 906. For example, suspension wires 912 may carry the signals from the fixed structure to top springs 910. The top springs 910 may carry the signals (e.g., via first portion 920 and fixed portion 918) from the suspension wires 912 to the magnet holder 908, and the signals may be routed to one or more coils attached to the magnet holder 908. Additionally, or alternatively, the top springs 910 may carry the signals (e.g., via second portion 922 and fixed portion 924) from the suspension wires 912 to the lens carrier 906, and the signals may be routed to one or more coils attached to the lens carrier 906. Various portions of the suspension arrangement, the magnet holder 908, and/or the lens carrier 906 may be formed of electrically conductive material and/or may include electrical traces for carrying/routing the signals, e.g., from the fixed structure to the coils.

Figure 10A:
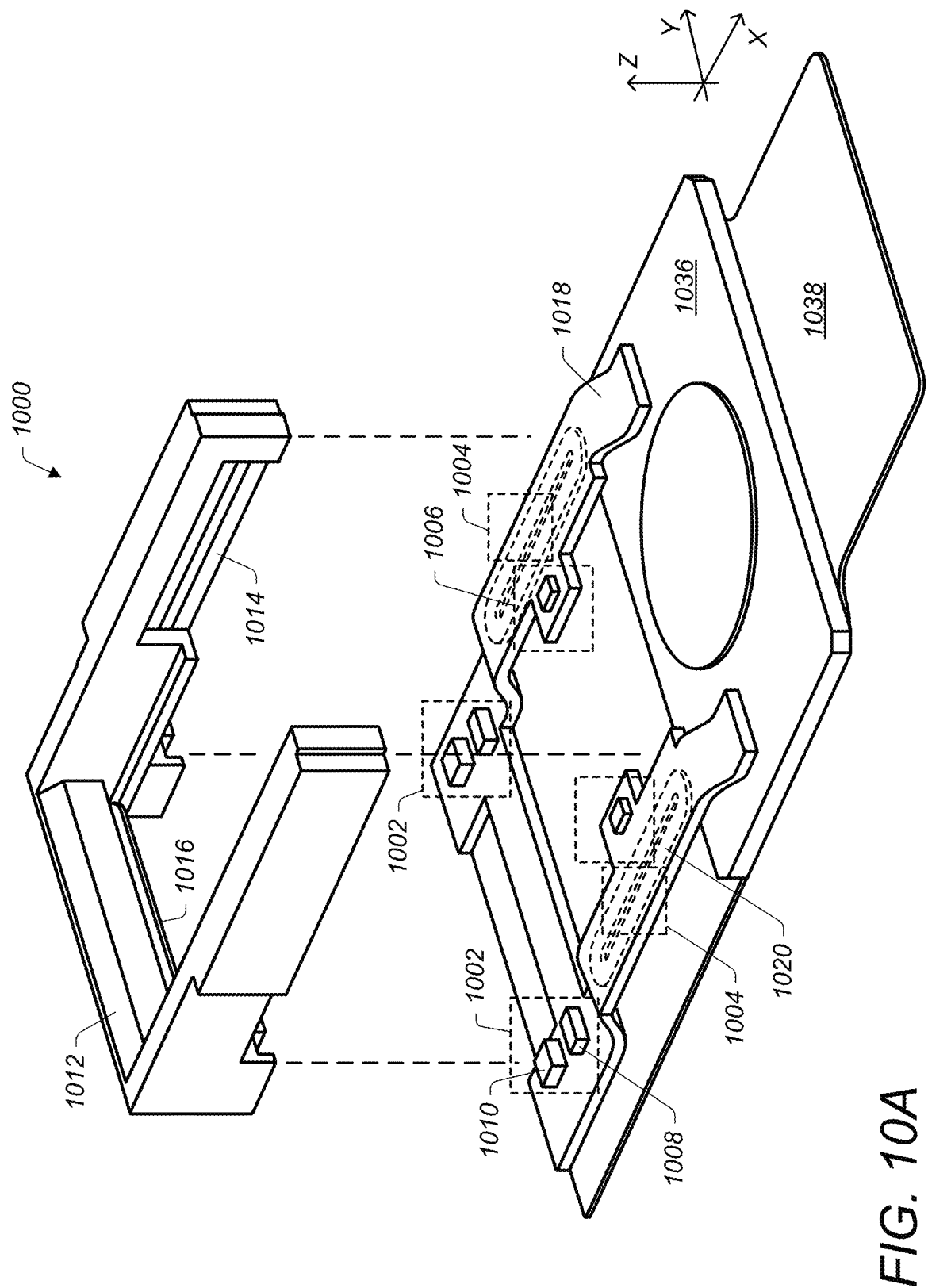
FIGS. 10A-10E each illustrate a respective view of an example position sensor arrangement for a camera having a folded optics arrangement, in accordance with some embodiments.
Figure 10B:
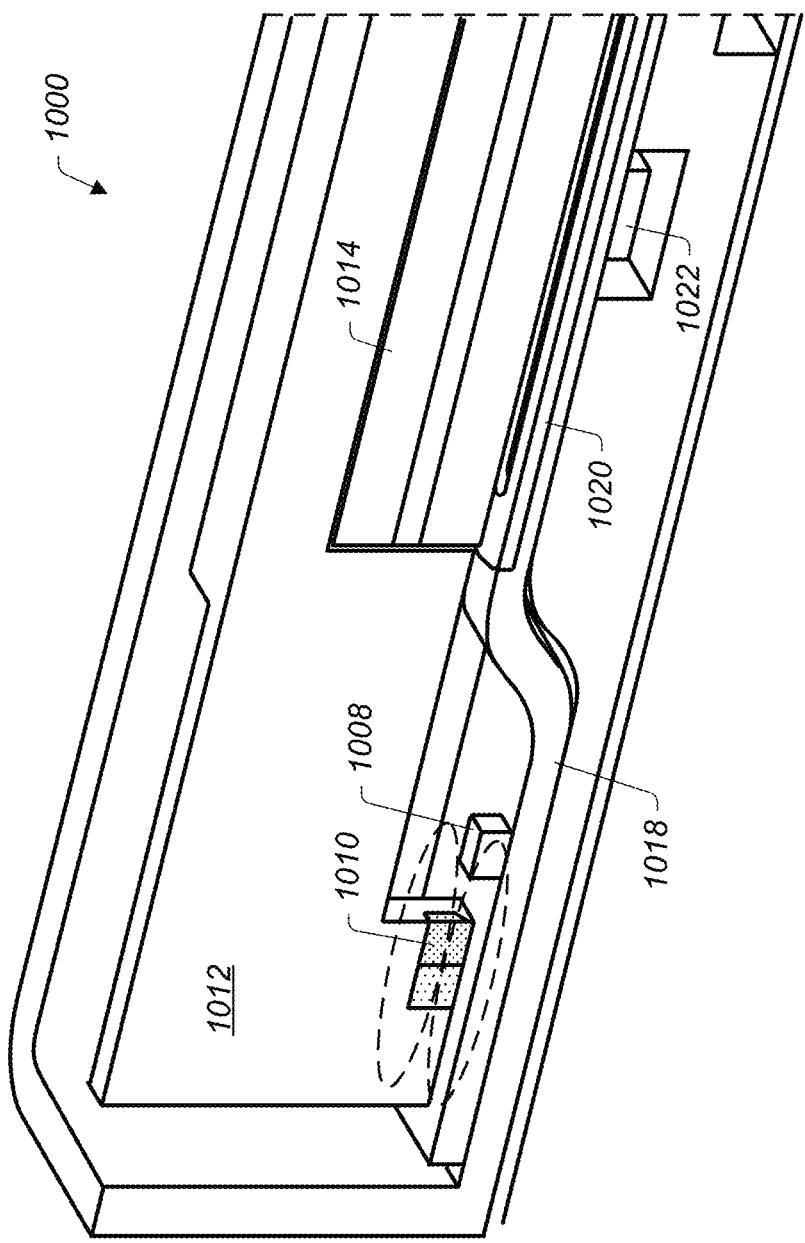
Figure 10C:
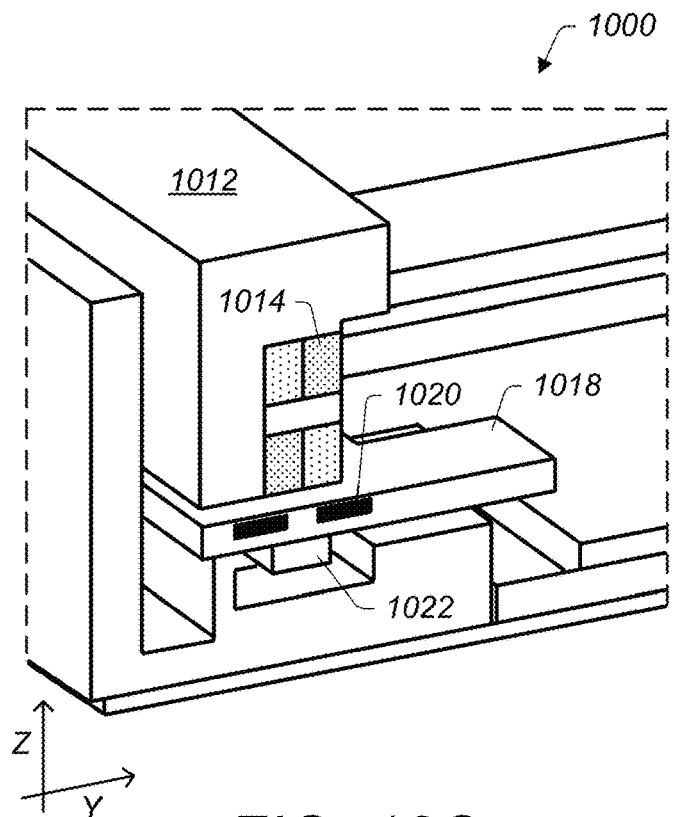
Figure 10D:
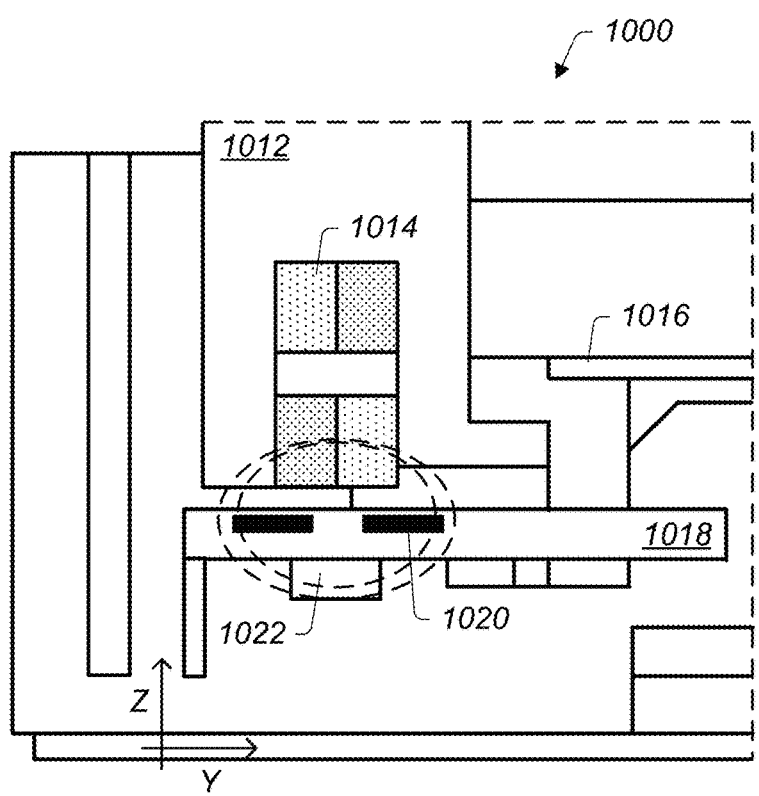
Figure 10E:
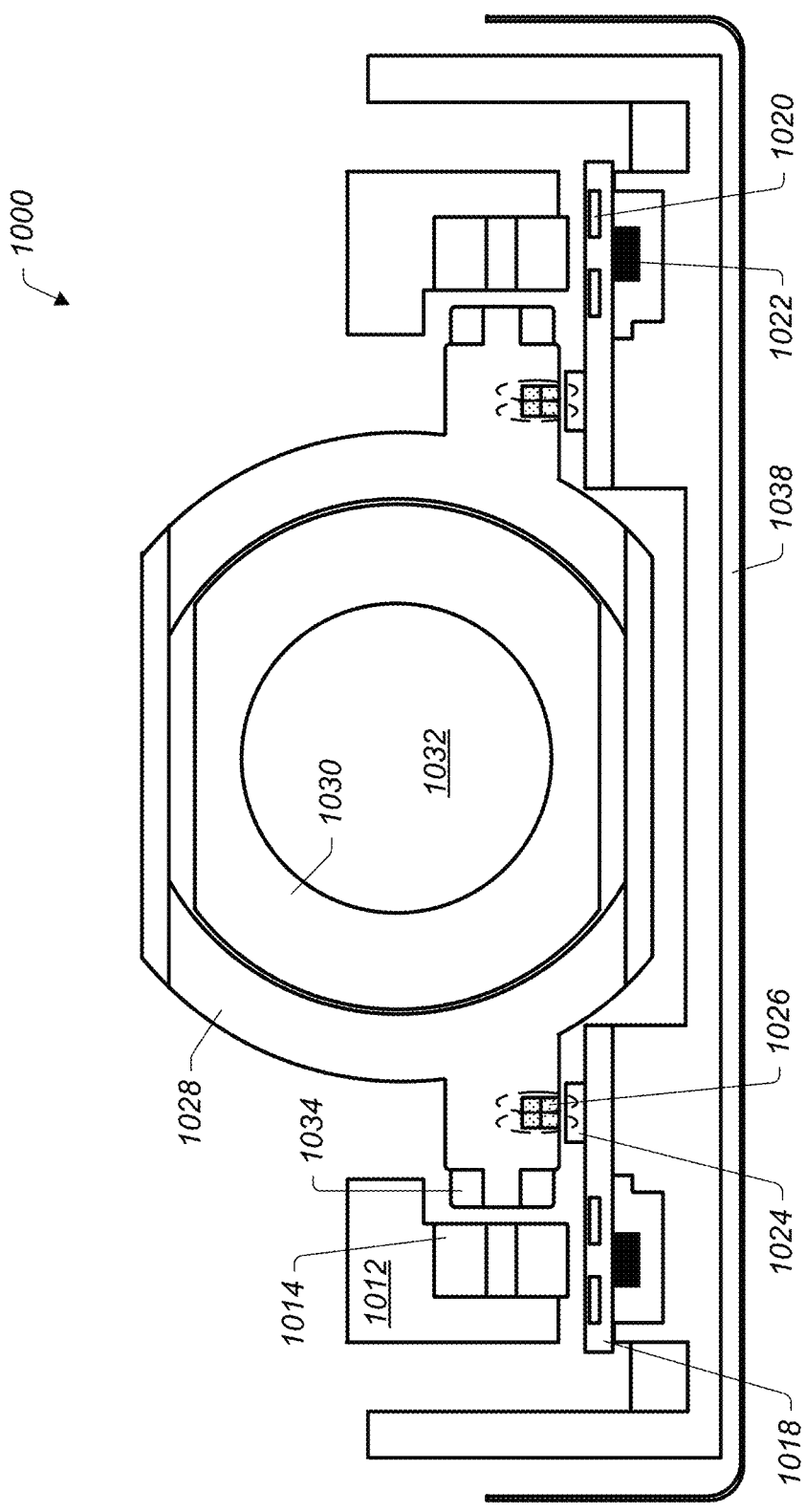

FIGS. 10A-10E each illustrates a respective view of an example position sensor arrangement 1000 for a camera having a folded optics arrangement. FIG. 10A shows a perspective view of the position sensor arrangement 1000. The position sensor arrangement 1000 may include position sensors for position sensing with respect to AF movement, OIS-Y movement, and OIS-X movement. FIG. 10B shows a detail view that focuses on position sensing with respect to AF movement. FIGS. 10C-10D each shows a respective detail view that focuses on position sensing with respect to OIS-Y movement. FIG. 10E shows a detail view that focuses on position sensing with respect to OIS-X movement.

According to various embodiments, the position sensor arrangement 1000 may include an AF movement position sensor arrangement 1002, an OIS-Y movement position sensor arrangement 1004, and/or an OIS-X movement position sensor arrangement 1006.

In some embodiments, the AF movement position sensor arrangement 1002 may include one or more AF position sensors 1008 and one or more corresponding AF probe magnets 1010. The AF position sensors 1008 may be magnetic field sensors (e.g., Hall sensors, tunneling magnetoresistance (TMR) sensors, giant magnetoresistance (GMR) sensors, etc.) in various embodiments. An AF position sensor 1008 may be disposed proximate a corresponding AF probe magnet 1010 such that the AF position sensor 1008 is capable of sensing one or more magnetic field components of the corresponding AF probe magnet 1010, e.g., as the AF probe magnet 1010 moves relative to the AF position sensor 1008.

In some examples, the AF probe magnet 1010 may be attached to a magnet holder 1012. The magnet holder 1012 may be configured to hold one or more magnets (e.g., shared OIS magnets 1014). Furthermore, the magnet holder 1012 may be configured to hold one or more coils (e.g., AF coil 1016). In some embodiments, the AF position sensor 1008 may be attached to a fixed (or static) structure of the camera. For instance, the fixed structure may be a flex circuit 1018 that is common to (or shared by) some or all of the position sensors of the position sensor arrangement 1000. That is, some or all of the position sensors of the position sensor arrangement 1000 may be attached to the flex circuit 1018. Additionally, or alternatively, the flex circuit 1018 may include one or more coils (e.g., OIS-Y coils 1020).

In various embodiments, the AF movement position sensor arrangement 1002 may include two AF position sensors 1008 and two corresponding AF probe magnets 1010. A first AF position sensor 1008 and a first corresponding AF probe magnet 1010 may form a first pair. A second AF position sensor 1008 and a second corresponding AF probe magnet 1010 may form a second pair that is opposite the first pair with respect to the system X-axis, e.g., as indicated in FIG. 10A. By having two such pairs, rotation about the system Z-axis due to system X-axis displacement may be cancelled out in some embodiments.

In some embodiments, the OIS-Y movement position sensor arrangement 1004 may include one or more OIS-Y position sensors 1022. The OIS-Y position sensors 1022 may be magnetic field sensors (e.g., Hall sensors, TMR sensors, GMR sensors, etc.) in various embodiments. An OIS-Y position sensor 1022 may be disposed proximate a corresponding shared OIS magnet 1014 (e.g., a dual-pole magnet) such that the OIS-Y position sensor 1022 is capable of sensing one or more magnetic field components of the corresponding shared OIS magnet 1014, e.g., as the shared OIS magnet 1014 moves relative to the OIS-Y position sensor 1022.

In some cases, the OIS-Y position sensor 1022 may be attached to a fixed (or static) structure of the camera. For instance, the fixed structure may be the flex circuit 1018 that is common to (or shared by) some or all of the position sensors of the position sensor arrangement 1000. In some embodiments, the OIS-Y position sensor 1022 may be attached to the flex circuit 1018 below the shared OIS magnet 1014 and/or below the OIS-Y coil 1020, e.g., as indicated in FIGS. 10C-10D.

In various embodiments, the OIS-Y movement position sensor arrangement 1004 may include two OIS-Y position sensors 1022 and two corresponding shared OIS magnets 1014. A first OIS-Y position sensor 1022 and a first corresponding shared OIS magnet 1014 may form a first pair. A second OIS-Y position sensor 1022 and a second corresponding shared OIS magnet 1014 may form a second pair that is opposite the first pair with respect to the system X-axis, e.g., as indicated in FIG. 10A. By having two such pairs, rotation about the system Z-axis due to system Y-axis displacement may be cancelled out in some embodiments.

In some embodiments, the OIS-X movement position sensor arrangement 1006 may include one or more OIS-X position sensors 1024 and one or more corresponding OIS-X probe magnets 1026. The OIS-X position sensors 1024 may be magnetic field sensors (e.g., Hall sensors, TMR sensors, GMR sensors, etc.) in various embodiments. An OIS-X position sensor 1024 may be disposed proximate a corresponding OIS-X probe magnet 1026 such that the OIS-X position sensor 1024 is capable of sensing one or more magnetic field components of the corresponding OIS-X probe magnet 1026, e.g., as the OIS-X probe magnet 1026 moves relative to the OIS-X position sensor 1024.

In some examples, the OIS-X probe magnet 1026 may be attached to a lens carrier 1028 (or a lens barrel). The lens carrier 1028 may be configured to hold a lens barrel 1030 and/or a lens group 1032 (e.g., a lens group having one or more lens elements disposed within the lens barrel 1030). Furthermore, the lens carrier 1028 may be configured to hold one or more coils (e.g., OIS-X coils 1034). In some embodiments, the OIS-X position sensor 1024 may be attached to a fixed (or static) structure of the camera. For instance, the fixed structure may be the flex circuit 1018 that is common to (or shared by) some or all of the position sensors of the position sensor arrangement 1000.

In various embodiments, the OIS-X movement position sensor arrangement 1006 may include two OIS-X position sensors 1024 and two corresponding OIS-X probe magnets 1026. A first OIS-X position sensor 1024 and a first corresponding OIS-X probe magnet 1026 may form a first pair. A second OIS-X position sensor 1024 and a second corresponding OIS-X probe magnet 1026 may form a second pair that is opposite the first pair with respect to the system X-axis, e.g., as indicated in FIGS. 10A and 10E. By having two such pairs, rotation about the system Z-axis (due to system Z-axis displacement) and/or external field effects may be cancelled out in some embodiments.

In some embodiments, the flex circuit 1018 may be coupled to (e.g., in electrical contact with) an image sensor package 1036. Additionally, or alternatively, the image sensor package 1036 may be coupled to (e.g., in electrical contact with) another flex circuit 1038.

Figure 11:
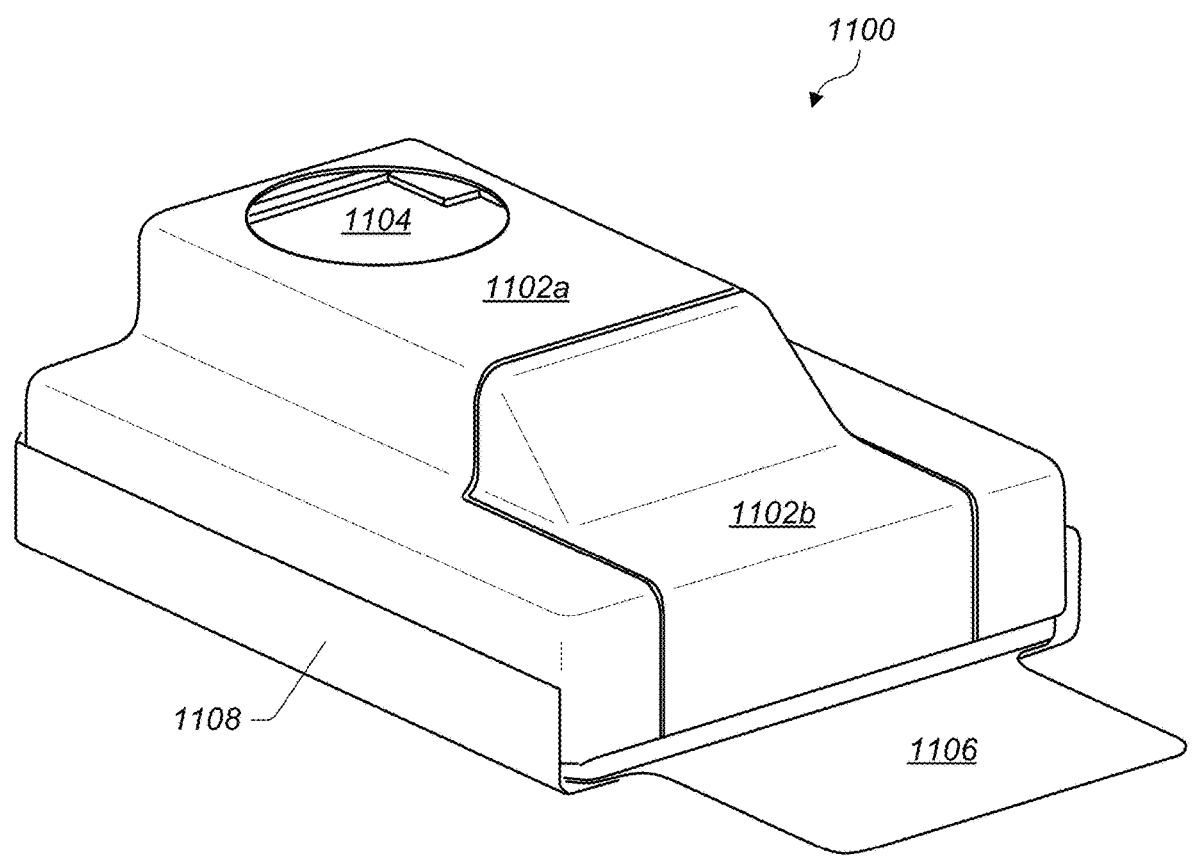
FIG. 11 illustrates a perspective view of an example camera having a folded optics arrangement, with a shield can covering at least a portion of the internal components of the camera, in accordance with some embodiments.

FIG. 11 illustrates a perspective view of an example camera 1100 having a folded optics arrangement, with a shield can 1102 covering at least a portion of the internal components of the camera 1100.

In some embodiments, the shield can 1102 may include a first portion 1102*a* and a second portion 1102*b*. The first portion 1102*a* may cover at least a first prism and a lens group of the camera 1100 in some examples. The second portion 1102*b* may cover at least a second prism in some examples. While FIG. 11 indicates the shield can 1102 may include two portions (e.g., the first portion 1102*a* and the second portion 1102*b*), it should be understood that the shield can 1102 may be a single component in some embodiments. Furthermore, in other embodiments, the shield can 1102 may include more than two portions.

According to some examples, the shield can 1102 may define an aperture 1104 above the first prism such that light may enter the camera 1100 and reach the first prism. In some cases, the aperture 1104 may be enclosed and/or sealed, e.g., via a transparent window. As such, dust particles may be prevented from entering the camera 1100 through the aperture 1104 and negatively impacting optical performance of the first prism and/or other components of the camera 1100 in some instances. Although not illustrated in FIG. 11, the camera 1100 may include one or more openings configured to allow ventilation.

In some cases, the camera 1100 may include a flex circuit 1106 disposed below the first prism, the lens group, the second prism, the lens carrier (and/or lens barrel), the magnet holder, and/or the fixed structure. The flex circuit 1106 may include an interface configured to allow the camera 1100 to interface with one or more other components external to the camera 1100. The flex circuit 1106 may be used to convey data signals and electrical power to and from the camera 1100. For instance, the flex circuit 1106 may be used to convey image signals from the image sensor to one or more processors external to the camera 1100.

In some embodiments, the camera 1100 may include a stiffener 1108 at least partially below the flex circuit 1106. For instance, the stiffener 1108 may be a folded stiffener, e.g., as shown in FIG. 11. According to some examples, the folded stiffener 1108 may include a base portion below the flex circuit 1106 and tab portions that are each folded from the base portion to cover a respective side of the camera 1100 and/or the shield can 1102. In some cases, the folded stiffener 1108 may include three tab portions, with each tab portion covering a portion of a respective one of three sides of the camera 1100 and/or the shield can 1102. A fourth side of the camera 1100 and/or the shield can 1102 may not have a corresponding tab portion that covers a portion of it. For instance, the fourth side may be a side at which the flex circuit 1106 extends outwardly to one or more components that are external to the camera 1100.

Figure 12A:
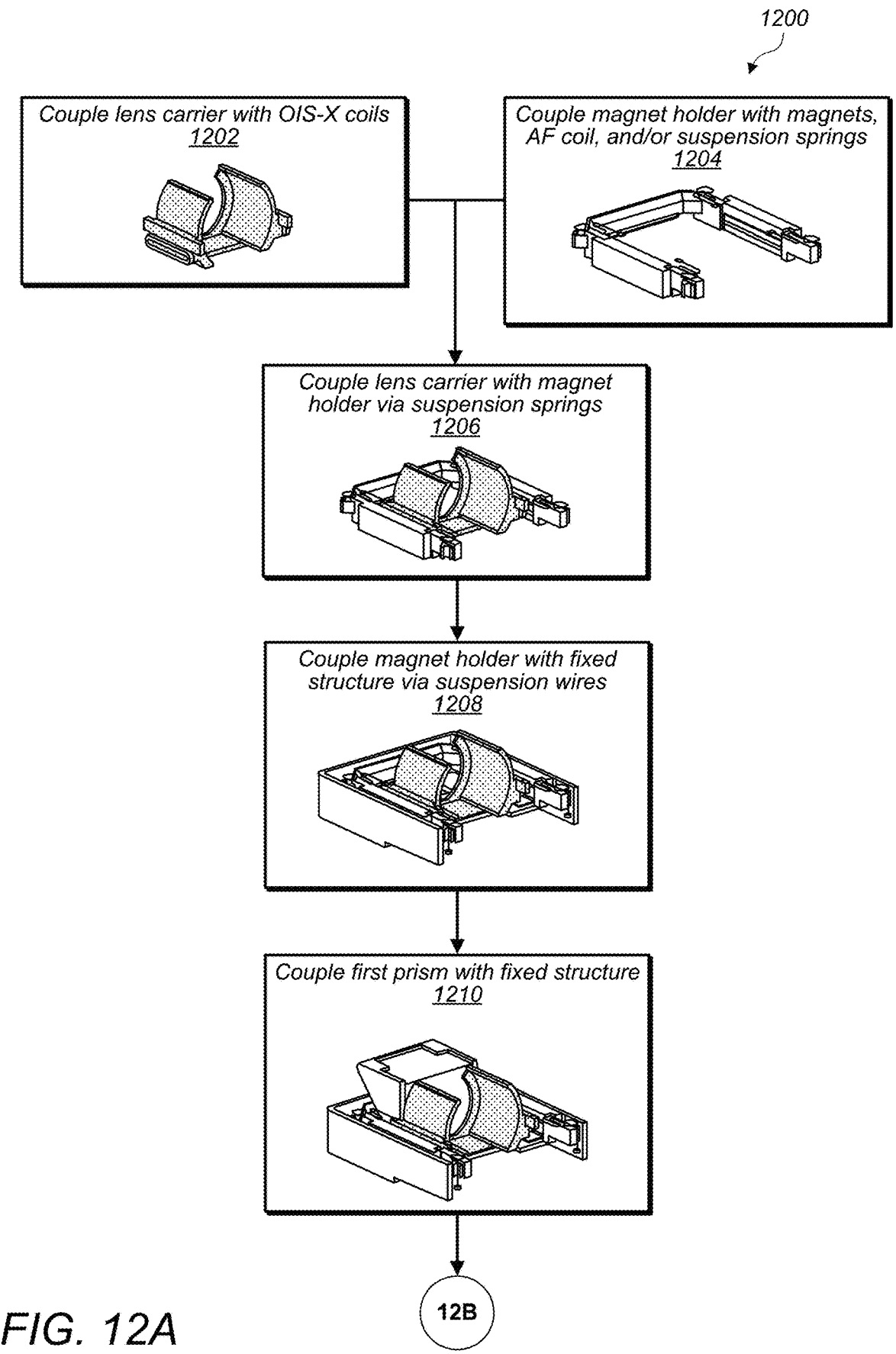
FIGS. 12A-12B illustrate a flow diagram of an example method for assembling a camera having a folded optics arrangement, in accordance with some embodiments.
Figure 12B:
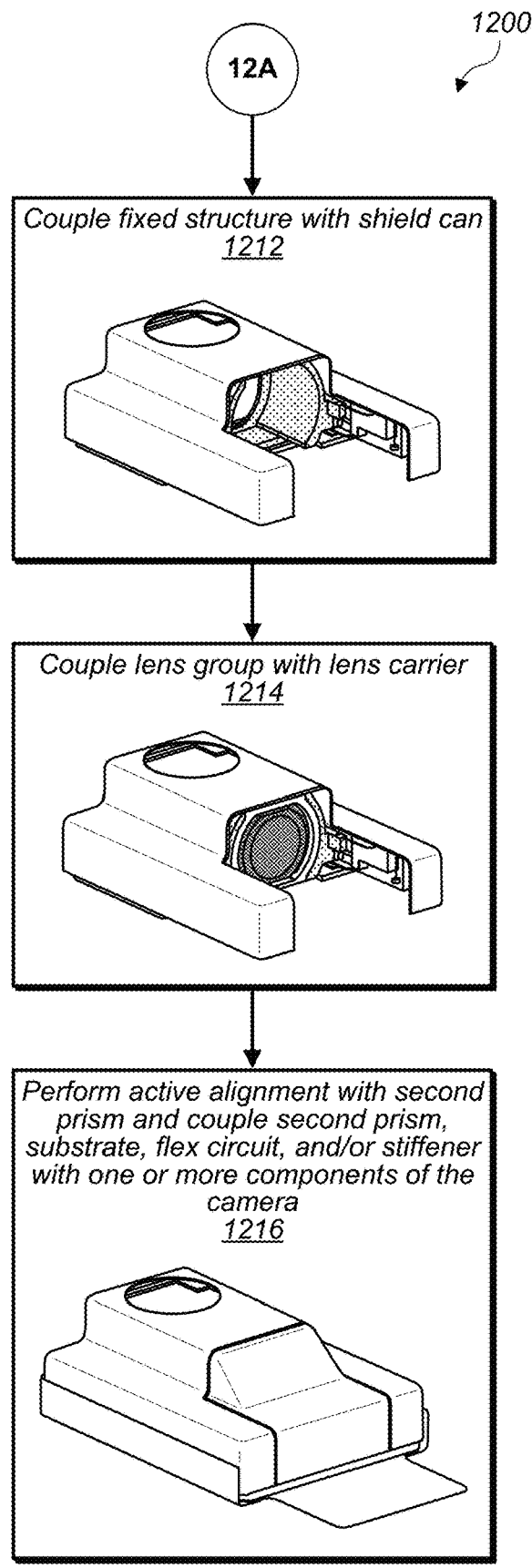

FIGS. 12A-12B illustrate a flow diagram of an example method 1200 for assembling a camera having a folded optics arrangement. At 1202, the method 1200 may include coupling a lens carrier of the camera with one or more coils (e.g., OIS-X coils). At 1204, the method 1200 may include coupling a magnet holder of the camera with one or more magnets (e.g., shared OIS magnets), one or more coils (e.g., an AF coil), and/or suspension springs. At 1206, the method 1200 may include coupling the lens carrier with the magnet holder via the suspension springs. At 1208, the method 1200 may include coupling the magnet holder with a fixed structure of the camera via suspension wires. At 1210, the method 1200 may include coupling a first prism of the camera with the fixed structure. At 1212, the method 1200 may include coupling the fixed structure with a shield can of the camera. At 1214, the method 1200 may include coupling a lens group with the lens carrier. At 1216, the method 1200 may include performing active alignment with a second prism of the camera. Furthermore, at 1216, the method 1200 may include coupling the second prism, a substrate, a flex circuit, and/or a stiffener with one or more components of the camera.

Figure 13A:
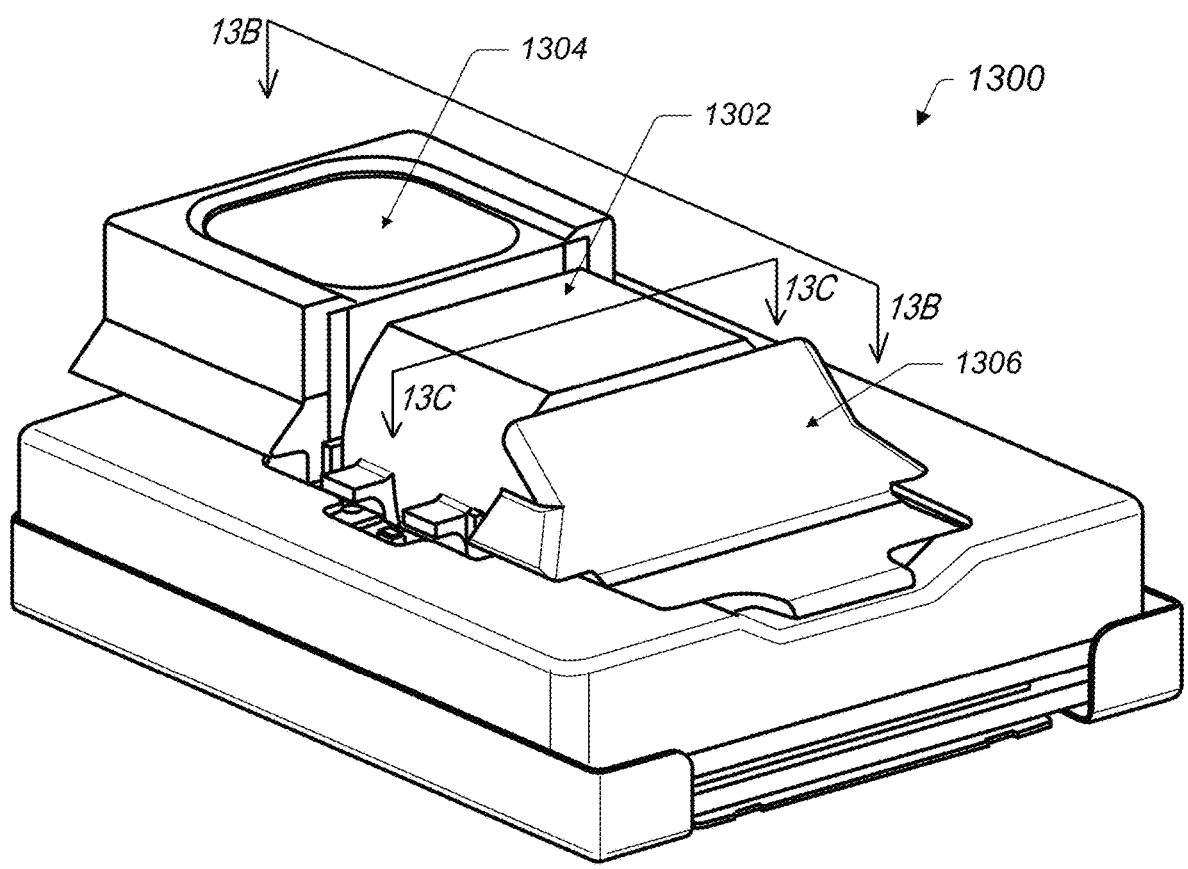
FIGS. 13A-13C each illustrate a respective view of another example camera having a folded optics arrangement and an example actuator arrangement for shifting a lens group of the camera along multiple axes, in accordance with some embodiments.
Figure 13B:
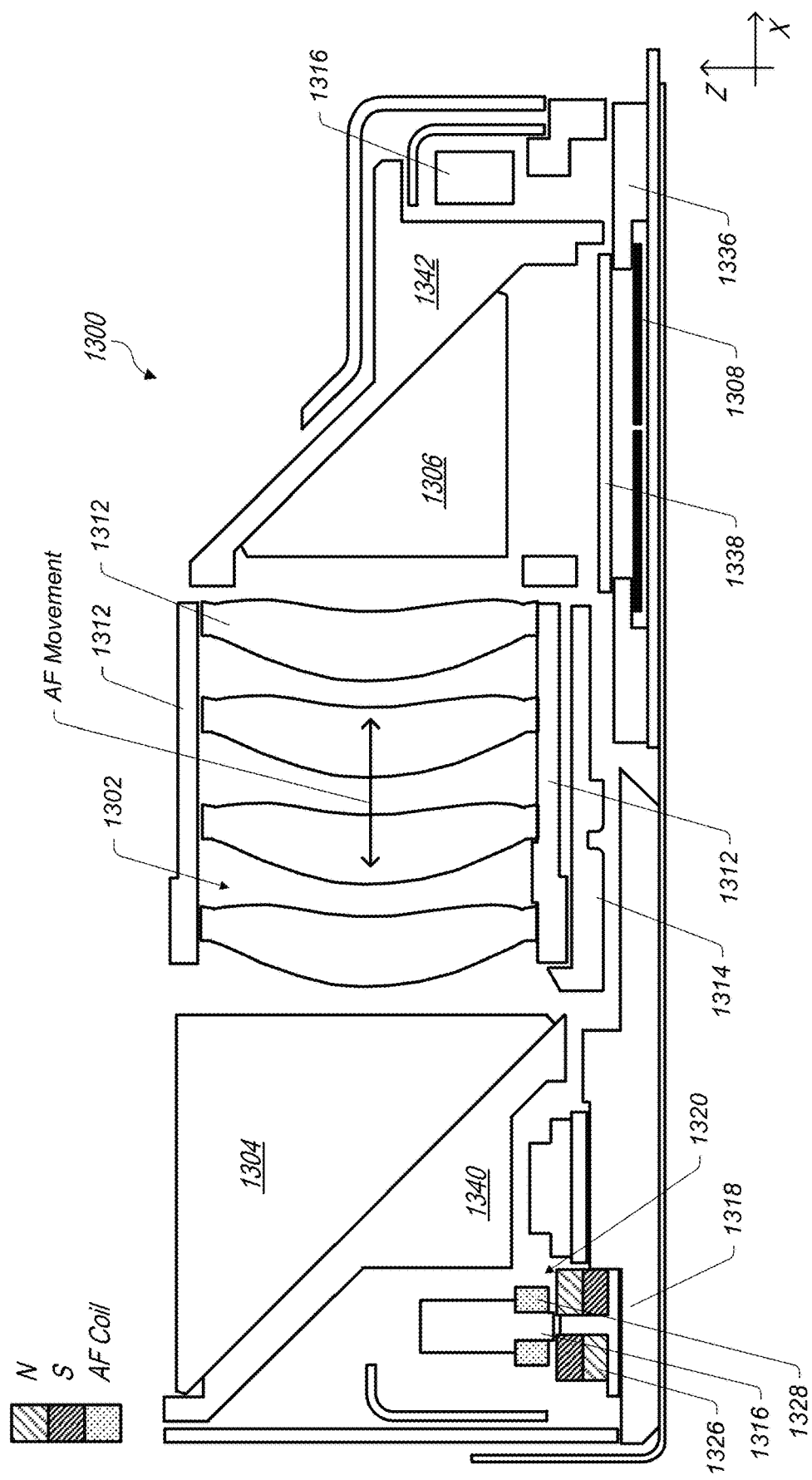
Figure 13C:
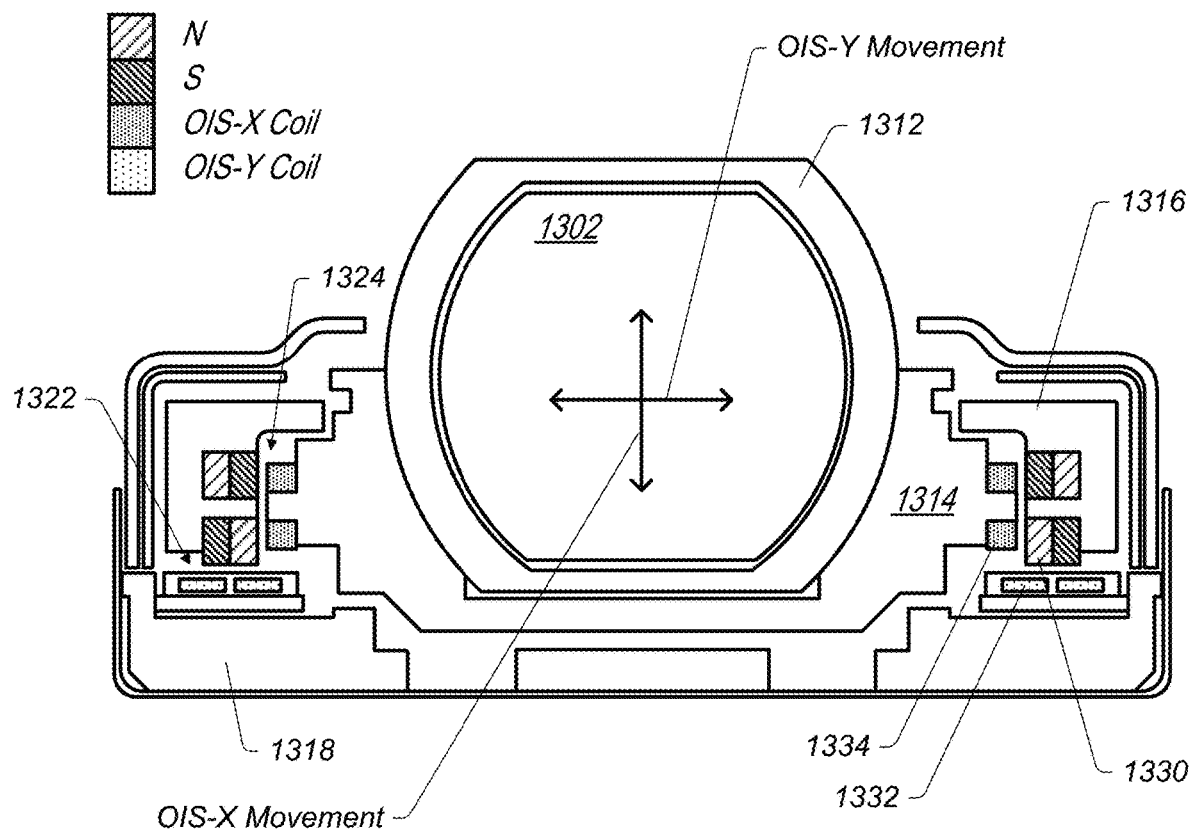

FIGS. 13A-13C each illustrate a respective view of another example camera 1300 having a folded optics arrangement and an example actuator arrangement for shifting a lens group of the camera along multiple axes. FIG. 13A shows a perspective view of some structural components of the camera. FIG. 13B shows a schematic side cross-sectional view of the camera 1300, where the cross-section is taken along section lines 13B-13B shown in FIG. 13A. FIG. 13C shows a schematic front cross-sectional view of the camera, where the cross-section is taken along section lines 13C-13C shown in FIG. 13A.

In some embodiments, the camera 1300 may include a lens group 1302, a first prism 1304, a second prism 1306, and an image sensor 1308 (shown in FIG. 13B). The lens group 1302 may include one or more lens elements 1310 disposed within a lens barrel 1312.

In various embodiments, the camera 1300 may include an actuator module that provides for shifting the lens group 1302 along multiple axes, e.g., to provide AF and/or OIS movement. In some embodiments, the actuator module may comprise a voice coil motor (VCM) actuator module that includes one or more VCM actuators. For instance, the actuator module may include one or more magnets and one or more coils. The magnets and coils may magnetically interact (e.g., when electrical current is provided to the coils) to produce Lorentz forces that move the lens group 1302.

According to various embodiments, the camera 1300 may include a carrier arrangement that includes an inner carrier structure and an outer carrier structure. For example, the inner carrier structure may include a lens carrier 1314 (which may hold the lens barrel 1312). The outer carrier structure may include a magnet holder 1316. One or more coils may be coupled to the lens carrier 1314 and/or to the magnet holder 1316. Furthermore, one or more magnets may be coupled to the magnet holder 1316. In some embodiments, the magnet holder 1316 may extend at least partially around the folded optics arrangement. The magnet holder 1316 may have multiple sides and/or portions, such as the sides/portions of any of the magnet holders described above with reference to FIGS. 3A-8B.

In a non-limiting example, the magnet holder 1316 may have a first side, a second side, a third side, and a fourth side. The first side may be a lateral side extending along the X-axis and along the side surfaces of the optical elements. The second side may be a lateral side extending along the X-axis and along the opposite side surfaces of the optical elements. The third side may be a distal/object side extending along the Y-axis, and may be positioned behind at least a portion of the reflecting surface side of the first prism 1304 (e.g., such that the first prism 1304 is disposed between the lens group 1302 and the magnet holder 1316). The fourth side may be a proximal/image side extending along the Y-axis, and may be positioned in front of at least a portion of the reflecting surface side of the second prism 1306 (e.g., such that the second prism 1306 is disposed between the lens group 1302 and the magnet holder 1316). In some non-limiting examples, the magnet holder 1316 may encircle the optical elements of the folded optics arrangement (e.g., the first prism 1304, the lens group 1302, and the second prism 1306).

According to some examples, a first portion of the magnet holder 1316 (e.g., the first side of the magnet holder 1316) may extend proximate a first side of the lens carrier 1314, a second portion of the magnet holder 1316 (e.g., the second side of the magnet holder 1316) may extend proximate a second side of the lens carrier 1314 that is opposite the first side of the lens carrier 1314, a third portion of the magnet holder 1316 (e.g., the third side of the magnet holder 1316) may be tucked under a portion of the first prism 1304, and a fourth portion of the magnet holder 1316 (e.g., the fourth side of the magnet holder 1316) may extend in front of the second prism 1306. As discussed above with reference to FIGS. 9A-9D, the lens carrier 1314 may be suspended from the magnet holder 1316 via a suspension arrangement.

Additionally, or alternatively, the magnet holder 1316 may be suspended from a fixed structure (e.g., fixed structure 1318) of the camera 1300 via the suspension arrangement. The suspension arrangement may allow the lens carrier 1314 to move relative to the magnet holder 1316. Furthermore, the suspension arrangement may allow the lens carrier 1314 to move together with the magnet holder 1316 relative to the fixed structure 1318.

In various embodiments, the actuator module may include one or more AF VCM actuators and/or one or more OIS VCM actuators. In some embodiments, the actuator module may include an AF VCM actuator 1320 (e.g., to provide AF movement, as indicated in FIG. 13B), an OIS-Y VCM actuator 1322 (e.g., to provide OIS-Y movement, as indicated in FIG. 13C), and an OIS-X VCM actuator 1324 (e.g., to provide OIS-X movement, as indicated in FIG. 13C).

The AF VCM actuator 1320 may include one or more magnets and one or more coils. In some examples, the AF VCM actuator 1320 may include an AF magnet 1326 (e.g., a dual-pole magnet) and an AF coil 1328. The AF magnet 1326 may be attached to the fixed structure 1318. In some examples, a first portion of the AF magnet 1326 may have a N-S polarity in a first direction, and a second portion of the AF magnet 1326 may have a N-S polarity in a second direction that is opposite the first direction, e.g., as indicated by the N-S polarity directions shown in FIG. 13B. The first portion may be parallel to the second portion in some embodiments. The AF coil 1328 may be attached to the magnet holder 1316. In some embodiments, the AF magnet 1326 may have a longest dimension (e.g., along the Y-axis) that is substantially parallel to a longest dimension (e.g., along the Y-axis) of the AF coil 1328. In some embodiments, the AF coil 1328 may be oriented such that directions of current flow through the AF coil 1328 define a plane that is parallel to the X-Y plane. The AF magnet 1326 and the AF coil 1328 may be located proximate one another, and the AF coil 1328 may be electrically driven to magnetically interact with the AF magnet 1326 to produce Lorentz forces that move the AF coil 1328, the magnet holder 1316, and/or the lens group 1302 along an axis (e.g., along the X-axis) to provide AF movement (e.g., movement that shifts an image projected on the image sensor in one or more directions parallel to the Z-axis). The AF magnet 1326, being attached to the fixed structure 1318, may remain stationary relative to the movement of the AF coil 1328. In various embodiments, the AF VCM actuator 1320 may be tucked within a space under a portion of the first prism 1304, e.g., as indicated in FIG. 13B. In this manner, the impact of the AF VCM actuator 1320 on the dimension of the system along its long axis (e.g., the X-axis) and along its vertical axis (e.g., the Z-axis) may be reduced or eliminated.

In some embodiments, the OIS-Y VCM actuator 1322 and the OIS-X VCM actuator 1324 may share one or more OIS magnets 1330. In some embodiments, the shared OIS magnets 1330 may be dual-pole magnets. In some examples, a first portion of a shared OIS magnet 1330 may have a N-S polarity in a first direction, and a second portion of the shared OIS magnet 1330 may have a N-S polarity in a second direction that is opposite the first direction, e.g., as indicated by the N-S polarity directions shown in FIG. 13C. The first portion may be parallel to the second portion in some embodiments. The shared OIS magnets 1330 may be attached to the magnet holder 1316, e.g., at opposing sides of the lens group 1302, as shown in FIG. 13C.

According to some examples, the OIS-Y VCM actuator 1322 may include one or more OIS-Y coils 1332. The OIS-Y coils 1332 may be attached to the fixed structure 1318. In some embodiments, each OIS-Y coil 1332 may be located below a respective shared OIS magnet 1330. The OIS-Y coils 1332 may be electrically driven to magnetically interact with the shared OIS magnets 1330 to produce Lorentz forces that move the shared OIS magnets 1330, the magnet holder 1316, and/or the lens group 1302 along an axis (e.g., along the Y-axis) to provide OIS-Y movement (e.g., movement that shifts an image projected on the image sensor in one or more directions parallel to the Y-axis). The OIS-Y coils 1332, being attached to the fixed structure 1318, may remain stationary relative to the movement of the shared OIS magnets 1330. In some embodiments, each of the shared OIS magnets 1330 may have respective longest dimensions (e.g., along the X-axis) that are substantially parallel to respective longest dimensions (e.g., along the X-axis) of the OIS-Y coils 1332. In some embodiments, the respective longest dimensions of the shared OIS magnets 1330 and the OIS-Y coils 1332 may be substantially parallel to a longest dimension (e.g., along the X-axis) of the system. Furthermore, the respective longest dimensions of the shared OIS magnets 1330 and the OIS-Y coils 1332 may be substantially orthogonal to the respective longest dimensions of the AF magnet 1326 and the AF coil 1328 in some embodiments. According to various embodiments, the OIS-Y coils 1332 may be oriented such that directions of current flow through the OIS-Y coils 1332 define a respective plane that is parallel to the X-Y plane.

According to some examples, the OIS-X VCM actuator 1324 may include one or more OIS-X coils 1334. The OIS-X coils 1334 may be attached to the lens carrier 1314. In some embodiments, each OIS-X coil 1334 may be located between a respective shared OIS magnet 1330 and the lens group 1302. The OIS-X coils 1334 may be electrically driven to magnetically interact with the shared OIS magnets 1330 to produce Lorentz forces that move the OIS-X coils 1334, the lens carrier 1314, and the lens group 1302 along an axis (e.g., along the Z-axis), relative to the magnet holder 1316 and/or the fixed structure 1318, to provide OIS-X movement (e.g., movement that shifts an image projected on the image sensor in one or more directions parallel to the X-axis). In some embodiments, each of the shared OIS magnets 1330 may have respective longest dimensions (e.g., along the X-axis) that are substantially parallel to respective longest dimensions (e.g., along the X-axis) of the OIS-X coils 1334. In some embodiments, the respective longest dimensions of the shared OIS magnets 1330 and the OIS-X coils 1334 may be substantially parallel to a longest dimension (e.g., along the X-axis) of the system. Furthermore, the respective longest dimensions of the shared OIS magnets 1330 and the OIS-X coils 1334 may be substantially orthogonal to the respective longest dimensions of the AF magnet 1326 and the AF coil 1328 in some embodiments. According to various embodiments, the OIS-X coils 1334 may be oriented such that directions of current flow through the OIS-X coils 1334 define a respective plane that is orthogonal to the X-Y plane (e.g., parallel to the X-Z plane).

As indicated in FIGS. 13B and 13C, the lens carrier 1314 may at least partially encompass the lens barrel 1312 and/or the lens group 1302. For example, a first portion of the lens carrier 1314 may at least partially encompass a first side of the lens barrel 1312. A second portion of the lens carrier 1314 may at least partially encompass a second side of the lens barrel 1312 that is opposite the first side. A third portion of the lens carrier 1314 may at least partially encompass a third side of the lens barrel 1312. In some embodiments, the third portion may extend below the lens barrel 1312 and from the first portion to the second portion.

In various embodiments, the camera 1300 may include a substrate 1336 below the second prism 1306. The image sensor 1308 may be coupled to the substrate 1336. In some embodiments, a filter (e.g., an infrared filter) 1338 may also be coupled to the substrate. For instance, the filter 1338 may be located above the image sensor 1308 such that light passes through the filter 1338 before reaching the image sensor 1308. In some examples, the substrate 1336 may define a plane that is parallel to the fixed structure 1318 and/or the X-Y plane. Additionally, or alternatively, the fixed structure 1318 may include the substrate 1336 and/or one or more other components of the camera 1300.

In some embodiments, the camera 1300 may include a first prism holder 1340 (shown in FIG. 13A) that holds the first prism 1304. In some embodiments, the first prism 1304 may be attached to one or more fixed structures of the camera 1300 via the first prism holder 1340. Additionally, or alternatively, the camera 1300 may include a second prism holder 1342 that holds the second prism 1306. In some embodiments, the second prism holder 1342 may be attached to one or more fixed structures of the camera 1300 via the second prism holder 1342.

Figure 14:
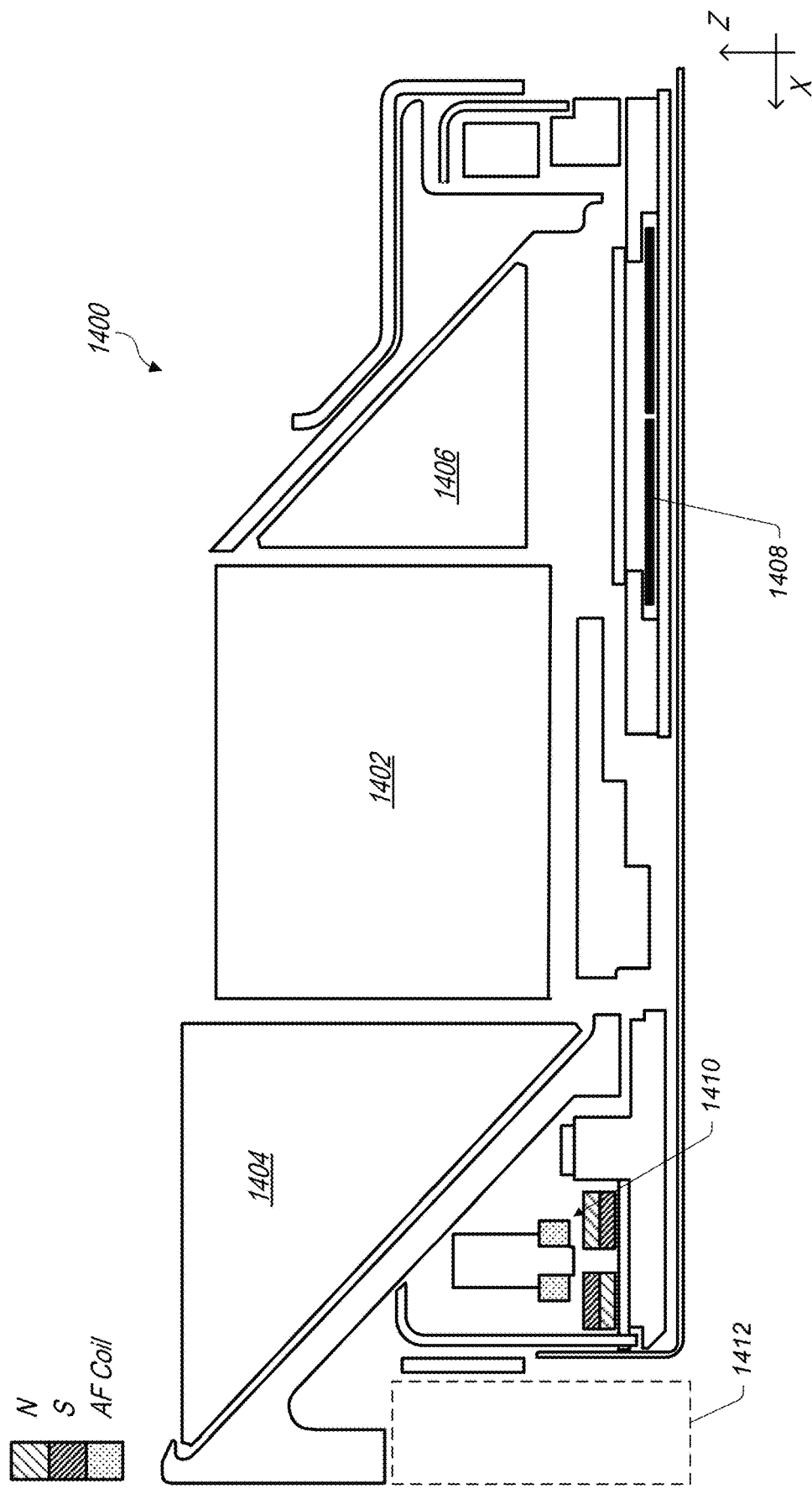
FIG. 14 illustrates an example camera that has a folded optics arrangement and that has a lower portion with a reduced dimension along the X-axis (e.g., as compared to that of the camera of FIGS. 13A-13C), in accordance with some embodiments.

FIG. 14 shows an example camera 1400 that has a folded optics arrangement and that has a lower portion with a reduced dimension along the X-axis (e.g., as compared to that of a lower portion of the camera 1300 of FIGS. 13A-13C). In some embodiments, the camera 1400 may have some components that are the same as, or similar to, components of the camera 1300 described above with reference to FIGS. 13A-13C. For example, as indicated in FIG. 14, the folded optics arrangement of the camera 1400 may include a lens group 1402, a first prism 1404, a second prism 1406, and an image sensor 1408. The camera 1400 may include an AF VCM actuator, an OIS-Y VCM actuator, and an OIS-X VCM actuator, each of which may include one or more magnets and one or more coils, as discussed above.

In various embodiments, the camera 1400 may include an AF VCM actuator 1410 that is located under the first prism 1404. As indicated in FIG. 14, the AF VCM actuator 1410 (and other components near it) may be located within a first space beneath a first portion of the first prism 1404, leaving a second space (e.g., as generally indicated by dashed rectangle 1412) as available free space (space that is not consumed by the camera 1400) beneath a second portion of the first prism 1404. The first space (and the first portion) may be located (along the X-axis) between the lens group 1402 and the second space 1412 (and the second portion).

In some embodiments, a system may include multiple cameras. As a non-limiting example, the system may include the camera 1400 and a second camera (not shown) that is adjacent to the camera 1400. At least a portion of the second camera may be disposed within the second space 1412 described above. In this manner, the camera 1400 may partially overlap with the second camera, and the dimension of the multi-camera system along the X-axis may be reduced. The multi-camera system may have more than two cameras in some embodiments. According to some examples, the cameras may be the same. In other embodiments, one or more cameras of the system may be different than one or more other cameras of the system.

Figure 15A:
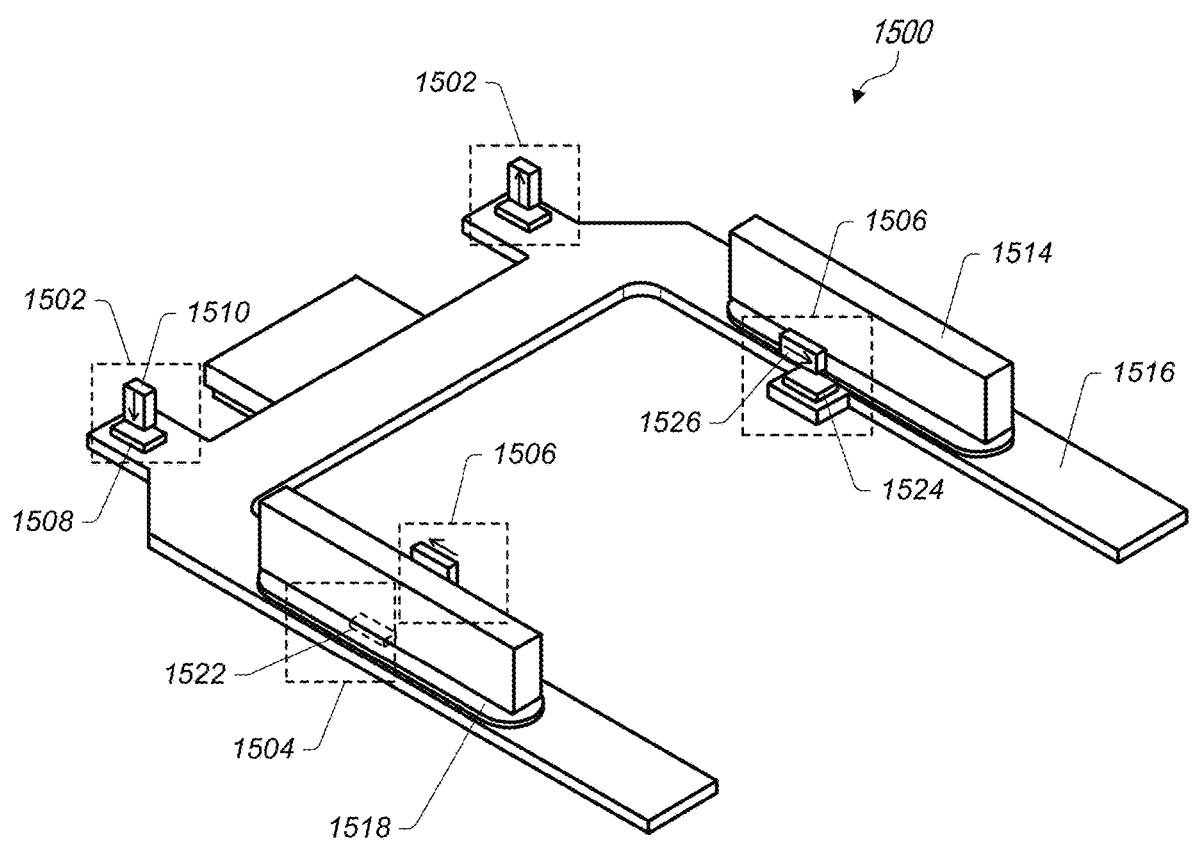
FIGS. 15A-15C each illustrate a respective view of another example position sensor arrangement for a camera having a folded optics arrangement, in accordance with some embodiments.
Figure 15B:
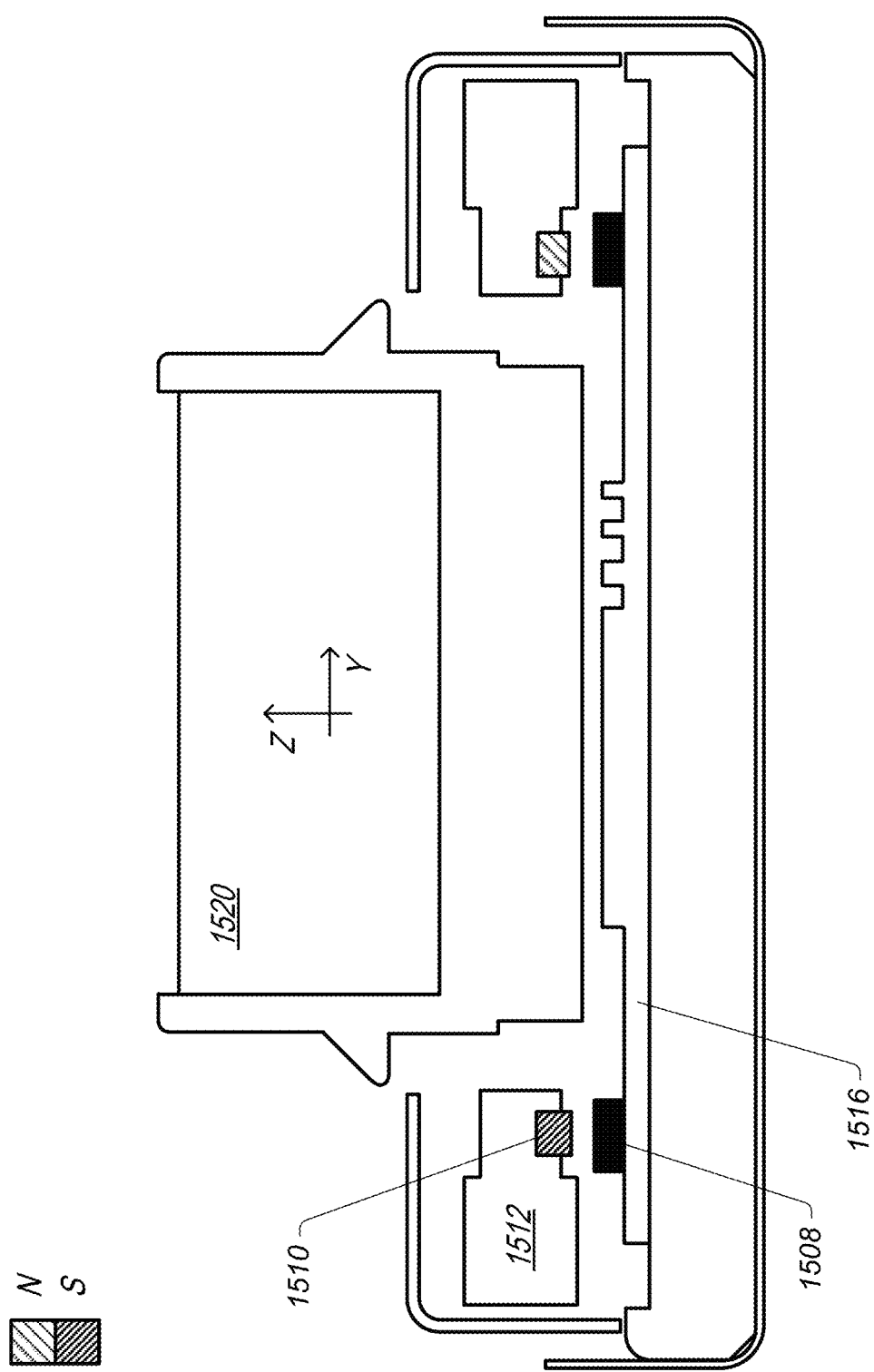
Figure 15C:
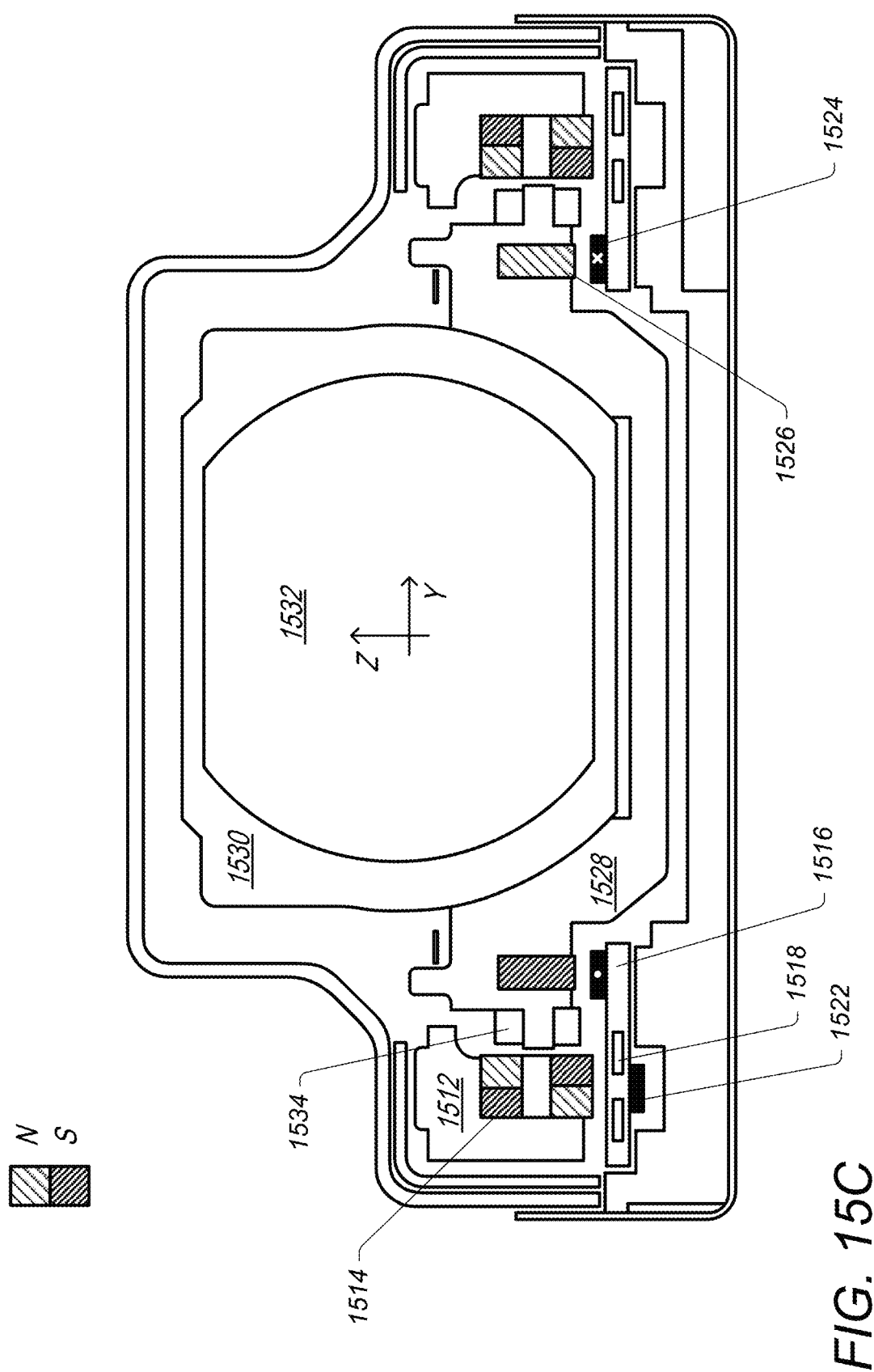

FIGS. 15A-15C each illustrate a respective view of another example position sensor arrangement 1500, e.g., for a camera having a folded optics arrangement. FIG. 15A shows a perspective view of the position sensor arrangement 1500. The position sensor arrangement 1500 may include position sensors for position sensing with respect to AF movement, OIS-X movement, and OIS-Y movement. FIG.

15B shows a cross-sectional view that focuses on position sensing with respect to AF movement. FIG. 15C shows a cross-sectional view that focuses on position sensing with respect to OIS-X and OIS-Y movement.

According to various embodiments, the position sensor arrangement 1500 may include an AF movement position sensor arrangement 1502, an OIS-Y movement position sensor arrangement 1504, and/or an OIS-X movement position sensor arrangement 1506.

In some embodiments, the AF movement position sensor arrangement 1502 may include one or more AF position sensors 1508 and one or more corresponding AF probe magnets 1510, e.g., as shown in FIGS. 15A and 15B. The AF position sensors 1508 may be magnetic field sensors (e.g., Hall sensors, tunneling magnetoresistance (TMR) sensors, giant magnetoresistance (GMR) sensors, etc.) in various embodiments. An AF position sensor 1508 may be disposed proximate a corresponding AF probe magnet 1510 such that the AF position sensor 1508 is capable of sensing one or more magnetic field components of the corresponding AF probe magnet 1510, e.g., as the AF probe magnet 1510 moves (e.g., along the Z-axis) relative to the AF position sensor 1508.

In some examples, the AF probe magnet 1510 may be attached to a magnet holder 1512. The magnet holder 1512 may be configured to hold one or more magnets (e.g., shared OIS magnets 1514 shown in FIGS. 15A and 15C). Furthermore, the magnet holder 1512 may be configured to hold one or more coils, such as an AF coil (not shown). In some embodiments, the AF position sensor 1508 may be attached to a fixed (or static) structure of the camera. For instance, the fixed structure may be a flex circuit 1516 that is common to (or shared by) some or all of the position sensors of the position sensor arrangement 1500. That is, some or all of the position sensors of the position sensor arrangement 1500 may be attached to the flex circuit 1516. Additionally, or alternatively, the flex circuit 1516 may include one or more coils (e.g., OIS-Y coils 1518).

In various embodiments, the AF movement position sensor arrangement 1502 may include two AF position sensors 1508 and two corresponding AF probe magnets 1510. A first AF position sensor 1508 and a first corresponding AF probe magnet 1510 may form a first pair. A second AF position sensor 1508 and a second corresponding AF probe magnet 1510 may form a second pair that is opposite the first pair with respect to an X-Z plane that intersects one or more optical elements of the folded optics arrangement (e.g., first prism 1520). As indicated by the arrows on the AF probe magnets 1510 in FIG. 15A (and by the hatching in FIG. 15B), the AF probe magnet 1510 of the first pair may have a N-S polarity direction that is opposite that of the AF probe magnet 1510 of the second pair. By having two such pairs, rotation about the system Z-axis due to system X-axis displacement may be cancelled out in some embodiments.

In some embodiments, the OIS-Y movement position sensor arrangement 1504 may include one or more OIS-Y position sensors 1522, e.g., as shown in FIGS. 15A and 15C. In a non-limiting example, the OIS-Y movement position sensor arrangement 1504 may include a single OIS-Y position sensor 1522. The OIS-Y position sensor 1522 may be a magnetic field sensor (e.g., Hall sensors, TMR sensors, GMR sensors, etc.) in various embodiments. The OIS-Y position sensor 1522 may be disposed proximate a shared OIS magnet 1514 (e.g., a dual-pole magnet) such that the OIS-Y position sensor 1522 is capable of sensing one or more magnetic field components of the corresponding shared OIS magnet 1514, e.g., as the shared OIS magnet 1514 moves (e.g., along the Y-axis) relative to the OIS-Y position sensor 1522. In some embodiments, due to the magnitude of the magnetic field produced by the shared OIS magnet 1514, the OIS-Y movement position sensor arrangement 1504 may not require a separate probe magnet and/or more than one OIS-Y movement position sensors.

In some cases, the OIS-Y position sensor 1522 may be attached to a fixed (or static) structure of the camera. For instance, the fixed structure may be the flex circuit 1516 that is common to (or shared by) some or all of the position sensors of the position sensor arrangement 1500. In some embodiments, the OIS-Y position sensor 1522 may be attached to the flex circuit 1516 below the shared OIS magnet 1514 and/or below the OIS-Y coil 1518, e.g., as indicated in FIGS. 15A and 15C.

In some embodiments, the OIS-X movement position sensor arrangement 1506 may include one or more OIS-X position sensors 1524 and one or more corresponding OIS-X probe magnets 1526. The OIS-X position sensors 1524 may be magnetic field sensors (e.g., Hall sensors, TMR sensors, GMR sensors, etc.) in various embodiments. An OIS-X position sensor 1524 may be disposed proximate a corresponding OIS-X probe magnet 1526 such that the OIS-X position sensor 1524 is capable of sensing one or more magnetic field components of the corresponding OIS-X probe magnet 1526, e.g., as the OIS-X probe magnet 1526 moves (e.g., along the Z-axis) relative to the OIS-X position sensor 1524.

In some examples, the OIS-X probe magnet 1526 may be attached to a lens carrier 1528 (or a lens barrel). The lens carrier 1528 may be configured to hold a lens barrel 1530 and/or a lens group 1532 (e.g., a lens group having one or more lens elements disposed within the lens barrel 1530). Furthermore, the lens carrier 1528 may be configured to hold one or more coils (e.g., OIS-X coils 1534 shown in FIG. 15C). In some embodiments, the OIS-X position sensor 1524 may be attached to a fixed (or static) structure of the camera. For instance, the fixed structure may be the flex circuit 1516 that is common to (or shared by) some or all of the position sensors of the position sensor arrangement 1500.

In various embodiments, the OIS-X movement position sensor arrangement 1506 may include two OIS-X position sensors 1524 and two corresponding OIS-X probe magnets 1526. A first OIS-X position sensor 1524 and a first corresponding OIS-X probe magnet 1526 may form a first pair. A second OIS-X position sensor 1524 and a second corresponding OIS-X probe magnet 1526 may form a second pair that is opposite the first pair with respect to an X-Z plane that intersects the lens group 1532. As indicated by the arrows on the OIS-X probe magnets 1526 in FIG. 15A (and by the hatching in FIG. 15C), the OIS-X probe magnet 1526 of the first pair may have a N-S polarity direction that is opposite that of the OIS-X probe magnet 1526 of the second pair. By having two such pairs, rotation about the system Z-axis (due to system Z-axis displacement) and/or external field effects may be cancelled out in some embodiments.

In a non-limiting embodiment, the AF position sensor arrangement 1502 may include two AF position sensors 1508 (e.g., two TMR sensors), the OIS-Y position sensor arrangement 1504 may include an OIS-Y position sensor 1522 (e.g., a Hall sensor), and the OIS-X position sensor arrangement 1506 may include two OIS-X position sensors 1524 (e.g., two TMR sensors).

Figure 16A:
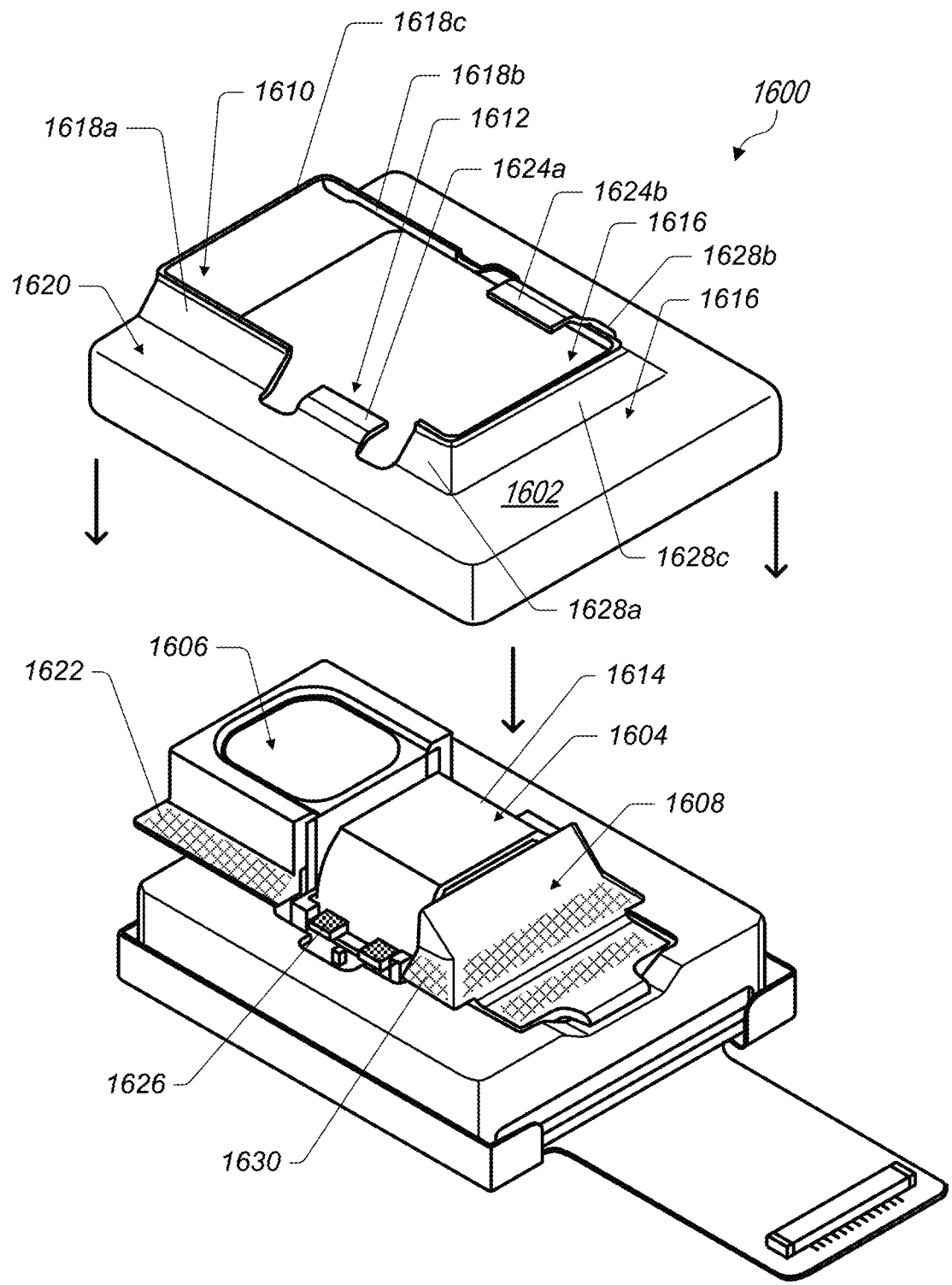
FIGS. 16A-16B illustrate an example camera that has a folded optics arrangement and that includes a module can with retention elements, in accordance with some embodiments.
Figure 16B:
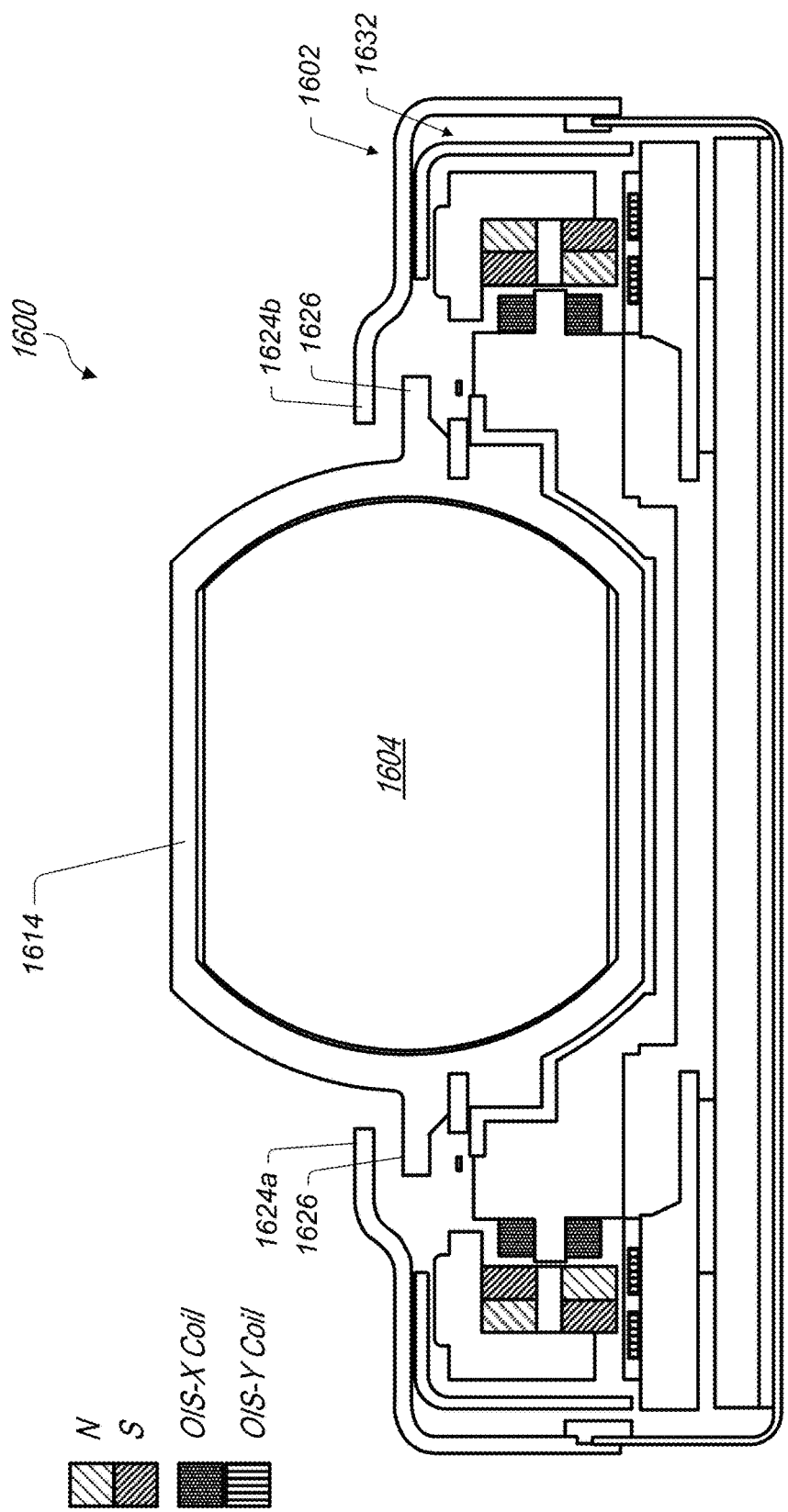

FIGS. 16A-16B illustrate an example camera 1600 that has a folded optics arrangement and that includes a module can 1602 with retention elements (e.g., protrusions, tabs, etc.). In some embodiments, the camera 1600 may include some components that are the same as, or similar to, components of the cameras described above (e.g., camera 1300 in FIGS. 13A-13C). For example, the folded optics arrangement of the camera 1600 may include a lens group 1604, a first prism 1606, and a second prism 1608. In some embodiments, the camera 1600 may include an AF VCM actuator, an OIS-Y VCM actuator, and an OIS-X VCM actuator, each of which may include one or more magnets and one or more coils, as discussed above.

In some embodiments, the module can 1602 may include one or more retention elements used to retain one or more components substantially in place, e.g., to prevent the components from moving in directions parallel to the Z-axis during drop events. Retention elements may be used for prism retention and/or for lens barrel retention. For example, the module can 1602 may include a first set of one or more retention elements 1610 for retaining the first prism 1606, a second set of one or more retention elements 1612 for retaining the lens barrel 1614 (and/or a lens carrier) that holds the lens group 1604, and/or a third set of one or more retention elements 1616 for retaining the second prism 1608.

According to some embodiments, each retention element may be configured to engage a corresponding portion of the component for which it is used to retain. For example, the first set of retention elements 1610 (for retaining the first prism 1606) may include a first retention element 1618*a*, a second retention element 1618*b*, and a third retention element 1618*c* that each protrude inward from a base portion 1620 of the module can 1602. The retention elements 1618 may be configured to be in contact with one or more corresponding portions 1622 of the first prism 1606 and/or a component attached to the first prism 1606 (e.g., a prism holder). In some embodiments, the retention elements 1618 may be formed to contiguously extend along multiple sides (e.g., three sides) of the first prism 1606, e.g., as shown in FIG. 16A. In other embodiments, the retention elements 1618 may discontinuously extend along one or more sides of the first prism 1606. An adhesive may be used to attach the retention elements 1618 to the corresponding portions 1622.

The second set of retention elements 1612 (for retaining the lens barrel 1614) may include a first retention element 1624*a* and a second retention element 1624*b* that each protrude inward from the base portion 1620 of the module can 1602. The retention elements 1624 may be configured to be in contact with one or more corresponding portions 1626 of the lens barrel 1614 and/or a component attached to the lens barrel 1614 (e.g., a lens carrier). The first retention element 1624*a* may be disposed proximate a first side of the lens barrel 1614, and the second retention element 1624*b* may be disposed proximate a second side of the lens barrel 1614 that is opposite the first side. An adhesive may be used to attach the retention elements 1624 to the corresponding portions 1626.

The third set of retention elements 1616 (for retaining the second prism 1608) may include a first retention element 1628*a*, a second retention element 1628*b*, and a third retention element 1628*c* that each protrude inward from the base portion 1620 of the module can 1602. The retention elements 1628 may be configured to be in contact with one or more corresponding portions 1630 of the second prism 1608 and/or a component attached to the second prism 1608 (e.g., a prism holder). In some embodiments, the retention elements 1628 may be formed to contiguously extend along multiple sides (e.g., three sides) of the second prism 1608, e.g., as shown in FIG. 16A. In other embodiments, the retention elements 1628 may discontinuously extend along one or more sides of the second prism 1608. An adhesive may be used to attach the retention elements 1628 to the corresponding portions 1630.

In some examples, the module can 1602 may be a secondary shield can. As indicated in FIG. 16B, the camera 1600 may include a primary shield can 1632 that at least partially encompasses some internal components of the camera 1600.

Figure 17:
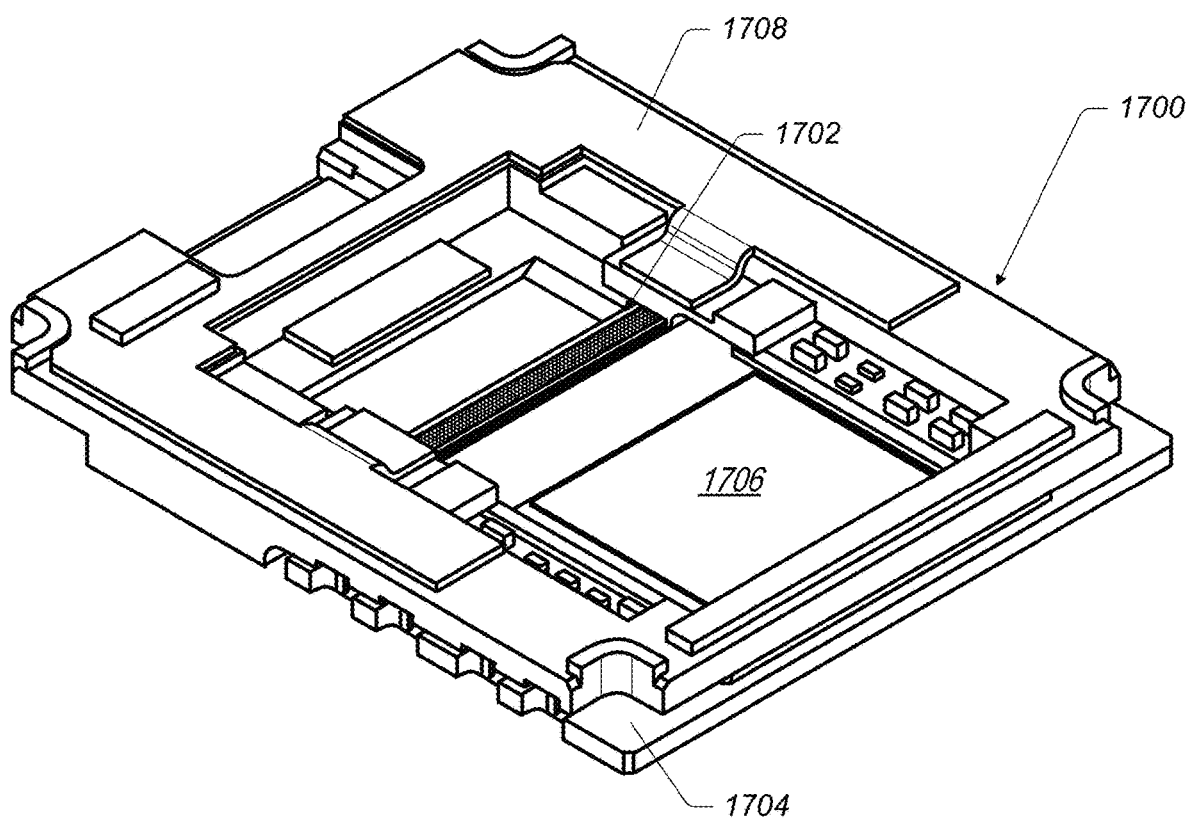
FIG. 17 illustrates an example base structure (e.g., for a camera having a folded optics arrangement) that includes a base bridge, in accordance with some embodiments.

FIG. 17 illustrates a bottom perspective view of an example base structure 1700 (e.g., for a camera having a folded optics arrangement, such as those described above) having an example base bridge 1702 that provides structural support to the base structure 1700. In some embodiments, a substrate 1704 may be attached to the base structure 1700. An image sensor 1706 may be attached to the substrate 1704. Furthermore, a flex circuit board 1708 may be attached to the base structure 1700.

In some other base structures, due to having an elongated shape (e.g., along the X-axis), an undesirable bending deformation may occur at one substrate side near the center, near a window/open area, and/or near an image sensor, e.g., during a drop event. The base bridge 1702 described here may be used to reinforce the window area and provide structural support to the substrate 1704 so as to reduce or prevent undesirable bending deformation. In some embodiments, the base bridge 1702 may extend (e.g., along the Y-axis) proximate a side of the substrate 1704 and/or proximate the image sensor 1706.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 18:
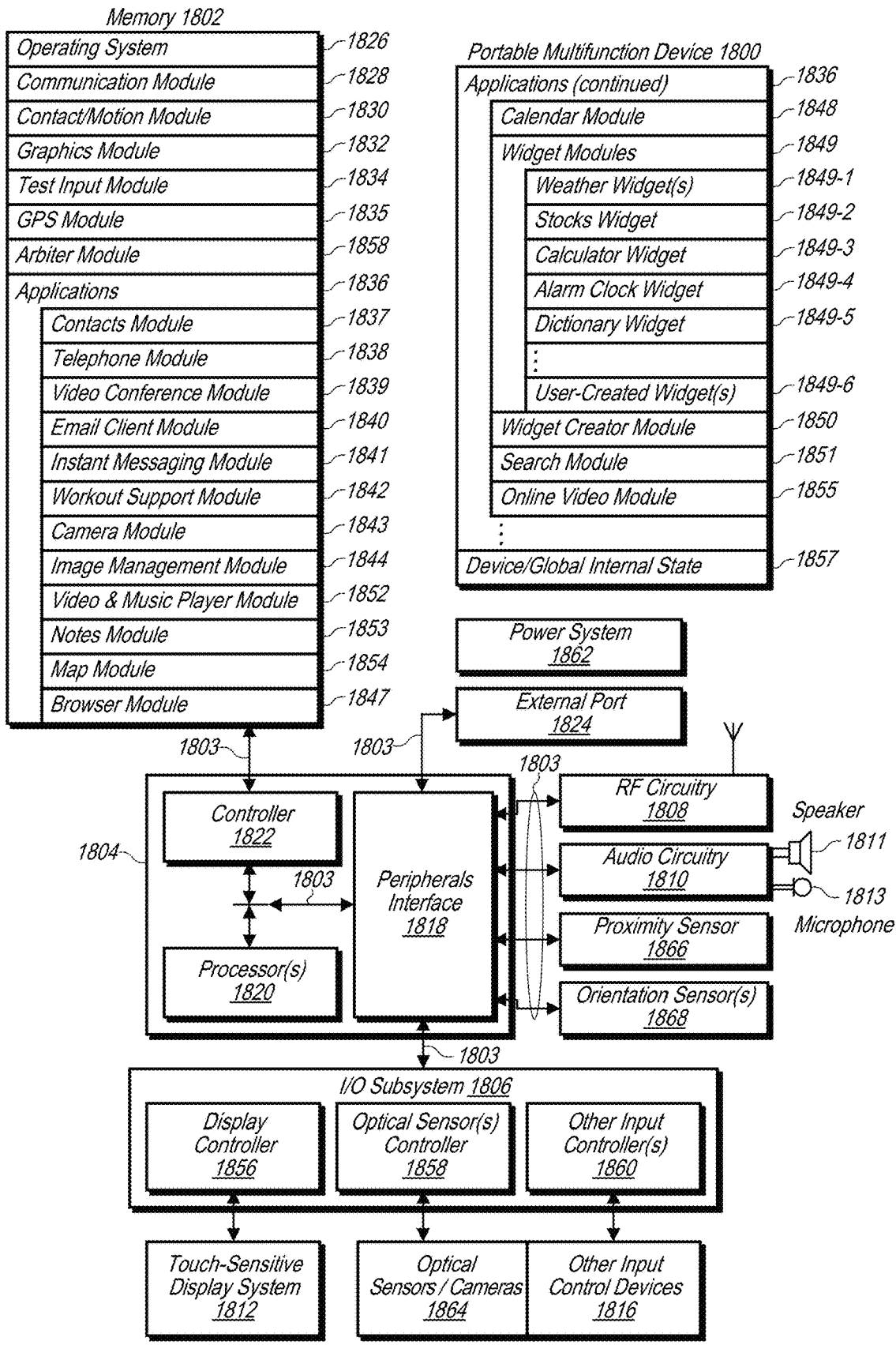
FIG. 18 illustrates a block diagram of an example portable multifunction device that may include a camera having a folded optics arrangement, in accordance with some embodiments.

Attention is now directed toward embodiments of portable devices with cameras. FIG. 18 illustrates a block diagram of an example portable multifunction device 1800 that may include one or more cameras (e.g., the cameras described above with reference to FIGS. 1-16), in accordance with some embodiments. Cameras 1864 are sometimes called "optical sensors" for convenience, and may also be known as or called an optical sensor system. Device 1800 may include memory 1802 (which may include one or more computer readable storage mediums), memory controller 1822, one or more processing units (CPUs) 1820, peripherals interface 1818, RF circuitry 1808, audio circuitry 1810, speaker 1811, touch-sensitive display system 1812, microphone 1813, input/output (I/O) subsystem 1806, other input or control devices 1816, and external port 1824. Device 1800 may include multiple optical sensors 1864. These components may communicate over one or more communication buses or signal lines 1803.

It should be appreciated that device 1800 is only one example of a portable multifunction device, and that device 1800 may have more or fewer components than shown, may combine two or more components, or may have a different configuration or arrangement of the components. The various components shown in FIG. 18 may be implemented in hardware, software, or a combination of hardware and software, including one or more signal processing and/or application specific integrated circuits.

Memory 1802 may include high-speed random access memory and may also include non-volatile memory, such as one or more magnetic disk storage devices, flash memory devices, or other non-volatile solid-state memory devices. Access to memory 1802 by other components of device 1800, such as CPU 1820 and the peripherals interface 1818, may be controlled by memory controller 1822.

Peripherals interface 1818 can be used to couple input and output peripherals of the device to CPU 1820 and memory 1802. The one or more processors 1820 run or execute various software programs and/or sets of instructions stored in memory 1802 to perform various functions for device 1800 and to process data.

In some embodiments, peripherals interface 1818, CPU 1820, and memory controller 1822 may be implemented on a single chip, such as chip 1804. In some other embodiments, they may be implemented on separate chips.

RF (radio frequency) circuitry 1808 receives and sends RF signals, also called electromagnetic signals. RF circuitry 1808 converts electrical signals to/from electromagnetic signals and communicates with communications networks and other communications devices via the electromagnetic signals. RF circuitry 1808 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1808 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1810, speaker 1811, and microphone 1813 provide an audio interface between a user and device 1800. Audio circuitry 1810 receives audio data from peripherals interface 1818, converts the audio data to an electrical signal, and transmits the electrical signal to speaker 1811. Speaker 1811 converts the electrical signal to human-audible sound waves. Audio circuitry 1810 also receives electrical signals converted by microphone 1813 from sound waves. Audio circuitry 1810 converts the electrical signal to audio data and transmits the audio data to peripherals interface 1818 for processing. Audio data may be retrieved from and/or transmitted to memory 1802 and/or RF circuitry 1808 by peripherals interface 1818. In some embodiments, audio circuitry 1810 also includes a headset jack (e.g., 1912, FIG. 19). The headset jack provides an interface between audio circuitry 1810 and removable audio input/output peripherals, such as output-only headphones or a headset with both output (e.g., a headphone for one or both ears) and input (e.g., a microphone).

I/O subsystem 1806 couples input/output peripherals on device 1800, such as touch screen 1812 and other input control devices 1816, to peripherals interface 1818. I/O subsystem 1806 may include display controller 1856 and one or more input controllers 1860 for other input or control devices. The one or more input controllers 1860 receive/send electrical signals from/to other input or control devices 1816. The other input control devices 1816 may include physical buttons (e.g., push buttons, rocker buttons, etc.), dials, slider switches, joysticks, click wheels, and so forth. In some alternate embodiments, input controller(s) 1860 may be coupled to any (or none) of the following: a keyboard, infrared port, USB port, and a pointer device such as a mouse. The one or more buttons (e.g., 1908, FIG. 19) may include an up/down button for volume control of speaker 1811 and/or microphone 1813. The one or more buttons may include a push button (e.g., 1906, FIG. 19).

Touch-sensitive display 1812 provides an input interface and an output interface between the device and a user. Display controller 1856 receives and/or sends electrical signals from/to touch screen 1812. Touch screen 1812 displays visual output to the user. The visual output may include graphics, text, icons, video, and any combination thereof (collectively termed "graphics"). In some embodiments, some or all of the visual output may correspond to user-interface objects.

Touch screen 1812 has a touch-sensitive surface, sensor or set of sensors that accepts input from the user based on haptic and/or tactile contact. Touch screen 1812 and display controller 1856 (along with any associated modules and/or sets of instructions in memory 1802) detect contact (and any movement or breaking of the contact) on touch screen 1812 and converts the detected contact into interaction with user-interface objects (e.g., one or more soft keys, icons, web pages or images) that are displayed on touch screen 1812. In an example embodiment, a point of contact between touch screen 1812 and the user corresponds to a finger of the user.

Touch screen 1812 may use LCD (liquid crystal display) technology, LPD (light emitting polymer display) technology, or LED (light emitting diode) technology, although other display technologies may be used in other embodiments. Touch screen 1812 and display controller 1856 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1812. In an example embodiment, projected mutual capacitance sensing technology is used, such as that found in the iPhone®, iPod Touch®, and iPad® from Apple Inc. of Cupertino, Calif.

Touch screen 1812 may have a video resolution in excess of 800 dpi. In some embodiments, the touch screen has a video resolution of approximately 860 dpi. The user may make contact with touch screen 1812 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1800 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1812 or an extension of the touch-sensitive surface formed by the touch screen.

Device 1800 also includes power system 1862 for powering the various components. Power system 1862 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1800 may also include one or more optical sensors or cameras 1864. FIG. 18 shows an optical sensor 1864 coupled to optical sensor controller 1858 in I/O subsystem 1806. Optical sensor 1864 may include charge-coupled device (CCD) or complementary metal-oxide semiconductor (CMOS) phototransistors. Optical sensor 1864 receives light from the environment, projected through one or more lens, and converts the light to data representing an image. In conjunction with imaging module 1843 (also called a camera module), optical sensor 1864 may capture still images or video. In some embodiments, an optical sensor 1864 is located on the back of device 1800, opposite touch screen display 1812 on the front of the device, so that the touch screen display 1812 may be used as a viewfinder for still and/or video image acquisition. In some embodiments, another optical sensor is located on the front of the device so that the user's image may be obtained for videoconferencing while the user views the other video conference participants on the touch screen display.

Device 1800 may also include one or more proximity sensors 1866. FIG. 18 shows proximity sensor 1866 coupled to peripherals interface 1818. Alternately, proximity sensor 1866 may be coupled to input controller 1860 in I/O subsystem 1806. In some embodiments, the proximity sensor 1866 turns off and disables touch screen 1812 when the multifunction device 1800 is placed near the user's ear (e.g., when the user is making a phone call).

Device 1800 includes one or more orientation sensors 1868. In some embodiments, the one or more orientation sensors 1868 include one or more accelerometers (e.g., one or more linear accelerometers and/or one or more rotational accelerometers). In some embodiments, the one or more orientation sensors 1868 include one or more gyroscopes. In some embodiments, the one or more orientation sensors 1868 include one or more magnetometers. In some embodiments, the one or more orientation sensors 1868 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1800. In some embodiments, the one or more orientation sensors 1868 include any combination of orientation/rotation sensors. FIG. 18 shows the one or more orientation sensors 1868 coupled to peripherals interface 1818. Alternately, the one or more orientation sensors 1868 may be coupled to an input controller 1860 in I/O subsystem 1806. In some embodiments, information is displayed on the touch screen display 1812 in a portrait view or a landscape view based on an analysis of data received from the one or more orientation sensors 1868.

In some embodiments, the software components stored in memory 1802 include operating system 1826, communication module (or set of instructions) 1828, contact/motion module (or set of instructions) 1830, graphics module (or set of instructions) 1832, text input module (or set of instructions) 1834, Global Positioning System (GPS) module (or set of instructions) 1835, arbiter module 1858 and applications (or sets of instructions) 1836. Furthermore, in some embodiments memory 1802 stores device/global internal state 1857. Device/global internal state 1857 includes one or more of: active application state, indicating which applications, if any, are currently active; display state, indicating what applications, views or other information occupy various regions of touch screen display 1812; sensor state, including information obtained from the device's various sensors and input control devices 1816; and location information concerning the device's location and/or attitude.

Operating system 1826 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1828 facilitates communication with other devices over one or more external ports 1824 and also includes various software components for handling data received by RF circuitry 1808 and/or external port 1824.

External port 1824 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1830 may detect contact with touch screen 1812 (in conjunction with display controller 1856) and other touch sensitive devices (e.g., a touchpad or physical click wheel). Contact/motion module 1830 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1830 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1830 and display controller 1856 detect contact on a touchpad.

Contact/motion module 1830 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1832 includes various known software components for rendering and displaying graphics on touch screen 1812 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1832 stores data representing graphics to be used. Each graphic may be assigned a corresponding code. Graphics module 1832 receives, from applications etc., one or more codes specifying graphics to be displayed along with, if necessary, coordinate data and other graphic property data, and then generates screen image data to output to display controller 1856.

Text input module 1834, which may be a component of graphics module 1832, provides soft keyboards for entering text in various applications (e.g., contacts 1837, e-mail 1840, IM 1841, browser 1847, and any other application that needs text input).

GPS module 1835 determines the location of the device and provides this information for use in various applications (e.g., to telephone 1838 for use in location-based dialing, to camera 1843 as picture/video metadata, and to applications that provide location-based services such as weather widgets, local yellow page widgets, and map/navigation widgets).

Applications 1836 may include the following modules (or sets of instructions), or a subset or superset thereof:
contacts module 1837 (sometimes called an address book or contact list);
telephone module 1838;
video conferencing module 1839;
e-mail client module 1840;
instant messaging (IM) module 1841;
workout support module 1842;
camera module 1843 for still and/or video images;
image management module 1844;
browser module 1847;
calendar module 1848;
widget modules 1849, which may include one or more of: weather widget 1849-1, stocks widget 1849-2, calculator widget 1849-3, alarm clock widget 1849-4, dictionary widget 1849-5, and other widgets obtained by the user, as well as user-created widgets 1849-6;
widget creator module 1850 for making user-created widgets 1849-6;
search module 1851;
video and music player module 1852, which may be made up of a video player module and a music player module;
notes module 1853;
map module 1854; and/or
online video module 1855.

Examples of other applications 1836 that may be stored in memory 1802 include other word processing applications, other image editing applications, drawing applications, presentation applications, JAVA-enabled applications, encryption, digital rights management, voice recognition, and voice replication.

In conjunction with touch screen 1812, display controller 1856, contact module 1830, graphics module 1832, and text input module 1834, contacts module 1837 may be used to manage an address book or contact list (e.g., stored in application internal state 1857), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1838, video conference 1839, e-mail 1840, or IM 1841; and so forth.

In conjunction with RF circuitry 1808, audio circuitry 1810, speaker 1811, microphone 1813, touch screen 1812, display controller 1856, contact module 1830, graphics module 1832, and text input module 1834, telephone module 1838 may be used to enter a sequence of characters corresponding to a telephone number, access one or more telephone numbers in address book 1837, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1808, audio circuitry 1810, speaker 1811, microphone 1813, touch screen 1812, display controller 1856, optical sensor 1864, optical sensor controller 1858, contact module 1830, graphics module 1832, text input module 1834, contact list 1837, and telephone module 1838, videoconferencing module 1839 includes executable instructions to initiate, conduct, and terminate a video conference between a user and one or more other participants in accordance with user instructions.

In conjunction with RF circuitry 1808, touch screen 1812, display controller 1856, contact module 1830, graphics module 1832, and text input module 1834, e-mail client module 1840 includes executable instructions to create, send, receive, and manage e-mail in response to user instructions. In conjunction with image management module 1844, e-mail client module 1840 makes it very easy to create and send e-mails with still or video images taken with camera module 1843.

In conjunction with RF circuitry 1808, touch screen 1812, display controller 1856, contact module 1830, graphics module 1832, and text input module 1834, the instant messaging module 1841 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1808, touch screen 1812, display controller 1856, contact module 1830, graphics module 1832, text input module 1834, GPS module 1835, map module 1854, and music player module 1846, workout support module 1842 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1812, display controller 1856, optical sensor(s) 1864, optical sensor controller 1858, contact module 1830, graphics module 1832, and image management module 1844, camera module 1843 includes executable instructions to capture still images or video (including a video stream) and store them into memory 1802, modify characteristics of a still image or video, or delete a still image or video from memory 1802.

In conjunction with touch screen 1812, display controller 1856, contact module 1830, graphics module 1832, text input module 1834, and camera module 1843, image management module 1844 includes executable instructions to arrange, modify (e.g., edit), or otherwise manipulate, label, delete, present (e.g., in a digital slide show or album), and store still and/or video images.

In conjunction with RF circuitry 1808, touch screen 1812, display system controller 1856, contact module 1830, graphics module 1832, and text input module 1834, browser module 1847 includes executable instructions to browse the Internet in accordance with user instructions, including searching, linking to, receiving, and displaying web pages or portions thereof, as well as attachments and other files linked to web pages.

In conjunction with RF circuitry 1808, touch screen 1812, display system controller 1856, contact module 1830, graphics module 1832, text input module 1834, e-mail client module 1840, and browser module 1847, calendar module 1848 includes executable instructions to create, display, modify, and store calendars and data associated with calendars (e.g., calendar entries, to do lists, etc.) in accordance with user instructions.

In conjunction with RF circuitry 1808, touch screen 1812, display system controller 1856, contact module 1830, graphics module 1832, text input module 1834, and browser module 1847, widget modules 1849 are mini-applications that may be downloaded and used by a user (e.g., weather widget 549-1, stocks widget 549-2, calculator widget 1849-3, alarm clock widget 1849-4, and dictionary widget 1849-5) or created by the user (e.g., user-created widget 1849-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1808, touch screen 1812, display system controller 1856, contact module 1830, graphics module 1832, text input module 1834, and browser module 1847, the widget creator module 1850 may be used by a user to create widgets (e.g., turning a user-specified portion of a web page into a widget).

In conjunction with touch screen 1812, display system controller 1856, contact module 1830, graphics module 1832, and text input module 1834, search module 1851 includes executable instructions to search for text, music, sound, image, video, and/or other files in memory 1802 that match one or more search criteria (e.g., one or more user-specified search terms) in accordance with user instructions.

In conjunction with touch screen 1812, display system controller 1856, contact module 1830, graphics module 1832, audio circuitry 1810, speaker 1811, RF circuitry 1808, and browser module 1847, video and music player module 1852 includes executable instructions that allow the user to download and play back recorded music and other sound files stored in one or more file formats, such as MP3 or AAC files, and executable instructions to display, present or otherwise play back videos (e.g., on touch screen 1812 or on an external, connected display via external port 1824). In some embodiments, device 1800 may include the functionality of an MP3 player.

In conjunction with touch screen 1812, display controller 1856, contact module 1830, graphics module 1832, and text input module 1834, notes module 1853 includes executable instructions to create and manage notes, to do lists, and the like in accordance with user instructions.

In conjunction with RF circuitry 1808, touch screen 1812, display system controller 1856, contact module 1830, graphics module 1832, text input module 1834, GPS module 1835, and browser module 1847, map module 1854 may be used to receive, display, modify, and store maps and data associated with maps (e.g., driving directions; data on stores and other points of interest at or near a particular location; and other location-based data) in accordance with user instructions.

In conjunction with touch screen 1812, display system controller 1856, contact module 1830, graphics module 1832, audio circuitry 1810, speaker 1811, RF circuitry 1808, text input module 1834, e-mail client module 1840, and browser module 1847, online video module 1855 includes instructions that allow the user to access, browse, receive (e.g., by streaming and/or download), play back (e.g., on the touch screen or on an external, connected display via external port 1824), send an e-mail with a link to a particular online video, and otherwise manage online videos in one or more file formats, such as H.264. In some embodiments, instant messaging module 1841, rather than e-mail client module 1840, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1802 may store a subset of the modules and data structures identified above. Furthermore, memory 1802 may store additional modules and data structures not described above.

In some embodiments, device 1800 is a device where operation of a predefined set of functions on the device is performed exclusively through a touch screen and/or a touchpad. By using a touch screen and/or a touchpad as the primary input control device for operation of device 1800, the number of physical input control devices (such as push buttons, dials, and the like) on device 1800 may be reduced.

The predefined set of functions that may be performed exclusively through a touch screen and/or a touchpad include navigation between user interfaces. In some embodiments, the touchpad, when touched by the user, navigates device 1800 to a main, home, or root menu from any user interface that may be displayed on device 1800. In such embodiments, the touchpad may be referred to as a "menu button." In some other embodiments, the menu button may be a physical push button or other physical input control device instead of a touchpad.

Figure 19:
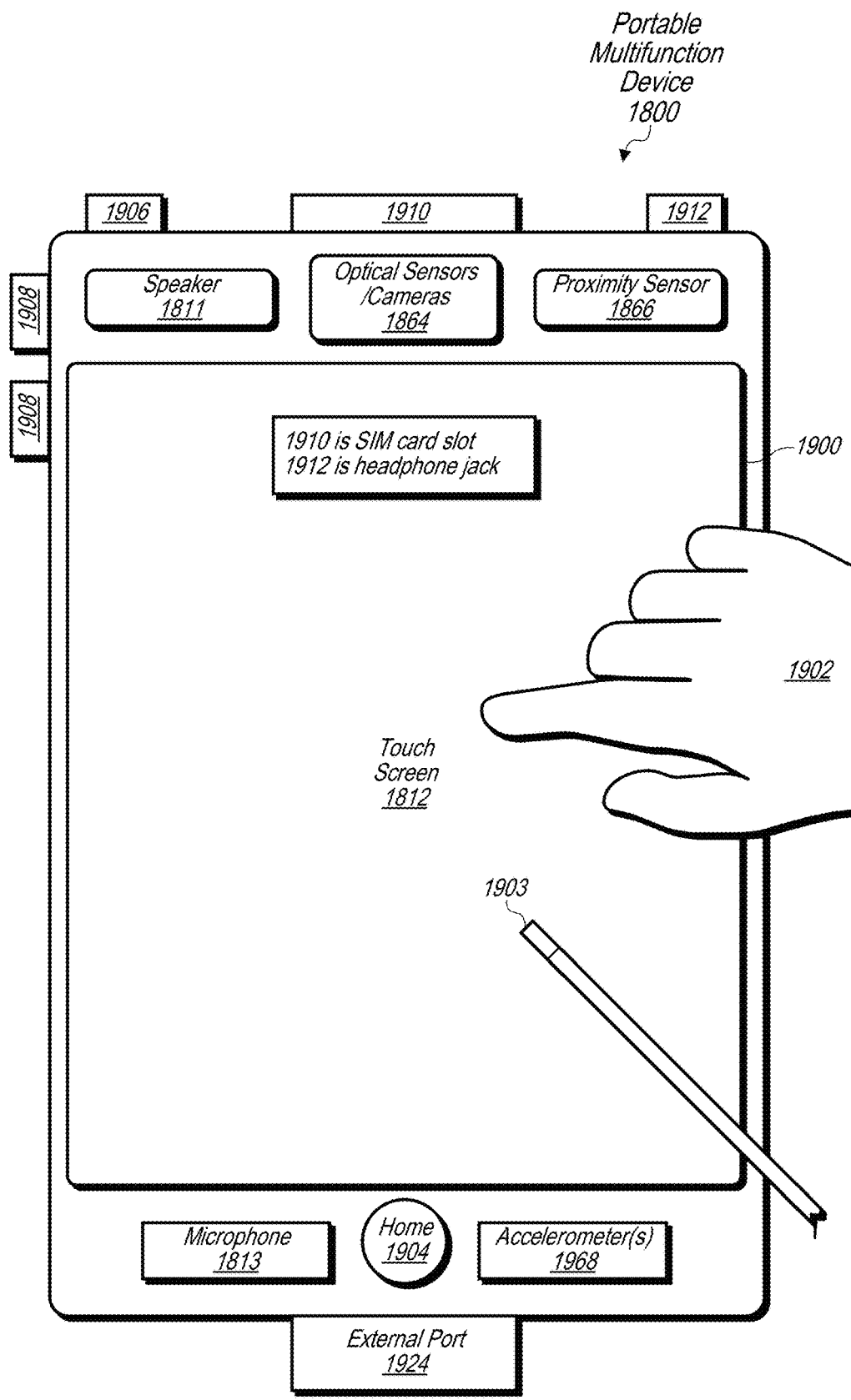
FIG. 19 depicts an example portable multifunction device that may include a camera having a folded optics arrangement, in accordance with some embodiments.

FIG. 19 depicts illustrates an example portable multifunction device 1800 that may include one or more cameras (e.g., the cameras described above with reference to FIGS. 1-16B), in accordance with some embodiments. The device 1800 may have a touch screen 1812. The touch screen 1812 may display one or more graphics within user interface (UI) 1900. In this embodiment, as well as others described below, a user may select one or more of the graphics by making a gesture on the graphics, for example, with one or more fingers 1902 (not drawn to scale in the figure) or one or more styluses 1903 (not drawn to scale in the figure).

Device 1800 may also include one or more physical buttons, such as "home" or menu button 1904. As described previously, menu button 1904 may be used to navigate to any application 1836 in a set of applications that may be executed on device 1800. Alternatively, in some embodiments, the menu button 1904 is implemented as a soft key in a GUI displayed on touch screen 1812.

In one embodiment, device 1800 includes touch screen 1812, menu button 1904, push button 1906 for powering the device on/off and locking the device, volume adjustment button(s) 1908, Subscriber Identity Module (SIM) card slot 1910, head set jack 1912, and docking/charging external port 1924. Push button 1906 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1800 also may accept verbal input for activation or deactivation of some functions through microphone 1813.

It should be noted that, although many of the examples herein are given with reference to optical sensor(s)/camera(s) 1864 (on the front of a device), one or more rear-facing cameras or optical sensors that are pointed opposite from the display may be used instead of, or in addition to, an optical sensor(s)/camera(s) 1864 on the front of a device.

Example Computer System

Figure 20:
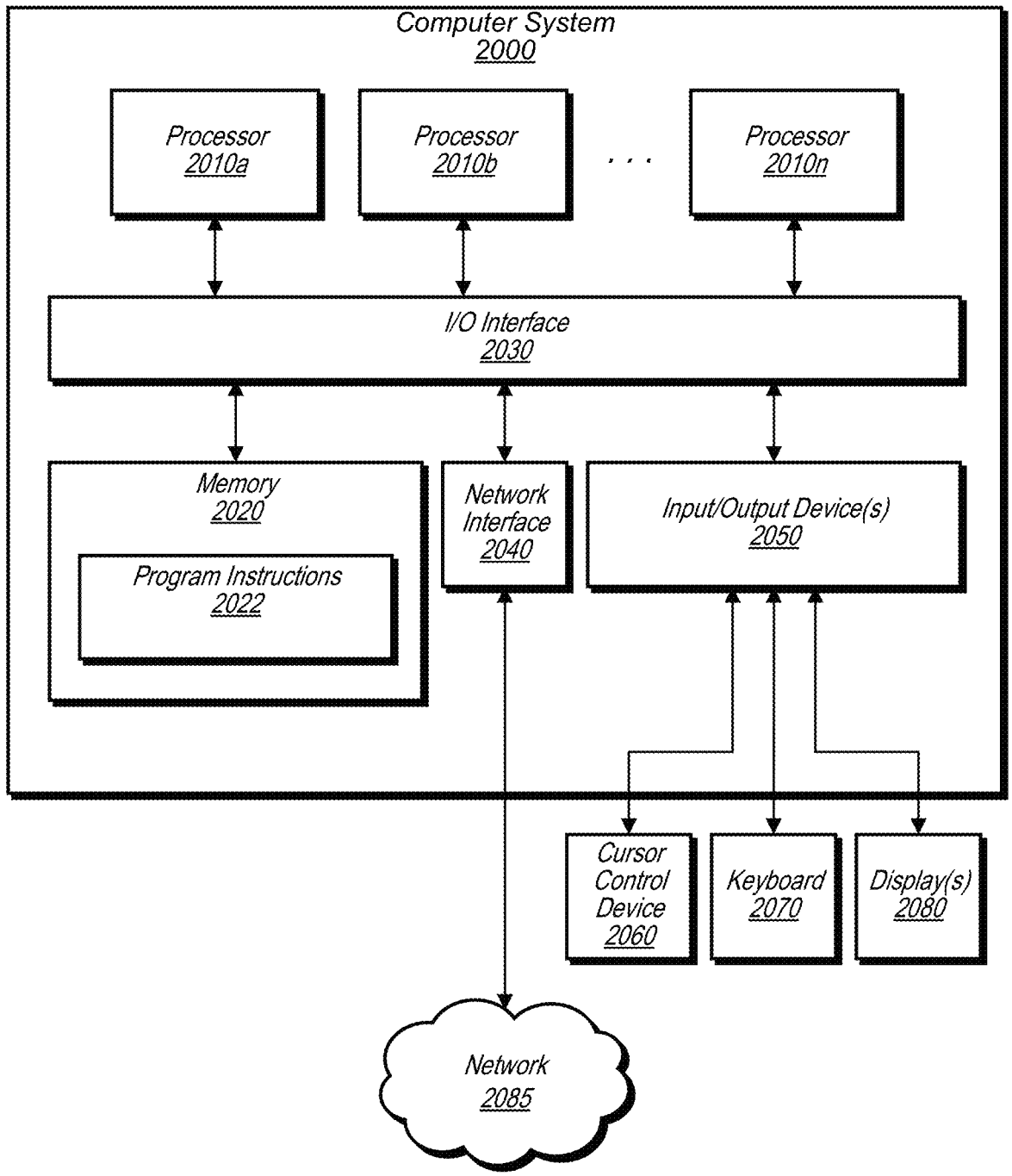
FIG. 20 illustrates an example computer system that may include a camera having a folded optics arrangement, in accordance with some embodiments.

FIG. 20 illustrates an example computer system 2000 that may include one or more cameras (e.g., the cameras described above with reference to FIGS. 1-16B), according to some embodiments. The computer system 2000 may be configured to execute any or all of the embodiments described above. In different embodiments, computer system 2000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 2000, which may interact with various other devices. Note that any component, action, or functionality described above with respect to FIGS. 1-19 may be implemented on one or more computers configured as computer system 2000 of FIG. 20, according to various embodiments. In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. In some cases, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store camera control program instructions 2022 and/or camera control data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement a lens control application 2024 incorporating any of the functionality described above. Additionally, existing camera control data 2032 of memory 2020 may include any of the information or data structures described above. In some embodiments, program instructions and/or data may be received, sent or stored upon different types of computer-accessible media or on similar media separate from system memory 2020 or computer system 2000. While computer system 2000 is described as implementing the functionality of functional blocks of previous Figures, any of the functionality described herein may be implemented via such a computer system.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 20, memory 2020 may include program instructions 2022, which may be processor-executable to implement any element or action described above. In one embodiment, the program instructions may implement the methods described above. In other embodiments, different elements and data may be included. Note that data may include any data or information described above.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional Descriptions of Embodiments (Example Clauses)

Clause 1: A camera, comprising: a folded optics arrangement to fold a path of light, the folded optics arrangement comprising: a first prism; a second prism; and a lens group disposed between the first prism and the second prism, wherein the lens group includes one or more lens elements; an image sensor to capture light that has passed through the first prism, the lens group, and the second prism; a carrier arrangement, comprising: an inner carrier structure coupled to the lens group; and an outer carrier structure coupled to the inner carrier structure; and an actuator module to: move the inner carrier structure and the outer carrier structure together, relative to the image sensor, in at least a first direction; and move the inner carrier structure relative to the outer carrier structure in at least a second direction that is orthogonal to the first direction.

Clause 2: The camera of Clause 1, wherein the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Clause 3: The camera of Clause 2, wherein: the AF VCM actuator is to move the lens group in at least the first direction, to provide AF movement of the image, projected on the image sensor, in at least the second direction; the first OIS VCM actuator is to move the lens group in at least the second direction, to provide OIS movement of the image in at least the first direction; and the second OIS VCM actuator is to move the lens group in at least the third direction, to provide OIS movement of the image in at least the third direction.

Clause 4: The camera of any of Clauses 1-3, wherein: the actuator module comprises: one or more magnets; and one or more coils; the inner carrier structure comprises a lens carrier to which at least one coil of the one or more coils is attached; the outer carrier structure comprises a magnet holder to which at least one magnet of the one or more magnets is attached; and the outer carrier structure at least partially encircles the folded optics arrangement.

Clause 5: The camera of any of Clauses 1-4, further comprising: a suspension arrangement to suspend the lens group and allow movement of the lens group along multiple axes, the suspension arrangement comprising: a leaf spring attached to the inner carrier structure and the outer carrier structure, so as to allow movement of the lens group and the inner carrier structure together, relative to the outer carrier structure, in at least the second direction; and suspension wires to allow movement of the lens group, the inner carrier structure, and the outer carrier structure together, relative to the image sensor, in one or more directions orthogonal to the second direction, wherein a suspension wire of the suspension wires comprises: a first end portion attached to the leaf spring; and a second end portion attached to a fixed structure that is stationary relative to movement of the lens group.

Clause 6: A device, comprising: one or more processors; memory storing program instructions executable by the one or more processors to control operation of a camera; and the camera, comprising: a folded optics arrangement to fold a path of light, the folded optics arrangement comprising: a first prism; a second prism; and a lens group disposed between the first prism and the second prism, wherein the lens group includes one or more lens elements; an image sensor to capture light that has passed through the first prism, the lens group, and the second prism; a carrier arrangement, comprising: an inner carrier structure coupled to the lens group; and an outer carrier structure coupled to the inner carrier structure; and an actuator module to: move the inner carrier structure and the outer carrier structure together, relative to the image sensor, in at least a first direction; and move the inner carrier structure relative to the outer carrier structure in at least a second direction that is orthogonal to the first direction.

Clause 7: The device of Clause 6, wherein the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Clause 8: The device of Clause 7, wherein the one or more processors are further to: cause the AF VCM actuator to move the lens group in at least the first direction, to provide AF movement of the image, projected on the image sensor, in at least the second direction; cause the first OIS VCM actuator to move the lens group in at least the second direction, to provide OIS movement of the image in at least the first direction; and cause the second OIS VCM actuator to move the lens group in at least the third direction, to provide OIS movement of the image in at least the third direction.

Clause 9: The device of any of Clauses 6-8, wherein the outer carrier structure at least partially encircles the folded optics arrangement.

Clause 10: The device of any of Clauses 6-9, wherein: the actuator module comprises: one or more magnets; and one or more coils; the inner carrier structure comprises a lens carrier to which at least one coil of the one or more coils is attached; and the outer carrier structure comprises a magnet holder to which at least one magnet of the one or more magnets is attached.

Clause 11: The device of Clause 10, wherein at least one other coil of the one or more coils is attached to the magnet holder.

Clause 12: The device of any of Clauses 6-11, wherein: the first prism comprises: an object side through which light enters the first prism; and a first reflecting surface side comprising a first reflective surface to redirect the light towards the lens group; and the second prism comprises: a second reflecting surface side comprising a second reflective surface to redirect the light towards the image sensor; and an image side through which the light exits the first prism, the image side proximate the image sensor.

Clause 13: The device of Clause 12, wherein: the first reflecting surface side is angled relative to the object side of the first prism; and the actuator module comprises a voice coil motor (VCM) actuator having at least one magnet and at least one coil disposed within a space under the first reflecting surface side.

Clause 14: The device of any of Clauses 6-13, wherein the camera further comprises: a suspension arrangement to suspend the lens group and allow movement of the lens group along multiple axes, the suspension arrangement comprising: a leaf spring attached to the inner carrier structure and the outer carrier structure, so as to allow movement of the lens group and the inner carrier structure together, relative to the outer carrier structure, in at least the second direction; and suspension wires to allow movement of the lens group, the inner carrier structure, and the outer carrier structure together, relative to the image sensor, in one or more directions orthogonal to the second direction, wherein a suspension wire of the suspension wires comprises: a first end portion attached to the leaf spring; and a second end portion attached to a fixed structure that is stationary relative to movement of the lens group.

Clause 15: The device of any of Clauses 6-14, wherein: the first prism and the second prism are positioned along an optical axis defined by the lens group; and the image sensor defines a plane that is parallel to the optical axis.

Clause 16: A folded optics system, comprising: a lens group including one or more lens elements; a first prism to redirect light to the lens group; a second prism to receive the light from the lens group and redirect the light to an image sensor; an inner carrier structure to couple with the lens group; an outer carrier structure to couple with the inner carrier structure; and an actuator module to: move the inner carrier structure and the outer carrier structure together, relative to the image sensor, in at least a first direction; and move the inner carrier structure relative to the outer carrier structure in at least a second direction that is orthogonal to the first direction.

Clause 17: The folded optics system of Clause 16, wherein the actuator module comprises: an autofocus (AF) voice coil motor (VCM) actuator to move the inner carrier structure and the outer carrier structure together, relative to the image sensor, in at least the first direction; a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

Clause 18: The folded optics system of any of Clauses 16-17, wherein: the actuator module comprises: one or more magnets; and one or more coils; a first portion of the actuator module is attached to the inner carrier structure; a second portion of the actuator module is attached to the outer carrier structure; and a third portion of the actuator module is attached to a base structure that is fixed relative to movement of the lens group.

Clause 19: The folded optics system of any of Clauses 16-18, wherein the outer carrier structure is to at least partially encircle the lens group, the first prism, and the second prism.

Clause 20: The folded optics system of any of Clauses 16-19, wherein: the lens group is disposed between the first prism and the second prism; and the first prism and the second prism are positioned along an optical axis defined by the lens group.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A camera, comprising:
a folded optics arrangement to fold a path of light, the folded optics arrangement comprising:
a first prism;
a second prism; and
a lens group disposed between the first prism and the second prism, wherein the lens group includes one or more lens elements;
an image sensor to capture light that has passed through the first prism, the lens group, and the second prism;
a carrier arrangement, comprising:
an inner carrier structure coupled to the lens group; and
an outer carrier structure coupled to the inner carrier structure; and
an actuator module to:
move the inner carrier structure and the outer carrier structure together, relative to the image sensor, in at least a first direction; and
move the inner carrier structure relative to the outer carrier structure in at least a second direction that is orthogonal to the first direction.

2. The camera of claim 1, wherein the actuator module comprises:
an autofocus (AF) voice coil motor (VCM) actuator to move the inner carrier structure and the outer carrier structure together, relative to the image sensor, in at least the first direction;
a first optical image stabilization (OIS) VCM actuator to move the inner carrier structure relative to the outer carrier structure in at least the second direction that is orthogonal to the first direction; and
a second OIS VCM actuator to move the inner carrier structure and the outer carrier structure together, relative to the image sensor, in at least a third direction that is orthogonal to the first direction and the second direction.

3. The camera of claim 2, wherein:
the AF VCM actuator is to move the lens group in at least the first direction, to provide AF movement of the image, projected on the image sensor, in at least the second direction;
the first OIS VCM actuator is to move the lens group in at least the second direction, to provide OIS movement of the image in at least the first direction; and
the second OIS VCM actuator is to move the lens group in at least the third direction, to provide OIS movement of the image in at least the third direction.

4. The camera of claim 1, wherein:
the actuator module comprises:
one or more magnets; and
one or more coils;
the inner carrier structure comprises a lens carrier to which at least one coil of the one or more coils is attached;
the outer carrier structure comprises a magnet holder to which at least one magnet of the one or more magnets is attached; and
the outer carrier structure at least partially encircles the folded optics arrangement.

5. The camera of claim 1, further comprising:
a suspension arrangement to suspend the lens group and allow movement of the lens group along multiple axes, the suspension arrangement comprising:
a leaf spring attached to the inner carrier structure and the outer carrier structure, so as to allow movement of the lens group and the inner carrier structure together, relative to the outer carrier structure, in at least the second direction; and
suspension wires to allow movement of the lens group, the inner carrier structure, and the outer carrier structure together, relative to the image sensor, in one or more directions orthogonal to the second direction, wherein a suspension wire of the suspension wires comprises:
a first end portion attached to the leaf spring; and
a second end portion attached to a fixed structure that is stationary relative to movement of the lens group.

6. A device, comprising:
one or more processors;
memory storing program instructions executable by the one or more processors to control operation of a camera; and
the camera, comprising:
a folded optics arrangement to fold a path of light, the folded optics arrangement comprising:
a first prism;
a second prism; and
a lens group disposed between the first prism and the second prism, wherein the lens group includes one or more lens elements;
an image sensor to capture light that has passed through the first prism, the lens group, and the second prism;
a carrier arrangement, comprising:
an inner carrier structure coupled to the lens group; and
an outer carrier structure coupled to the inner carrier structure; and
an actuator module to:
move the inner carrier structure and the outer carrier structure together, relative to the image sensor, in at least a first direction; and
move the inner carrier structure relative to the outer carrier structure in at least a second direction that is orthogonal to the first direction.

7. The device of claim 6, wherein the actuator module comprises:
an autofocus (AF) voice coil motor (VCM) actuator to move the inner carrier structure and the outer carrier structure together, relative to the image sensor, in at least the first direction;
a first optical image stabilization (OIS) VCM actuator to move the inner carrier structure relative to the outer carrier structure in at least the second direction that is orthogonal to the first direction; and
a second OIS VCM actuator to move the inner carrier structure and the outer carrier structure together, relative to the image sensor, in at least a third direction that is orthogonal to the first direction and the second direction.

8. The device of claim 7, wherein the one or more processors are further to:
cause the AF VCM actuator to move the lens group in at least the first direction, to provide AF movement of the image, projected on the image sensor, in at least the second direction;
cause the first OIS VCM actuator to move the lens group in at least the second direction, to provide OIS movement of the image in at least the first direction; and
cause the second OIS VCM actuator to move the lens group in at least the third direction, to provide OIS movement of the image in at least the third direction.

9. The device of claim 6, wherein the outer carrier structure at least partially encircles the folded optics arrangement.

10. The device of claim 6, wherein:
the actuator module comprises:
one or more magnets; and
one or more coils;
the inner carrier structure comprises a lens carrier to which at least one coil of the one or more coils is attached; and
the outer carrier structure comprises a magnet holder to which at least one magnet of the one or more magnets is attached.

11. The device of claim 10, wherein at least one other coil of the one or more coils is attached to the magnet holder.

12. The device of claim 6, wherein:
the first prism comprises:
an object side through which light enters the first prism; and
a first reflecting surface side comprising a first reflective surface to redirect the light towards the lens group; and
the second prism comprises:
a second reflecting surface side comprising a second reflective surface to redirect the light towards the image sensor; and
an image side through which the light exits the first prism, the image side proximate the image sensor.

13. The device of claim 12, wherein:
the first reflecting surface side is angled relative to the object side of the first prism; and
the actuator module comprises a voice coil motor (VCM) actuator having at least one magnet and at least one coil disposed within a space under the first reflecting surface side.

14. The device of claim 6, wherein the camera further comprises:
a suspension arrangement to suspend the lens group and allow movement of the lens group along multiple axes, the suspension arrangement comprising:
a leaf spring attached to the inner carrier structure and the outer carrier structure, so as to allow movement of the lens group and the inner carrier structure together, relative to the outer carrier structure, in at least the second direction; and
suspension wires to allow movement of the lens group, the inner carrier structure, and the outer carrier structure together, relative to the image sensor, in one or more directions orthogonal to the second direction, wherein a suspension wire of the suspension wires comprises:
a first end portion attached to the leaf spring; and
a second end portion attached to a fixed structure that is stationary relative to movement of the lens group.

15. The device of claim 6, wherein:
the first prism and the second prism are positioned along an optical axis defined by the lens group; and
the image sensor defines a plane that is parallel to the optical axis.

16. A folded optics system, comprising:
a lens group including one or more lens elements;
a first prism to redirect light to the lens group;
a second prism to receive the light from the lens group and redirect the light to an image sensor;
an inner carrier structure to couple with the lens group;

an outer carrier structure to couple with the inner carrier structure; and an actuator module to:

move the inner carrier structure and the outer carrier structure together, relative to the image sensor, in at least a first direction; and move the inner carrier structure relative to the outer carrier structure in at least a second direction that is orthogonal to the first direction.

17. The folded optics system of claim 16, wherein the actuator module comprises:

an autofocus (AF) voice coil motor (VCM) actuator to move the inner carrier structure and the outer carrier structure together, relative to the image sensor, in at least the first direction;

a first optical image stabilization (OIS) VCM actuator to move the inner carrier structure relative to the outer carrier structure in at least the second direction that is orthogonal to the first direction; and a second OIS VCM actuator to move the inner carrier structure and the outer carrier structure together, relative to the image sensor, in at least a third direction that is orthogonal to the first direction and the second direction.

18. The folded optics system of claim 16, wherein:

the actuator module comprises:
one or more magnets; and
one or more coils;

a first portion of the actuator module is attached to the inner carrier structure;

a second portion of the actuator module is attached to the outer carrier structure; and a third portion of the actuator module is attached to a base structure that is fixed relative to movement of the lens group.

19. The folded optics system of claim 16, wherein the outer carrier structure is to at least partially encircle the lens group, the first prism, and the second prism.

20. The folded optics system of claim 16, wherein:

the lens group is disposed between the first prism and the second prism; and the first prism and the second prism are positioned along an optical axis defined by the lens group.

* * * * *